United States Patent
Sakuragi et al.

(10) Patent No.: US 8,670,651 B2
(45) Date of Patent: Mar. 11, 2014

(54) EDITING DEVICE, EDITING METHOD, AND PROGRAM

(75) Inventors: Ryoichi Sakuragi, Kanagawa (JP); Yukiko Nishimura, Kanagawa (JP); Atsushi Imai, Kanagawa (JP); Takayuki Okazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/368,995

(22) Filed: Feb. 8, 2012

(65) Prior Publication Data

US 2012/0201517 A1    Aug. 9, 2012

(30) Foreign Application Priority Data

Feb. 9, 2011    (JP) ................... 2011-025883

(51) Int. Cl.
*H04N 5/761*    (2006.01)
(52) U.S. Cl.
USPC .......................................... 386/278; 386/282
(58) Field of Classification Search
None
See application file for complete search history.

(56) References Cited

U.S. PATENT DOCUMENTS

| | | |
|---|---|---|
| 2004/0199578 A1 | 10/2004 | Kapczynski et al. |
| 2008/0228580 A1* | 9/2008 | Korman et al. .................. 705/14 |
| 2008/0256242 A1* | 10/2008 | Liebman ....................... 709/226 |
| 2011/0026898 A1 | 2/2011 | Lussier et al. |
| 2011/0119604 A1* | 5/2011 | Lo et al. ........................ 715/762 |

FOREIGN PATENT DOCUMENTS

| | | |
|---|---|---|
| JP | 2002-191011 | 7/2002 |
| JP | 2011-025883 | 2/2011 |
| WO | WO 97/39411 | 10/1997 |

OTHER PUBLICATIONS

1st Report of EBU/SMPTE Task Force for Harmonized Standards for the Exchange of Television Program Material as Bit Streams, XP-000720137, version 1.30, pp. 1-73, May 6, 1997.
McLeish, D. et al., "The Advanced Authoring Format and its Relevance to the Exchange of Audio Editing Decisions", pp. 1-7, AES 25th International Conference, London, United Kingdom, Jun. 17-19, 2004.
Peters, R. et al., "CrytalWeb—A Distributed Authoring Environment for the World-Wide Web", Computer Networks and ISDN Systems 27 (1995), pp. 861-870.
Bo Xiao, Collaborative Multimedia Authoring: Scenarios and Consistency Maintenance. Integrated Publication and Information Systems. Fraunhofer Institute, Germany. XP055085030. pp. 1-15.

* cited by examiner

*Primary Examiner* — Huy T Nguyen
*Assistant Examiner* — Eileen Adams
(74) *Attorney, Agent, or Firm* — Frommer Lawrence & Haug LLP; William S. Frommer

(57) ABSTRACT

An editing device includes a setting unit which sets a role for each device as an editor, in a group of devices as a plurality of editors in which a hierarchical structure is constituted by a director and one or more workers, and an executing unit which executes editing processing corresponding to an editing operation, when each device as the plurality of editors performs the editing operation which has been defined in advance on the basis of the role set by the setting unit.

9 Claims, 40 Drawing Sheets

FIG. 12

| | DATE OF REGISTRATION | COMMENT | START | END | PERSON IN CHARGE |
|---|---|---|---|---|---|
| 291-1 | 08-27-2010 12:00 | SET AUDIO LEVEL TO −10 dB | 08-27 15:30 | 08-27 19:00 | YAMADA |
| 291-2 | 08-27-2010 12:05 | INSERTS SOUND OF EXPLOSION SE | 08-27 17:00 | 08-27 20:00 | MIURA |
| | 12:10 | WHAT EXPLOSION SE IS UNCLEAR | | | |
| 291-3 | 08-27-2010 13:00 | NOISE REDUCTION | 08-27 14:00 | 08-27 17:00 | SATO |
| 291-4 | 08-27-2010 13:03 | (VOICE FILE) | 08-27 19:00 | 08-27 20:00 | MIURA |

261

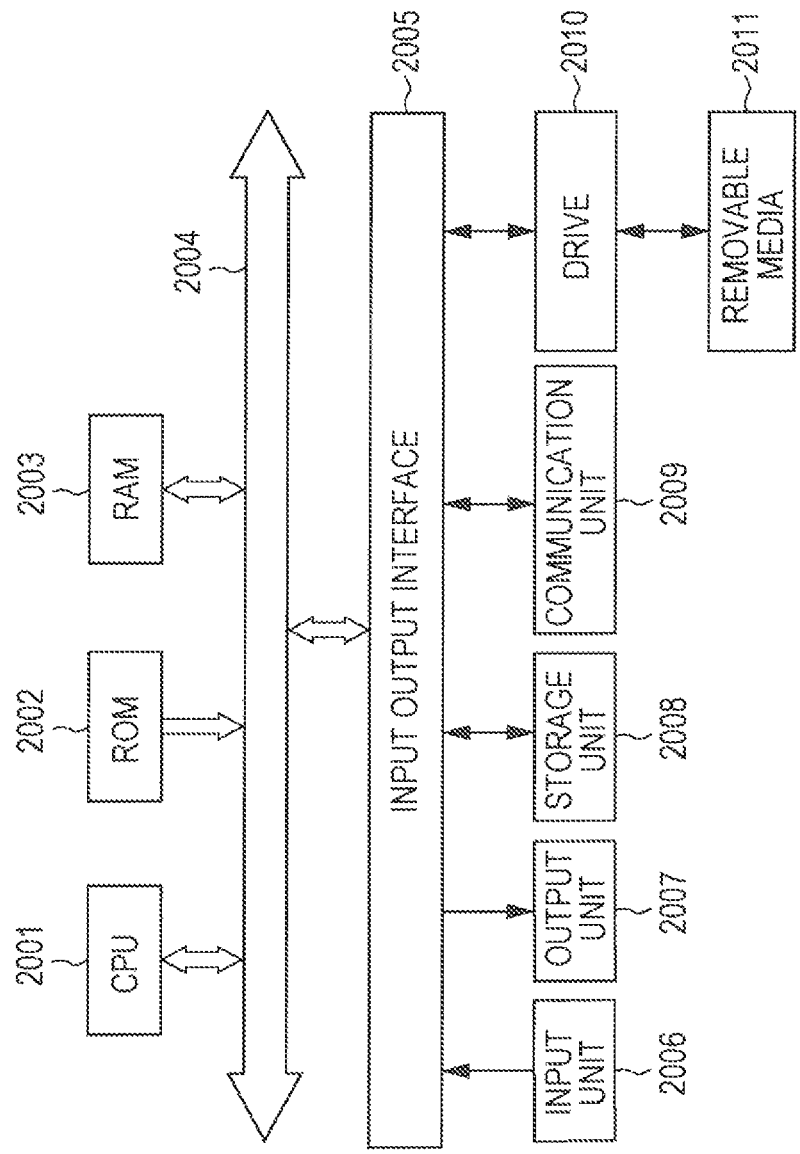

EDITING DEVICE, EDITING METHOD, AND PROGRAM

BACKGROUND

The present disclosure relates to an editing device, an editing method, and a program, particularly to an editing device, an editing method, and a program in which a plurality of editors can execute editing simultaneously and in parallel in a multiuser environment.

In the related art, in a content production field, an editor creates data of contents by performing a series of editing processes with respect to various materials.

Here, there is data which can be an element of the contents which is recorded in storage such as a tape, a disk, a memory, or the like, as materials, and in detail, it is data of moving images, still images, audio, or the like.

In addition, in a series of editing processes, for example, an editor starts the job by bringing in a material in the editing device, puts the material in order using the editing device, edits metadata, performs a variety of editing processes with respect to these materials, and finally creates data of the contents from the material after editing, for example, broadcasting data and storage data as a file. As a variety of editing processes, there are cut editing, video effect editing, multi-audio editing, or the like, accompanying the preview.

These series of editing processes are usually performed by one editor sequentially.

However, when editing work in a short time is necessary as in production of a news program, there may be a case where a plurality of editors joins the editing work. Accordingly, in Japanese Unexamined Patent Application Publication No. 2002-191011, an editing device which can be applied to multiuser environments is disclosed.

SUMMARY

However, even if a plurality of editing devices in the related art including the device in Japanese Unexamined Patent Application Publication No. 2002-191011 is used, it is difficult to perform an editing work simultaneously and in parallel with respect to the same material. There is a concern that an inconsistency may occur in the editing result, since it is difficult to find out who is the director among the plurality of editors during the editing work.

For example, when the plurality of editors performs the cut editing simultaneously and in parallel, there is a concern that conflict may occur in the editing result. The conflict, for example, is a situation where editing work of another editor disturbs an editing work of the editor A, and generates an unexpected editing result for the editor A, regardless of the fact that the editing work of the editor A influences the editing result of the contents. Accordingly, when a plurality of editors edits the same material, it is necessary to provide a measure against the conflict, however, a valid measure has not been found yet.

Further, it is difficult to perform collaborative work among a plurality of editors even if a plurality of editing devices in the related art including the device in Japanese Unexamined Patent Application Publication No. 2002-191011 is used. This is because significant time and cost are necessary in order to allow the editors to communicate with each other, since it is not clear which editor is to perform which editing. In addition, since the instruction of editing work from a director to an editor is one way, it is necessary for the editor to follow the instruction from the director implicitly.

As described above, it is necessary to realize a method in which a plurality of editors performs editing simultaneously and in parallel in a multiuser environment, however, a method which satisfies such a demand has not been found yet.

It is desirable to provide an editing device in which a plurality of editors can execute editing simultaneously and in parallel in a multiuser environment.

According to an embodiment of the present disclosure, there is provided an editing device which includes a setting unit which sets a role for each device as an editor, in a group of devices as a plurality of editors in which a hierarchical structure is constituted by a director and one or more workers; and an executing unit which executes editing processing corresponding to an editing operation, when the editing operation has been defined in advance is performed on the basis of the role set by the setting unit for each device as the plurality of editors.

The role may include behaviors which are expected from other editors, and authorities of changing editing information relating to a material as elements of contents. The executing unit controls the editing operation so as not to conflict with the editing operation of another editor.

The editing device may further include a determining unit which determines an allotment showing assignment of work content which shows each content item of one or more editing processes with respect to the material, and one or more work contents with respect to each of the one or more workers, according to an operating signal from a device as the director.

In the editing device, the setting unit may set the role in a range of the determined work content and the allotment according to the operating signal from the device as the director.

The editing device may further include a generation unit which generates first data which shows a result, during executing or after executing, of the editing processing by the executing unit according to the work contents and the allotment, and second data which respectively shows the roles of each of the plurality of editors which respectively correspond to portions showing the assigned work content in the first data.

In the editing device, when the role of a worker who is designated by the device as the director among one or more workers is changed during an executing control of the editing processing, the changed content may be reflected in the second data.

In the device, when the role of the worker who is designated by the device as the director among one or more workers is changed during an executing control of the editing processing, the changed content may be reflected in the first data.

According to another embodiment of the present disclosure, there is provided an editing method and a program which correspond to the editing device according to the embodiment of the present disclosure.

According to still another embodiment of the present disclosure, there is provided an editing device, method, and a program which include setting roles for each device as an editor in a group of devices as a plurality of editors which is configured by a director and one or more workers by being hierarchically structured; and executing editing processing corresponding to the editing operation, when a predefined editing operation is performed on the basis of the set roles, by the respective devices as the plurality of editors.

As described above, according to the embodiments of the present disclosure, it is possible for a plurality of editors to execute the editing work simultaneously and in parallel in multiuser environments.

BRIEF DESCRIPTION OF THE DRAWINGS

FIG. 12 is a diagram which shows an example of the instruction content which is displayed in the simultaneous and parallel editing client for the director when an inquiry is made regarding the instruction;

FIG. 40 is a block diagram which shows a configuration example of hardware of information processing devices to which the embodiments of the present disclosure are applied.

DETAILED DESCRIPTION OF EMBODIMENTS

Relationships Among Editors Relating to Simultaneous and Parallel Editing Work By applying an editing system according to the embodiment, it is possible to perform a simultaneous and parallel editing work. Here, the simultaneous and parallel editing work is editing work which is performed in a process of creating contents, and is performed simultaneously and in parallel, particularly with respect to the timeline, that is, substantially at the same time with respect to the same material by two or more editors. In addition, regarding the timeline, it will be described later using FIG. 6.

The editors who relate to such a simultaneous and parallel editing work are roughly classified into a director and a worker.

The director mainly supervises one or more workers, sets hierarchy of editors, allots and determines the contents of the editing work, gives editing instructions to the workers, confirms the result of the editing processes of the workers, and acknowledges the result of the editing work of the workers.

The workers mainly perform editing work under a supervision of a director, confirms an instruction from a director, confirms a result of the editing work of another worker, informs another worker and a director of the result of the editing work to, and reports the result of the editing work to the director.

The director can serve as a worker concurrently. In this manner, hereinafter, the director who serves as the worker concurrently is referred to as a worker and director, in order to clearly distinguish from a director who does not serve as a worker concurrently. When the worker and director serves as a worker, there is a case where the worker and director himself becomes a director, or a worker.

In addition, at least a manager is present as a character who is assumed to execute such a simultaneous and parallel editing work, and has a position which is different from editors (that is, a director and a worker). The manager mainly manages the editing system in which simultaneous and parallel editing is performed.

Figure 1:
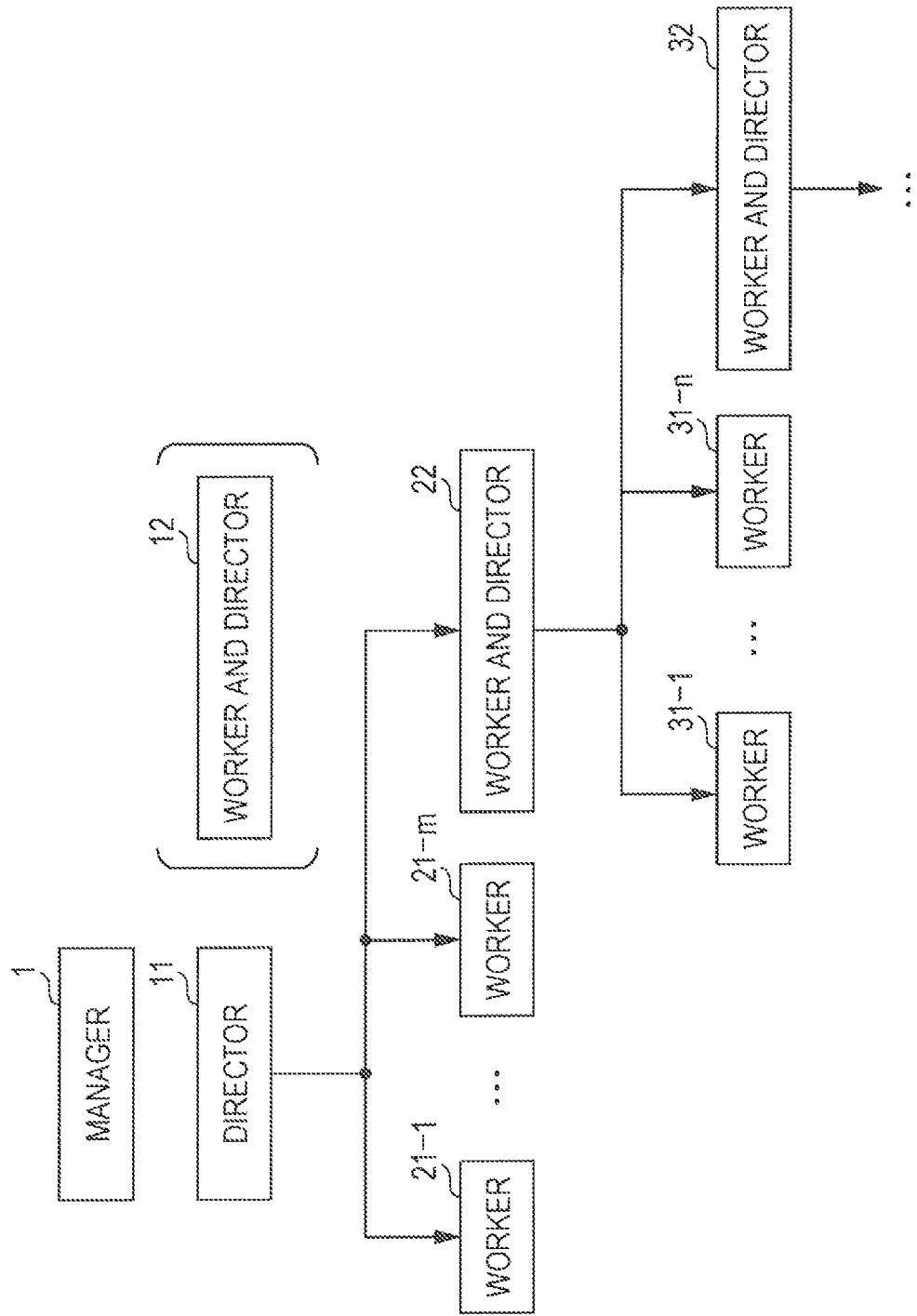
FIG. 1 is a diagram which shows a relationship of characters relating to a simultaneous and parallel editing work.

FIG. 1 is a diagram which shows a relationship of characters relating to such a simultaneous and parallel editing work.

As shown in FIG. 1, a manager 1 is present in a position which is independent from the editor, and manages the editing system according to the embodiment to be described later.

Meanwhile, a relationship among the editors which are constituted by a director and workers has a hierarchical structure.

In the example in FIG. 1, the director 11 supervises the editing work of the workers 21-1 to 21-*m* (m is a natural number of one or more), and the worker and director 22. In addition, the director 11 is to perform the editing work himself, and may become the worker and director 12.

The workers 21-1 to 21-*m*, and the worker and director 22 are able to respectively perform the editing work with respect to the same material, particularly, with respect to the timeline simultaneously and in parallel under the supervision of the director 11.

In the example in FIG. 1, the worker and director 22 supervise the workers 31-1 to 31-*n* (n is a natural number of one or more), and the worker and director 32.

The workers 31-1 to 31-*n*, and the worker and director 32 are able to respectively perform the editing work with respect to the same material, particularly, with respect to the timeline simultaneously and in parallel under the supervision of the worker and director 22. At that moment, the worker and director 22, himself can perform the editing work with respect to the same material, particularly, with respect to the timeline simultaneously and in parallel in a position of a worker.

The worker and director 32 supervise one or more workers or a worker and director not shown in FIG. 1, and perform the editing work themselves.

Setting of Role of Editor

Subsequently, a method of setting such a role of the editor will be described.

A director or a manager can set the role of the editor by operating one (for example, if it is a director, a simultaneous and parallel editing client 121-1 in FIG. 3 to be described later) of a plurality of editing devices which constitutes the editing system.

The role means "a behavior which is expected from another editor" and "an authority which is given to an editor who is in a relationship within the hierarchical structure".

First, "the behavior which is expected from another editor" will be described.

A plurality of editors (that is, a group of editors) shares the editing work with each other, in order to complete data of one content item. The editing work which is shared by the plurality of editors is desired not to influence each other as much as possible. This is because it is necessary to avoid a conflict in the result of the editing work, in order for each of the plurality of editors to progress the work without confusion. This conflict means a situation, for example, where editing work of another editor disturbs editing work of the editor A, and outputs an unexpected editing result for the editor A, regardless of the fact that the editing work which was performed by the editor A influences the editing result of the contents.

For example, in a process of editing video data (a still image or a moving image) as a material, a series of editing processes operations with a strong association is present. Hereinafter, such a series of editing processes operations is referred to as a context of editing.

According to inventors of the present disclosure, it was found that there are plural kinds of contexts of editing, and these plural kinds of contexts of editing do not conflict with each other. From this finding, it is preferable that "a behavior which is expected from another editor" for an editor be a unit of context of the editing. Specifically, as the context of the editing, there are a cut editing context, an MA (Multi Audio) editing context, a telop editing context, a video effect editing context, or the like.

For example, in general, the cut editing context and telop editing context are completely separated, and there is not a conflict of editing among editors. In addition, the cut editing context and MA context are substantially separated, and it is possible to avoid the conflict of editing among editors.

Each of the plurality of editing operations which is included in the context of the editing, that is, each of the plurality of editing operations which have strong association each other can be defined as a minimum unit of the editing work which has a possibility of changing the same editing information. In addition, the editing information is a variety of information which is related to the simultaneous and parallel editing work.

In the cut editing context, an aggregation of editing operations is included, for example, adding a cut point, three-point editing (superscription), three-point editing (insertion), copying of an event, clipping an event, pasting an event, or the like. Since each of these editing operations is an operation of which a target is similar editing information, it is possible to abstract the information as the cut editing context. On the contrary, when a plurality of editors performs the cut editing, a conflict occurs.

In addition, for example, an aggregation of editing operations is included in the video effect editing context of changing a parameter value of an effect which is pasted to an event, adding a key frame to the effect which is pasted to the event, or the like. Since each of these editing operations is an operation of which a target is finer-grained editing information than the event, there is not a conflict with the cut editing context of which a target is coarser-grained editing information than the event.

In this manner, in view of the context of the editing, it is possible to perform simultaneous and parallel video editing when each of the plurality of editors shares the editing work, and has "a behavior which is expected from another editor" as their roles.

That is, it is possible to understand that, among the roles of the editors, "a behavior which is expected from another editor" is an aggregation of the editing operations in which an editing process is divided into a unit of context of editing. For example, as a behavior which is expected from another editor, it is possible to adopt video effect editing, MA editing, cut editing, or the like.

Subsequently, among the roles of the editor, "an authority given to an editor who is in a relationship within a hierarchical structure" will be described.

If one or more editors share the same editing work, then the scenario of "a behavior which is expected from another editor" does not apply. In this case, it is necessary to consider a possibility where the results of items of editing work which are produced by the plurality of editors conflict with each other. That is, in this case, in order to avoid the conflict, it is necessary to make the relationship among editors be hierarchically structured, and grant an appropriate authority to each of the editors.

It is possible for an editor of the upper level to settle the work result of an editor of the lower level whose behavior is expected to be similar, and resolve the conflicted portion by hierarchically structuring the relationship of the editors.

Here, the authority which is granted to the editor is an authority assigned from the editor of the upper level, and is an authority of changing data of editing information. For example, as the authority to be granted to the editor, it is possible to adopt authorities of CRUD (Create, Read, Update, and Delete), or the like.

Figure 2:
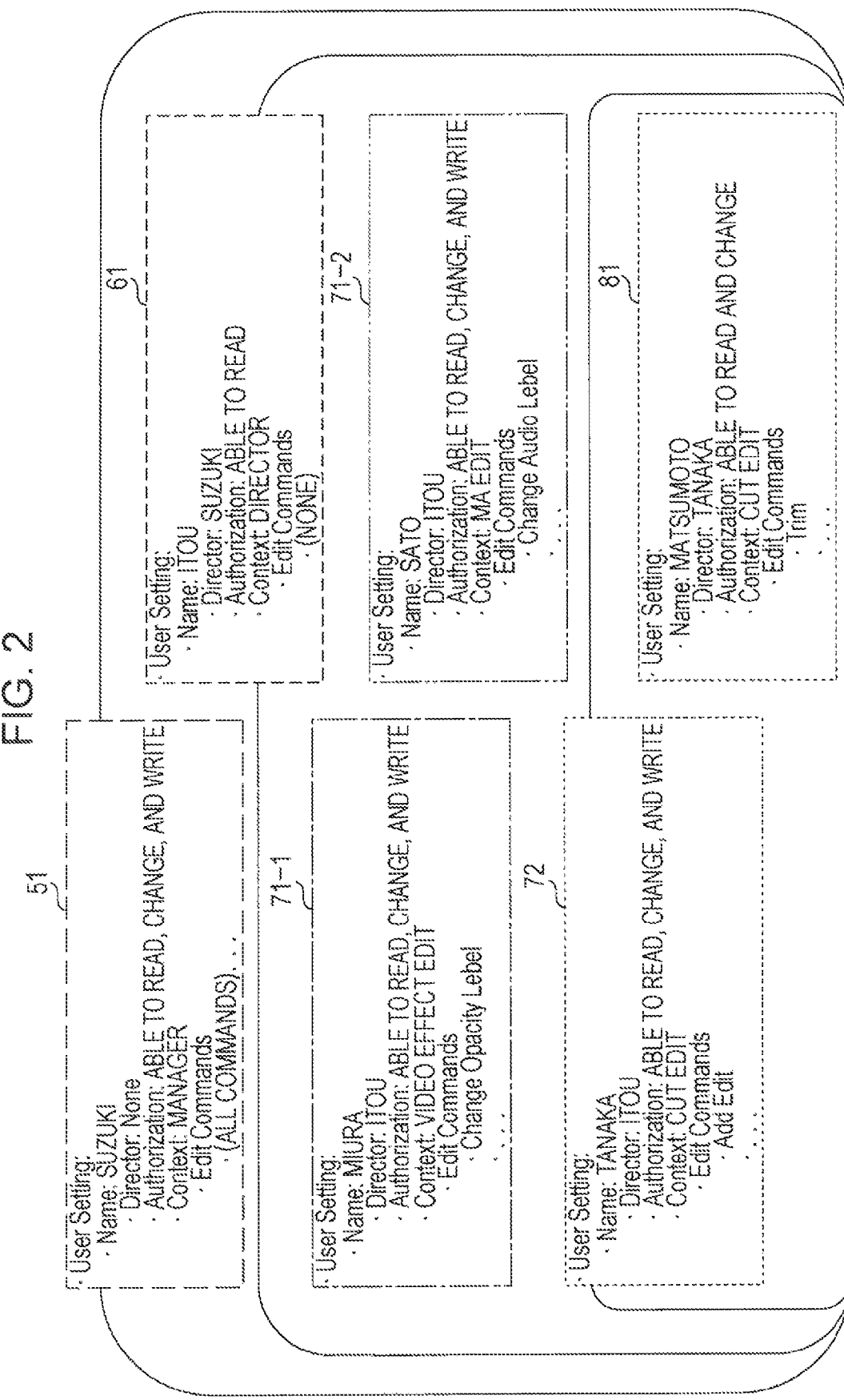
FIG. 2 is a diagram which describes setting of a role of an editor.

FIG. 2 is a diagram which describes relating to setting of such a role of the editor.

FIG. 2 shows the set content of the roles for each editor. In the set content which is shown for each editor, the "User setting:" on the first row shows that a director or a manager sets the content of the second row and thereafter. The name of the set editor id shown after the "Name:" on the second row. The name of the director who supervises the set editor is shown after the "Director" on the third row. "Authorities which are granted to an editor who is in relation within the hierarchical structure", that is, the authorities which are granted to the set editor are shown after the "Authorization" on the fourth row. "A behavior which is expected from another editor" for the set editor is shown in the unit of the context of editing after the "Context" on the fifth row. In the aggregation of the editing operations included in the editing contents which is set on the fifth row, a command of the editing operation which can be edited is shown after the "Edit commands" on the sixth row.

For example, it is understood that the set content 51 is a set content for the editor "Suzuki" from the description after the "Name:" on the second row. In addition, it is understood that the name of the director who supervises the editor "Suzuki" is "None", that is, the editor "Suzuki" is not managed by a director from the description after the "Director" on the third row. Further, the authorities which are granted to the editor "Suzuki" are "Read, change, and write" of a material from the description after the "Authorization" on the fourth row. It is understood that "the behavior which is expected from another editor" for the editor "Suzuki" is the "Manager" of the editing system from the description after the "Context" on the fifth row. In addition, since "the behavior which is expected from another editor" for the manager is the aggregation of all types of the context to be edited, that is, since it is difficult to assign a specified context to be edited, a specified setting of a "Manager" was performed in here. For this reason, as shown in the description after the "Edit commands" on the sixth row, the editor "Suzuki" is assumed to be able to edit "All commands". That is, the editor "Suzuki" as the manager corresponds to the manager 1 in the example in FIG. 1, and is granted with an authority of changing the material, since it is necessary to manage the editing system.

In addition, among the authorities, the "Change" of the material means changing of a current material, and "Write" means adding of new material to the current material.

Similarly, it is understood that the set content 61 is a set content for the editor "Itou". In addition, the name of the director who supervises the editor "Itou" is "Suzuki". Further, it is understood that the authority which is granted to the editor "Itou" is "Read" of the material. It is understood that "the behavior which is expected from another editor" for the editor "Itou" is a "Director". In addition, "the behavior which is expected from another editor" for the director is specially set to a "Director" here, since the director himself does not perform editing work, that is, it is difficult to assign a specified context to be edited. For this reason, the editor "Itou" does not have commands for performing editing. In this manner, the editor "Itou" who is the director corresponds to the director 11 in the example in FIG. 1, and it is understood that the director 11 is a director who does not concurrently serve as a worker, since there are no commands to be edited.

Similarly, it is understood that the set content 71-1 is a set content for the editor "Miura". In addition, it is understood that the name of the director who supervises the editor "Miura" is "Itou". Further, the authorities that are granted to the editor "Miura" are "Read, change, and write" of the material. It is understood that "the behavior which is expected from another editor" for the editor "Miura" is "Video effect editing". For this reason, it is understood that the command of an editing operation to be edited among the editing operations included in the "video effect editing" is "Change Opacity Level", that is, the editor "Miura" is able to edit the opacity level. In this manner, it is understood that the editor "Miura" corresponds to the worker 21-1 in the example in FIG. 1, and is granted with the authority of changing the material relating to the video effect editing.

Similarly, it is understood that the set content 71-2 is a set content for the editor "Sato". In addition, it is understood that the name of the director who supervises the editor "Sato" is "Itou". Further, the authorities that are granted to the editor "Sato" are "Read, change, and write" of the material. It is understood that "the behavior which is expected from another editor" for the editor "Sato" is "MA editing". For this reason, it is understood that the command of an editing operation to be edited among the editing operations included in the "MA editing" is "Change Audio Level", that is, the editor "Sato" is able to edit the audio level. In this manner, it is understood that the editor "Sato" corresponds to the worker 21-$m$ in the example in FIG. 1. That is, FIG. 2 shows a set where m in FIG. 1 equals to 2. It is understood that the editor "Sato" is granted with the authority of changing the material relating to the MA editing.

Similarly, it is understood that the set content 72 is a set content for the editor "Tanaka". In addition, it is understood that the name of the director who supervises the editor "Tanaka" is "Itou". Further, the authorities that are granted to the editor "Tanaka" are "Read, change, and write" of the material. It is understood that "the behavior which is expected from another editor" for the editor "Tanaka" is "Cut edit". For this reason, it is understood that the command of an editing operation to be edited among the editing operations included in the "Cut edit" is "Add edit", that is, it is understood that the editor "Tanaka" is able to add the event. In this manner, it is understood that the editor "Tanaka" corresponds to the worker and director 22 in the example in FIG. 1, supervises the editor "Matsumoto" as can be understood from the set content 81 to be described later, and performs the editing work himself.

Similarly, it is understood that the set content 81 is a set content for the editor "Matsumoto". In addition, it is understood that the name of the director who supervises the editor "Matsumoto" is "Tanaka". Further, the authorities that are granted to the editor "Matsumoto" are "Read and change" of the material. It is understood that "the behavior which is expected from another editor" for the editor "Matsumoto" is "Cut edit". For this reason, it is understood that the command of an editing operation to be edited among the editing operations included in the "Cut edit" is "Trim", that is, it is understood that the editor "Matsumoto" is able to perform trim editing. In this manner, it is understood that the editor "Matsumoto" corresponds to the worker 31-1 in the example in FIG. 1, and is granted with the authority of changing the material relating to the trim editing.

In this manner, it is possible to understand who directs and supervises among the plurality of editors by setting the role of the editor, and to avoid the conflicts of the editing result, since the respective work contents are clearly cut and divided. In addition, a responsibility of respective editors becomes clear.

In addition, when there is an editor who is supervised by a director, or a worker and director, even not shown, it is possible to denote the editor who is supervised by the director or the worker and director as "Workers". For example, as the "Workers" of the set content 61, the three editors "Miura", "Sato", and "Tanaka" who are supervised by the director and editor "Itou" can be denoted. In this manner, it is possible to make the hierarchically structured relationship clear by clearly denoting the relationship between the supervisor and the supervised one.

Subsequently, an embodiment of an editing system (hereinafter, referred to as a simultaneous and parallel editing system) for performing a simultaneous and parallel editing work which will be performed by an editor whose role is set in this manner will be described with reference to drawings in FIG. 3 and thereafter.

Configuration Example of Simultaneous and Parallel Editing System

Figure 3:
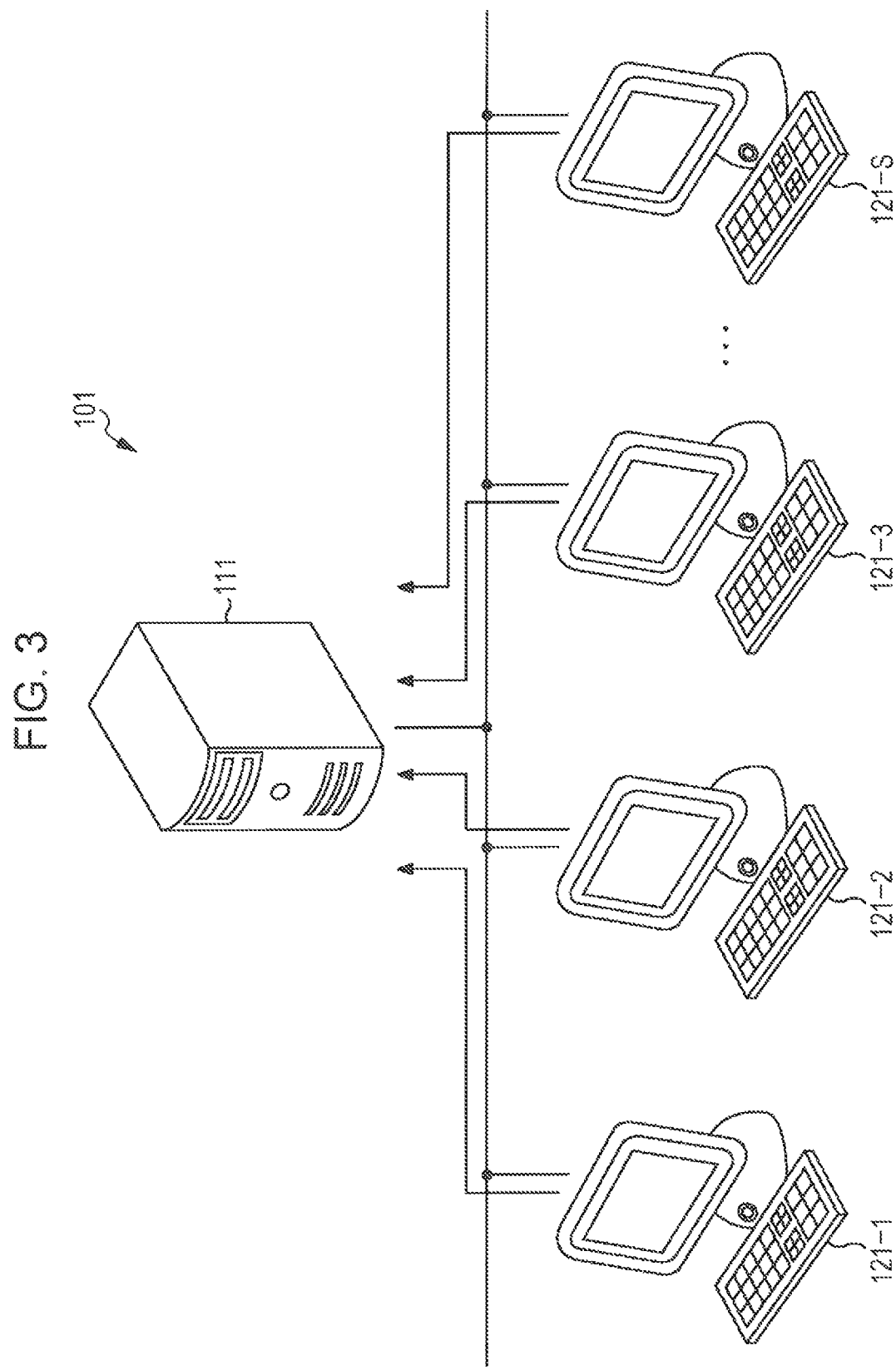
FIG. 3 is a block diagram which shows a configuration example of a simultaneous and parallel editing system.

FIG. 3 is a block diagram which shows a configuration example of the simultaneous and parallel editing system.

As shown in FIG. 3, a simultaneous and parallel editing system 101 includes one Collaboration Client Manager 111 (hereinafter, referred to as a simultaneous and parallel editing client manager 111), and S (S is a natural number of one or more) Collaboration Clients 121 to 121-S (hereinafter, referred to as simultaneous and parallel editing clients 121-1 to 121-S). Each of the simultaneous and parallel editing client manager 111 and simultaneous and parallel editing clients 121-1 to 121-S is connected to each other through a cable, a LAN (Local Area Network), or the like. In addition, when it is not necessary to classify each of the simultaneous and parallel editing clients 121-1 to 121-S, they are collectively referred to as the simultaneous and parallel editing client 121.

The simultaneous and parallel editing client manager 111 performs managing of login information of the simultaneous and parallel editing client 121. The login information of the simultaneous and parallel editing client 121 is information which shows an address or a session state, or the like of the simultaneous and parallel editing client 121.

In addition, the simultaneous and parallel editing client manager 111 performs managing of editing information of the simultaneous and parallel editing client 121, and performs transceiving of the editing information to and from the simultaneous and parallel editing client 121. The editing information of the simultaneous and parallel editing client 121 is a variety of information relating to the simultaneous and parallel editing work such as a material before or after the editing processing, or during the editing processing, information on the work content and allotment, instruction on the editing work, work content of editing, history of the editing work, or the like.

The simultaneous and parallel editing client 121 performs login processing and logout processing with respect to the simultaneous and parallel editing client manager 111. In addition, the simultaneous and parallel editing client 121 performs transceiving of a variety of information such as editing information to and from the simultaneous and parallel editing client manager 111. Further, the simultaneous and parallel editing client 121 includes overall functions which are necessary for the editing work.

For example, the director 11 in FIG. 1 operates the simultaneous and parallel editing client 121-1, the worker 21-1 in FIG. 1 operates the simultaneous and parallel editing client 121-2, and the worker 21-2 (m=2) in FIG. 1 operates the simultaneous and parallel editing client 121-3.

In this case, the simultaneous and parallel editing clients 121-1 to 121-3 transceive a variety of information with each other through the simultaneous and parallel editing client manager 111 by performing the login processing to the simultaneous and parallel editing client manager 111, respectively.

Accordingly, the director 11 is able to respectively supervise the worker 21-1 who operates the simultaneous and parallel editing client 121-2, and the worker 21-2 who operates the simultaneous and parallel editing client 121-3, by operating the simultaneous and parallel editing client 121-1.

The worker 21-1 is able to perform the simultaneous and parallel editing work, by operating the simultaneous and parallel editing client 121-2 under such a control of the director 11. Similarly, a separate worker 21-2 is able to perform the simultaneous and parallel editing work, by operating the simultaneous and parallel editing client 121-3 under such a control of the director 11.

In this manner, the simultaneous and parallel editing system 101 in the example in FIG. 3 has a configuration of a client-server-type, and the simultaneous and parallel editing client manager 111 plays a role of a server. Accordingly, all of the editors who participate in the simultaneous and parallel editing work operate each of the simultaneous and parallel editing clients 121, perform the login processing to the simultaneous and parallel editing client manager 111, and then perform the simultaneous and parallel editing work. In this case, each of the editing information treated in each of the simultaneous and parallel editing clients 121 is transmitted to the simultaneous and parallel editing client manager 111, integrated, and is managed.

Functional Configuration of Simultaneous and Parallel Editing System

Figure 4:
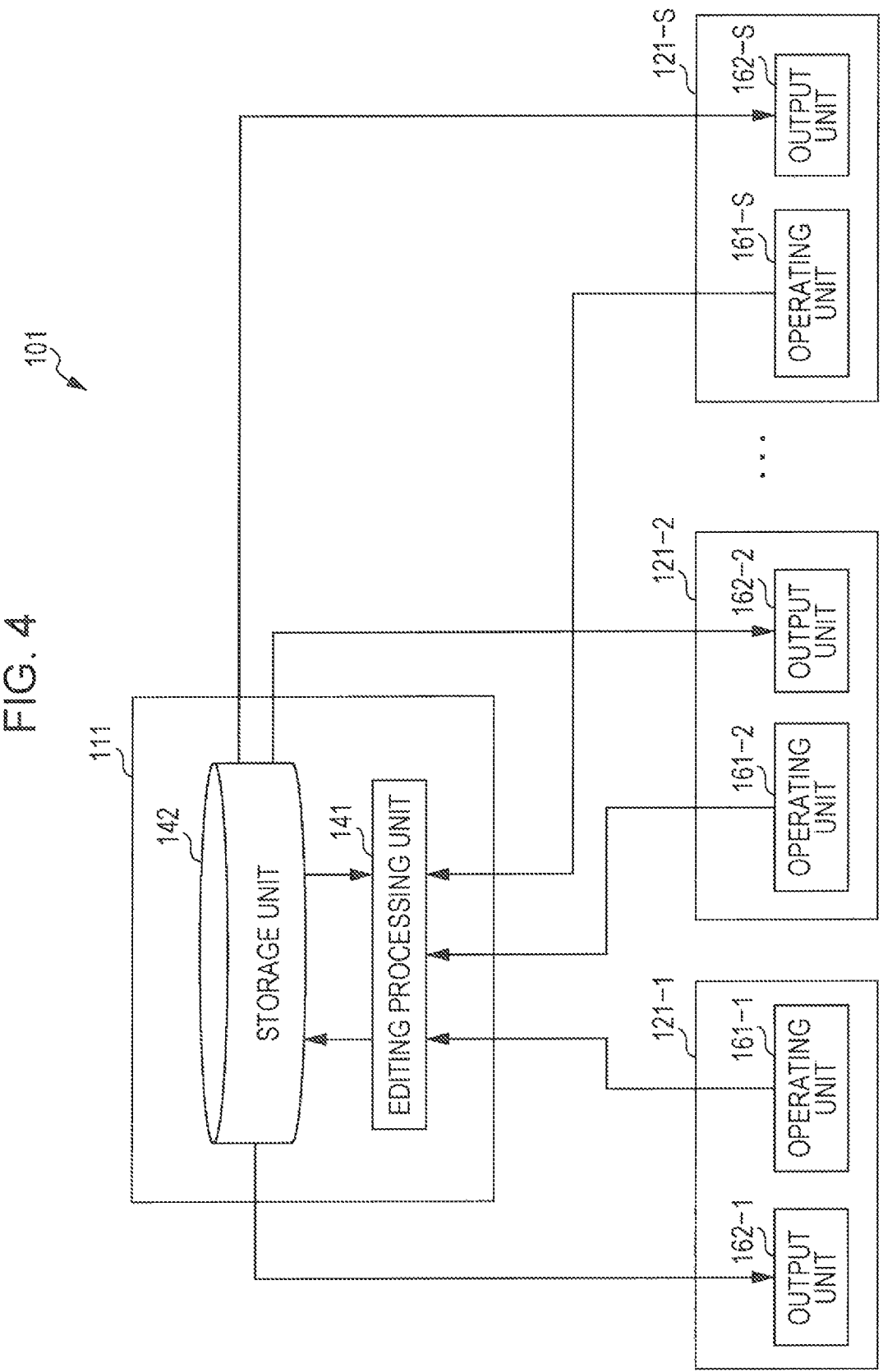
FIG. 4 is a block diagram which shows a functional configuration example of the simultaneous and parallel editing system.

FIG. 4 is a block diagram which shows an example of a functional configuration for demonstrating a function of realizing the simultaneous and parallel editing work, among functions which are included in the simultaneous and parallel editing system 101.

The simultaneous and parallel editing client manager 111 has an editing processing unit 141 and a storage unit 142.

When any one of operating units 161 to 161-S of the simultaneous and parallel editing clients 121-1 to 121-S to be described later transmits a control signal, the editing processing unit 141 receives the control signal, and executes a control relating to a variety of editing processes processing with respect to a material, on the basis of the content thereof. In this manner, it is possible to perform the simultaneous and parallel editing work by two or more editors, since each editing processing of the simultaneous and parallel editing clients 121-1 to 121-S is controlled to be performed as one editing processing in the simultaneous and parallel editing client manager 111 which serves as the server, without being performed independently.

In addition, the control of the editing processing, referred to here may be a control in which the simultaneous and parallel editing client manager 111 serves as a working principal, or may be a control in which any one of the simultaneous and parallel editing clients 121-1 to 121-S serves as the working principal, without being particularly limited to any of working principals of the editing processing. Further, it may be a control in which only one device is the working principal, or may be a control in which a plurality of arbitrary devices is the working principals. In addition, when a device other than the simultaneous and parallel editing client manager 111 is the working principal, a process of transmitting a variety of information involved in the editing processing from one device to another device, or a process of processing or changing a variety of information is also included in a control relating to the editing processing.

The storage unit 142 stores a material in which the editing processing is performed by the editing processing unit 141 as editing information. In addition, the storage unit 142 stores all of information relating to the other simultaneous and parallel editing work as the editing information. Further, the storage unit 142 stores the login information.

The simultaneous and parallel editing client 121-$k$ ($k$ is any one of integer values among 1 to S) has the operating unit 161-$k$ and output unit 162-$k$. In addition, hereinafter, when it is not necessary to classify the operating units 161-1 to 161-S separately, these are collectively referred to as the operating unit 161. In addition, when it is not necessary to classify the output units 162-1 to 162-S separately, these are collectively referred to as the output unit 162.

The operating unit 161 receives various operations which are accompanied by the editing work by the editor, and supplies a control signal corresponding to the operation to the editing processing unit 141.

The output unit 162 generates output data on the basis of the editing information which is stored in the storage unit 142. The output data generated by the output unit 162 is supplied to a display, a speaker, or the like (not shown), thereby outputting corresponding moving images, voice, or the like.

Processing of Simultaneous and Parallel Editing System 101

Subsequently, processing which is executed by each device which constitutes such a simultaneous and parallel editing system 101 will be described.

As described above, the director 11 in FIG. 1 is able to respectively supervise the worker 21-1 who operates the simultaneous and parallel editing client 121-2, and the separate worker 21-2 who operates the simultaneous and parallel editing client 121-3, by operating the simultaneous and parallel editing client 121-1.

In addition, the worker 21-1 and the separate worker 21-2 are able to perform the simultaneous and parallel editing work, by respectively operating the simultaneous and parallel editing client 121-2 and the simultaneous and parallel editing client 121-3, under such a control of the director 11.

Accordingly, hereinafter, the simultaneous and parallel editing client 121-1 is appropriately referred to as the simultaneous and parallel editing client for a director 121-1, and each of the simultaneous and parallel editing clients 121-2 and 121-3 is appropriately referred to as the simultaneous and parallel editing clients for workers 121-2 and 121-3. In addition, for simple description, hereinafter, only the processing of the simultaneous and parallel editing client for the worker 121-2 will be described, however, basically the same processing is applied to the simultaneous and parallel editing client for the worker 121-3.

In addition, the simultaneous and parallel editing client for the director 121-1 and the simultaneous and parallel editing client for the worker 121-2 transceive a variety of information with each other through the simultaneous and parallel editing client manager 111, by respectively logging in to the simultaneous and parallel editing client manager 111. Accordingly, hereinafter, the simultaneous and parallel editing client manager 111 will be appropriately referred to as the simultaneous and parallel editing client manager 111.

Figure 5:
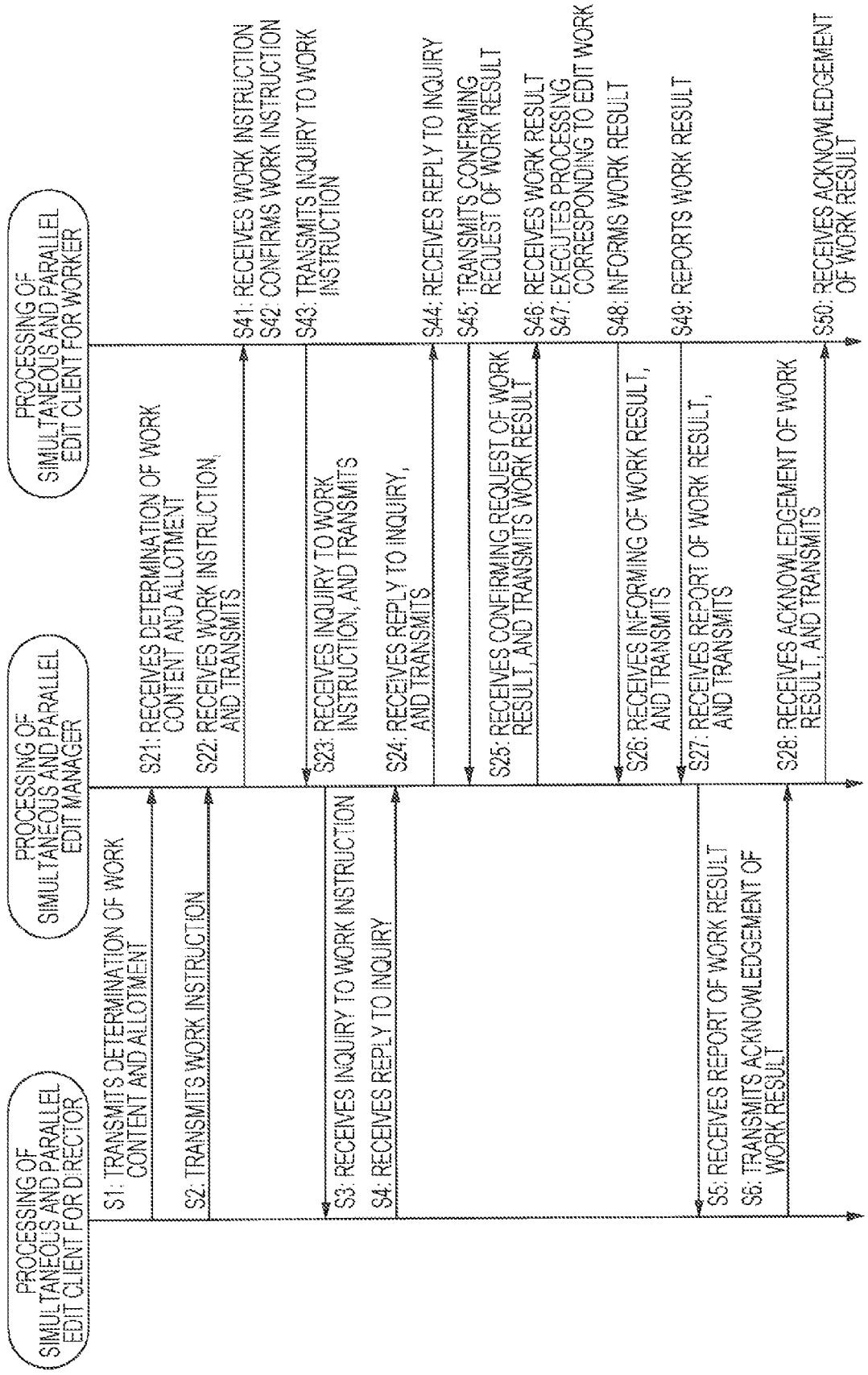
FIG. 5 is a flowchart which shows processing executed by each device which constitutes the simultaneous and parallel editing system.

FIG. 5 is a flowchart which shows a relationship of processing among the simultaneous and parallel editing client for the director 121-1, simultaneous and parallel editing client manager 111, and the simultaneous and parallel editing client for the worker 121-2.

The simultaneous and parallel editing client for the director 121-1 performs logging into the simultaneous and parallel editing client manager 111, and then starts executing of processing according to the flowchart in FIG. 5. The simultaneous and parallel editing client manager 111 starts executing of the processing according to the flowchart in FIG. 5 when there is login processing from the simultaneous and parallel editing client for the director 121-1 or the simultaneous and parallel editing client for the worker 121-2. The simultaneous and parallel editing client for the worker 121-2 executes login processing to the simultaneous and parallel editing client manager 111, and then executes the processing according to the flowchart in FIG. 5.

Determination on Work Content and Allotment

In step S1, the simultaneous and parallel editing client for the director 121-1 receives a determination on work content and allotment by the operation of the director 11, and transmits the determination to the simultaneous and parallel editing client manager 111.

The work contents are various contents of editing work, for example, cut editing, audio multitrack editing, telop input editing, or the like. The allotment means assigning of the determined work content to each worker.

In addition, the simultaneous and parallel editing client for the director 121-1 sets the above described role for each editor, in a plurality of editor groups in which a director and one or more workers (in the example, the director 11 and two workers 21-1 and 21-2) are hierarchically structured, within a range of work content and allotment which is determined in this manner.

The simultaneous and parallel editing client for the director 121-1 is able to further receive a designation of write-inhibited editing information and a designation of editing operation which is usable by a worker, by the operation of the director 11, in order to avoid the conflict of the editing result, when receiving the determination on the work content and allotment due to the operation of the director 11.

The designation of the write-inhibited editing information means, for example, a situation in which a part of the editing information, that is, a clip or a part of tracks to be described later is set to be write-inhibited explicitly, in order to avoid the conflict of the editing result among workers when a plurality of workers is assigned to the same editing work.

The designation of editing operation which is usable by a worker means, for example, in a situation when a predetermined worker is assigned to the telop input editing, that only an editing operation which is necessary for the telop input editing is set to be usable for the worker.

Editing Screen

Figure 6:
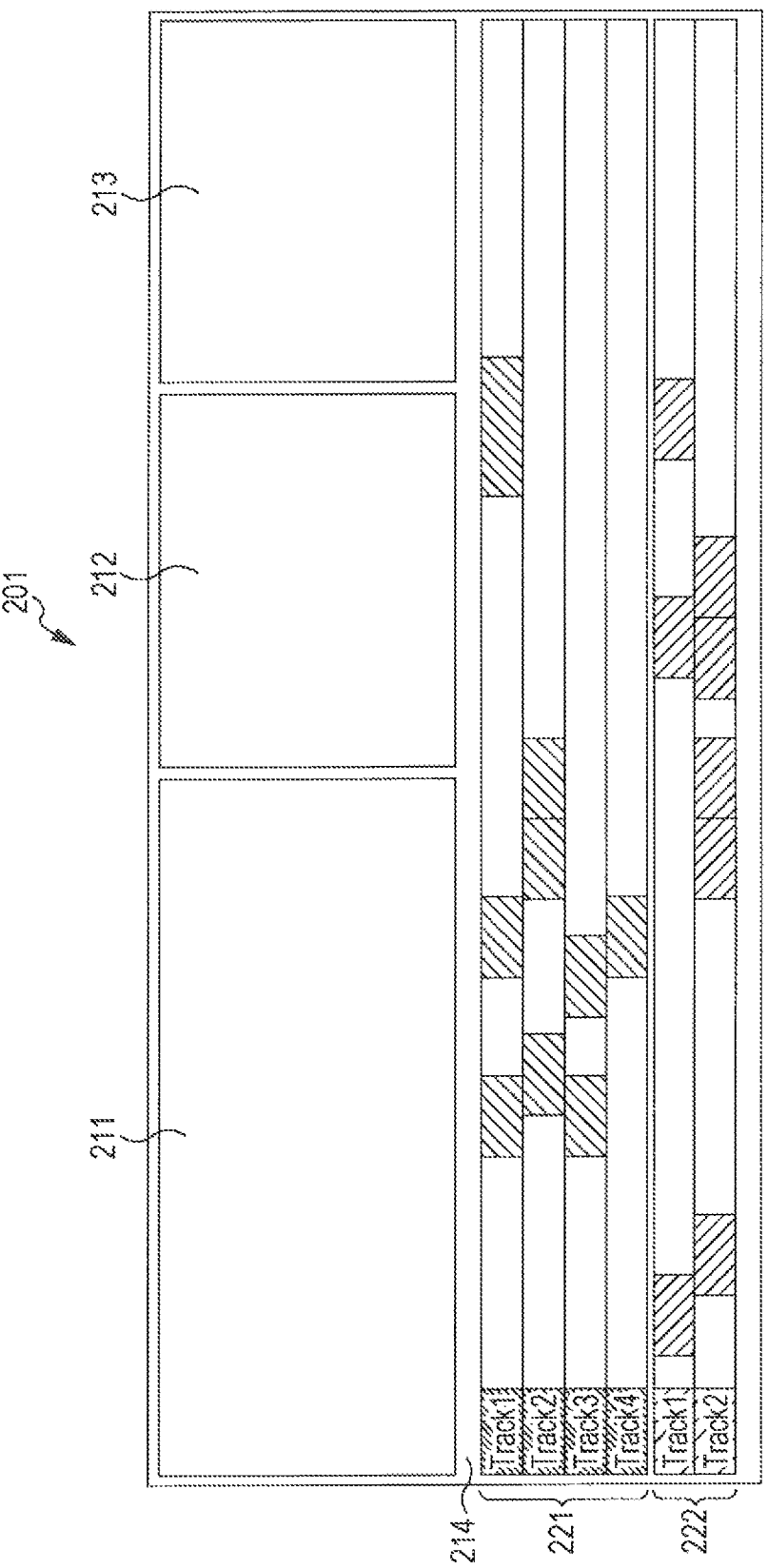
FIG. 6 is a diagram which shows an example of an editing screen.

The editing screen shown in FIG. 6 is respectively displayed on each of displays (not shown) of the simultaneous and parallel editing client for the director 121-1 and the simultaneous and parallel editing client for the worker 121-2, or the like. The director 11 is able to supervise a worker, for example, giving instruction to the worker, confirming the editing work, or the like, by operating the simultaneous and parallel editing client for the director 121-1 while viewing the editing screen. In addition, the worker is able to perform confirming of the instruction from the director 11, editing work, or the like, by operating the simultaneous and parallel editing client for the worker 121-2 while viewing the editing screen.

FIG. 6 is a diagram which shows an example of the editing screen.

An editing screen 201 shown in FIG. 6 includes a managing area 211, a material preview area 212, a timeline preview area 213, and a timeline area 214.

According to the embodiment, as a unit of editing processing in which the editing screen 201 is used, an event is adopted. The event means clip information of a reference source, and a logical clip which maintains two points of time data of an in point and out point which are set with respect to the clip. The clip means information on a material of the reference source, and a logical material which maintains two points of time data of an in point and out point which are set with respect to the material. Accordingly, there may be a case where one material is referred to from a plurality of clips, and further, there may be a case where one clip is referred to from a plurality of events. In addition, even when the clip is deleted, the material of the reference source is not deleted, and even when the event is deleted, the clip of the reference source is not deleted.

In the managing area 211, to be described later, information which shows the instruction on the editing work, a storage location of the material in the simultaneous and parallel editing client manager 111, or the like, is displayed. An image corresponding to a selected material is displayed in the material preview area 212. An image corresponding to an event which is currently being edited, or after being edited in the timeline area 214 is previewed on the display, in the timeline preview area 213. One or more timelines are displayed in the timeline area 214.

The timeline denotes a time axis of contents which are created by an editor. In the timeline, an arrangement of events during or after editing, and the content of the editing processing are displayed in a diagram for each track in time series. The event is displayed by each of rectangular marks which are arranged in the track. One timeline configures one content item. The track is an area for arranging and editing the event, and is classified as a video track for editing image data (that is, still image data or moving image data), an audio track for editing audio data, a CG track for editing CG (Character Generator) data, or the like. The editor is able to perform a variety of editing processes such as performing layering of image data, audio data, CG data, and the like, and adding effects using the track, or overlaying telop or sound track. The editor is able to perform a variety of editing processes such as adding narration to the track, or adding BGM (BackGround Music) to a separate track, by using a plurality of audio tracks. The final content is constructed by composing all of the video track, audio track, CG track, and the like, which are present in the timeline, after such a variety of editing processes.

In the example in FIG. 6, timelines 221 and 222 are displayed in the timeline area 214. Here, for example, the timeline 221 is edited by the worker 21-1, and the timeline 222 is edited by the separate worker 21-2. Tracks 1 to 4 are included in the timeline 221, and tracks 1 and 2 are included in the timeline 222. Accordingly, a first content is configured by composing the tracks 1 to 4 which are included in the timeline 221 by the worker 21-1. On the other hand, a second content which is separate from the first content is configured by composing the tracks 1 and 2 which are included in the timeline 222 by the separate worker 21-2. In addition, by composing the first and the second contents, the final content is constructed as the editing result of the simultaneous and parallel editing work.

Figure 7:
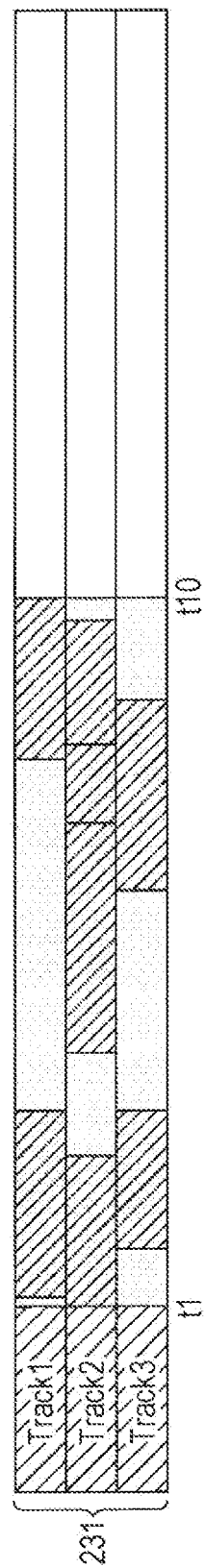
FIG. 7 is a diagram which shows a display example when editing information is designated to be write-inhibited in time axis units.
Figure 8:
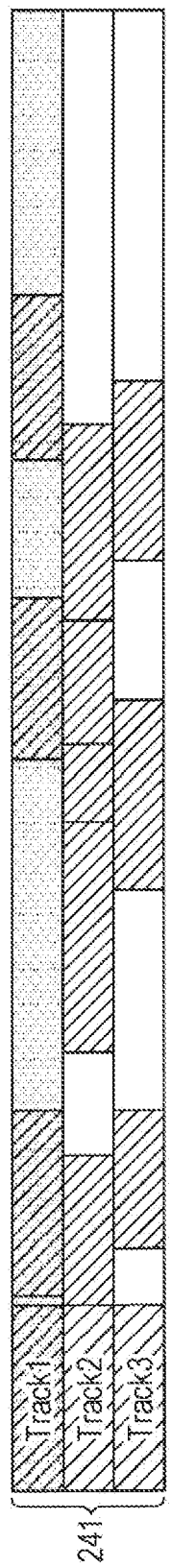
FIG. 8 is a diagram which shows a display example when editing information is designated to be write-inhibited track for track.

When a designation of the above described "Write-inhibited editing information" is performed, for example, the timeline which is displayed in the timeline area 214 is displayed as shown in FIG. 7 or FIG. 8.

FIG. 7 is a diagram which shows a display example of a timeline when the editing information is designated to be write-inhibited in a unit of time axis.

The timeline 231 shown in FIG. 7 is displayed in the timeline area 214 in the editing screen 201 of a device which is operated by a predetermined worker among a plurality of workers, when the plurality of workers is assigned to the same editing work.

For example, a case where the telop input editing is assigned to both the workers 21-1 and 21-2 will be described. In order to avoid the conflict of the editing result, for example, only the worker 21-1 is set to be able to edit the telop input editing with respect to an event which is arranged between time t1 and t10 of the timeline 231. Then, in the timeline 231 which is displayed with respect to the separate worker 21-2, the display format between the time t1 and t10 becomes different from a normal display format, and becomes a display format in which the write-inhibited state is implicitly shown. In the example shown in FIG. 7, the display of the timeline 231 between the time t1 and t10 is shown in dark gray. Accordingly, the separate worker 21-2 can easily find out that the telop input editing is not allowed with respect to the event which is arranged between the time t1 and t10. The timeline of the worker 21-1 between the time t1 and t10 is not displayed with such a dark gray color.

In addition, at this time, the worker 21-1 and the separate worker 21-2 are set to be able to use only the editing operation which is necessary for the telop input editing, since the editing operation which is usable for the worker is designated.

In this manner, when the director 11 designates the write-inhibiting of the editing information in the unit of time axis, the worker is informed of the designated content, and is displayed as shown in FIG. 7. Further, the director 11 is able to designate the write-inhibiting track for track to the editing information. Similarly, even in this case, the worker is informed of the designated content, and this is displayed as shown in FIG. 8.

FIG. 8 is a diagram which shows a display example of a timeline, when the editing information is designated to the write-inhibited state track for track.

The timeline 241 shown in FIG. 8 is displayed in the timeline area 214 in the editing screen 201 of a device which is operated by another worker, when a plurality of editing processes is assigned to one worker.

For example, a case where the video effect editing and the telop input editing are assigned to the worker 21-1 will be described. In order to avoid the conflict of the work result, for example, only the worker 21-1 is set to be able to edit the video effect and telop input with respect to the event which is arranged in the track 1. Then in the timeline 241 which is displayed with respect to another worker, the display format of the track 1 is different from a normal display format, and it becomes a display format in which the write-inhibited state is explicitly shown. In the example shown in FIG. 8, the timeline 241 has a display in which only the track 1 is displayed in dark gray. Accordingly, another worker can easily find out that write is not allowed to the event which is arranged in the track 1.

In addition, since the editing operation which is usable by a worker is designated, at this time, the worker 21-1 is set to be able to use only the editing operation which is necessary for the video effect editing and the telop input editing.

In this manner, by designating the write-inhibited editing information, and the editing operation which is usable by the worker, the allotment of the content of editing work of each worker becomes clear, and it is possible to avoid the conflict of the editing result. In addition, it is possible to clearly communicate the intention of the work instruction of the director 11 to the worker.

Meanwhile, in FIG. 5, in the processing of step S1, when the designation of the above described write-inhibited editing information, of the editing operation which is usable by the worker, and the determination of the work content and the allotment are transmitted to the simultaneous and parallel editing client manager 111 due to the operation of the director 11, the simultaneous and parallel editing client manager 111 executes the processing of step S21. That is, in step S21, the simultaneous and parallel editing client manager 111 receives the determination of the work content and the allotment which is transmitted from the simultaneous and parallel editing client for the director 121-1. The simultaneous and parallel editing client manager 111 causes the storage unit 142 to store the received determination of the work content and the allotment.

Instruction on Work

Meanwhile, in step S2, the simultaneous and parallel editing client for the director 121-1 receives the instruction on work due to the operation of the director 11, and transmits the instruction to the simultaneous and parallel editing client manager 111. That is, the simultaneous and parallel editing client for the director 121-1 is to transfer the work content and the allotment which is determined by the processing in step S1 to the simultaneous and parallel editing client for the worker 121-2, and transmits the work instruction to the simultaneous and parallel editing client manager 111.

Figure 9:
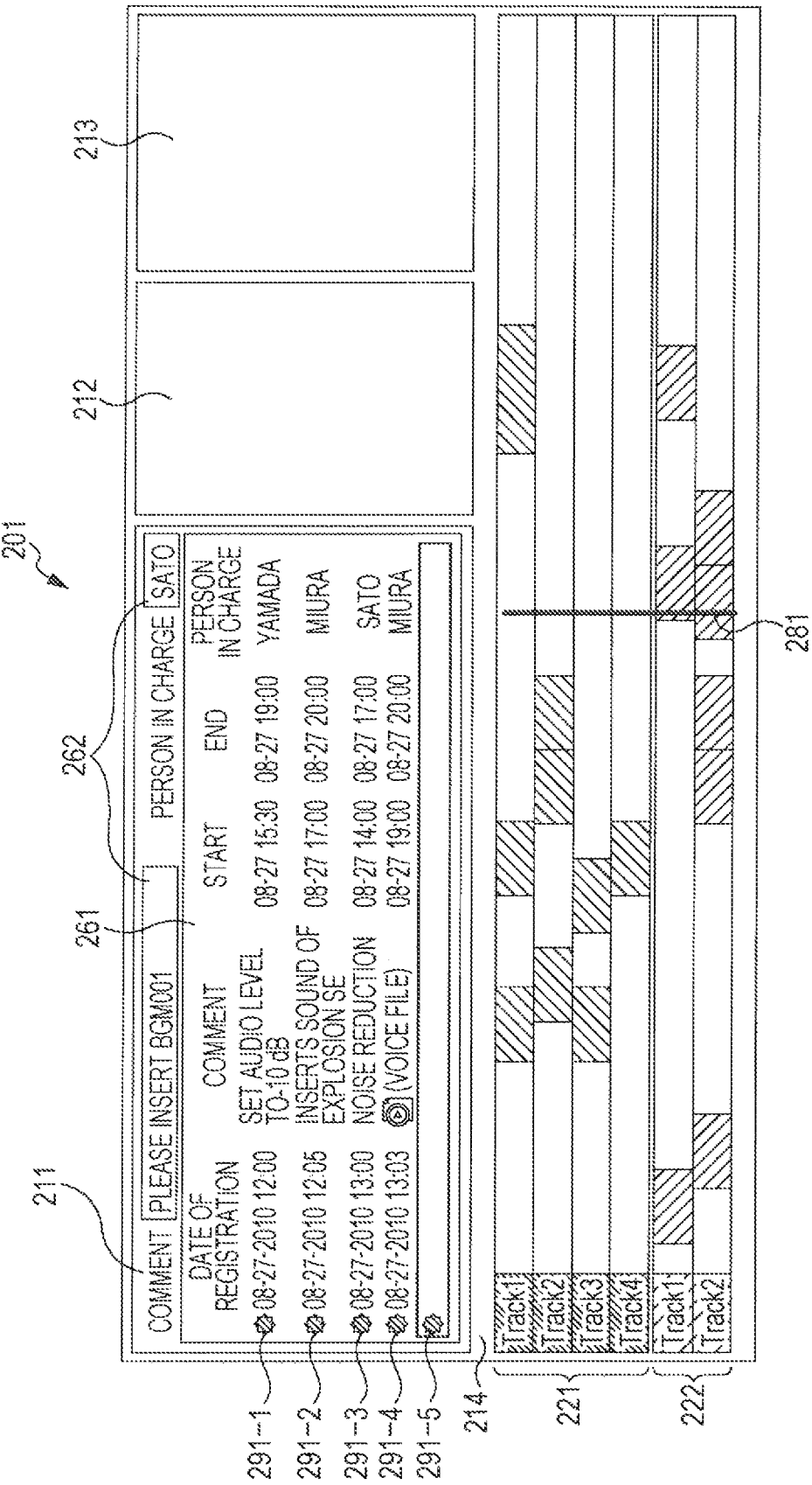
FIG. 9 is a diagram which shows an example of an editing screen which is displayed in a simultaneous and parallel editing client for a director, when a work instruction is made.

When giving instruction on the work, the director 111 operates the editing screen shown in FIG. 9.

FIG. 9 is a diagram which shows an example of the editing screen 201 which is displayed in the simultaneous and parallel editing client for the director 121-1, when the work instruction is made.

An instruction content 261 of the editing work is displayed in the managing area 211 of the editing screen 201 which is shown in FIG. 9. In order to make the work instruction to each worker clearer, a "status of work", "registration date" of the work content, a "comment" on the editing content, time to "start" and "end" the work, and the name of person "in charge" are displayed in the instruction content 261 of the editing work by starting in a new line for each instruction.

In the managing area 211, the "status of work" is displayed as a predetermined mark. To be described later in detail, the status of work means a progress in the editing work of a worker. In the example in FIG. 9, five rows respectively correspond to five work instructions, and respective marks 291-1 to 291-5 are displayed in the head of each row. In addition, when it is not necessary to classify each of the marks 291-1 to 291-5, they are collectively referred to as the mark 291. The color or pattern of the mark 291 changes according to the type of the status of the current work. That is, the director 11 can easily understand the progress of the work regarding the work instruction corresponding to a predetermined row, when viewing the color or pattern of the mark 291 of the predetermined row.

As shown on the fifth row of the managing area 211 in FIG. 9, before giving a work instruction, only the mark 291 showing the state of before undertaking (that is, the mark 291-5 on the fifth row in FIG. 9) is displayed, and the right side thereof is empty. In this state, when the director 11 instructs a predetermined new work, the content of the instruction is input to the entry field 262.

When such an input to the entry field 262 is settled, the input content is reflected in a predetermined row which has not been displayed up to the present, among each of the rows of the instruction content 261 of the editing work. Specifically, in the predetermined row, the settled date and time, the input content of the comment field of the entry field 262, the time to start and end the work, and the input content of the field of the person in charge of the entry field 262, are respectively displayed as "date of registration", "comment", "start" and "end", and a person "in charge" on the right side of the mark 291.

Specifically, according to the first row of the instruction content 261, it is possible to understand that the status of the work is "before undertaking" from the color or pattern of the mark 291. In addition, it is possible to understand that the time when an input of the content of the work instruction is settled is "2010-08-27 12:00" from the display of "date of registration". In addition, it is possible to understand the specific content of the instruction is "setting the audio level to −10 dB" from the display of "comment". Further, it is understood that the time to start the work is "08-27 15:30" from the display of "start", and the time to end the work is "08-27 19:00" from the display of "end". In addition, it is understood that the name of worker who is allocated with the work is "Yamada" from the display of "a person in charge".

Similarly, according to the second row of the instruction content 261, it is possible to understand that the status of the work is "before undertaking". In addition, it is possible to understand that the time when the input of the content of the work instruction is settled is "2010-08-27 12:05". In addition, it is possible to understand the specific content of the instruction is "inserting a sound of explosion SE (Sound Effect)". Further, it is understood that the time to start the work is "08-27 17:00", and the time to end the work is "08-27 20:00". In addition, it is understood that the name of worker who is allocated with the work is "Miura".

Similarly, according to the third row of the instruction content 261, it is possible to understand that the status of the work is "before undertaking". In addition, it is possible to understand that the time when the input of the content of the work instruction is settled is "2010-08-27 13:00". In addition, it is possible to understand the specific content of the instruction is "noise reduction". Further, it is understood that the time to start the work is "08-27 14:00", and the time to end the work is "08-27 17:00". In addition, it is understood that the name of worker who is allocated with the work is "Sato".

Similarly, according to the fourth row of the instruction content 261, it is possible to understand that the status of the work is "before undertaking". In addition, it is possible to understand that the time when the input of the content of the work instruction is settled is "2010-08-27 13:03". In addition, it is possible to understand that the specific instruction is related to audio from the comment in which an audio file is registered. Further, it is understood that the time to start the work is "08-27 19:00", and the time to end the work is "08-27

20:00". In addition, it is understood that the name of worker who is allocated with the work is "Miura".

In addition, the location on the timeline in which respective workers are to perform the editing work is denoted in the play line 281. The play line is a line displayed on the timeline, in order to easily understand a predetermined time location on the timeline. In addition, the play line 281 denotes a reproduction position of the timeline which is previewed in the timeline preview area 213. That is, the events located on the play line 281 are all composed, and are previewed in the timeline preview area 213.

In this manner, when the input of the instruction content 261 is ended, as described above, as processing of step S2 in FIG. 5, the input instruction content is transmitted to the simultaneous and parallel editing client manager 111 as the work instruction.

In step S22, the simultaneous and parallel editing client manager 111 receives the work instruction which is transmitted from the simultaneous and parallel editing client for the director 121-1, and transmits the work instruction to the simultaneous and parallel editing client for the worker 121-2.

In step S41, the simultaneous and parallel editing client for the worker 121-2 receives the work instruction which is transmitted from the simultaneous and parallel editing client manager 111.

Confirming work Instruction

In step S42, the simultaneous and parallel editing client for the worker 121-2 receives the confirmation of the work instruction due to the operation of the worker 21-1.

Figure 10:
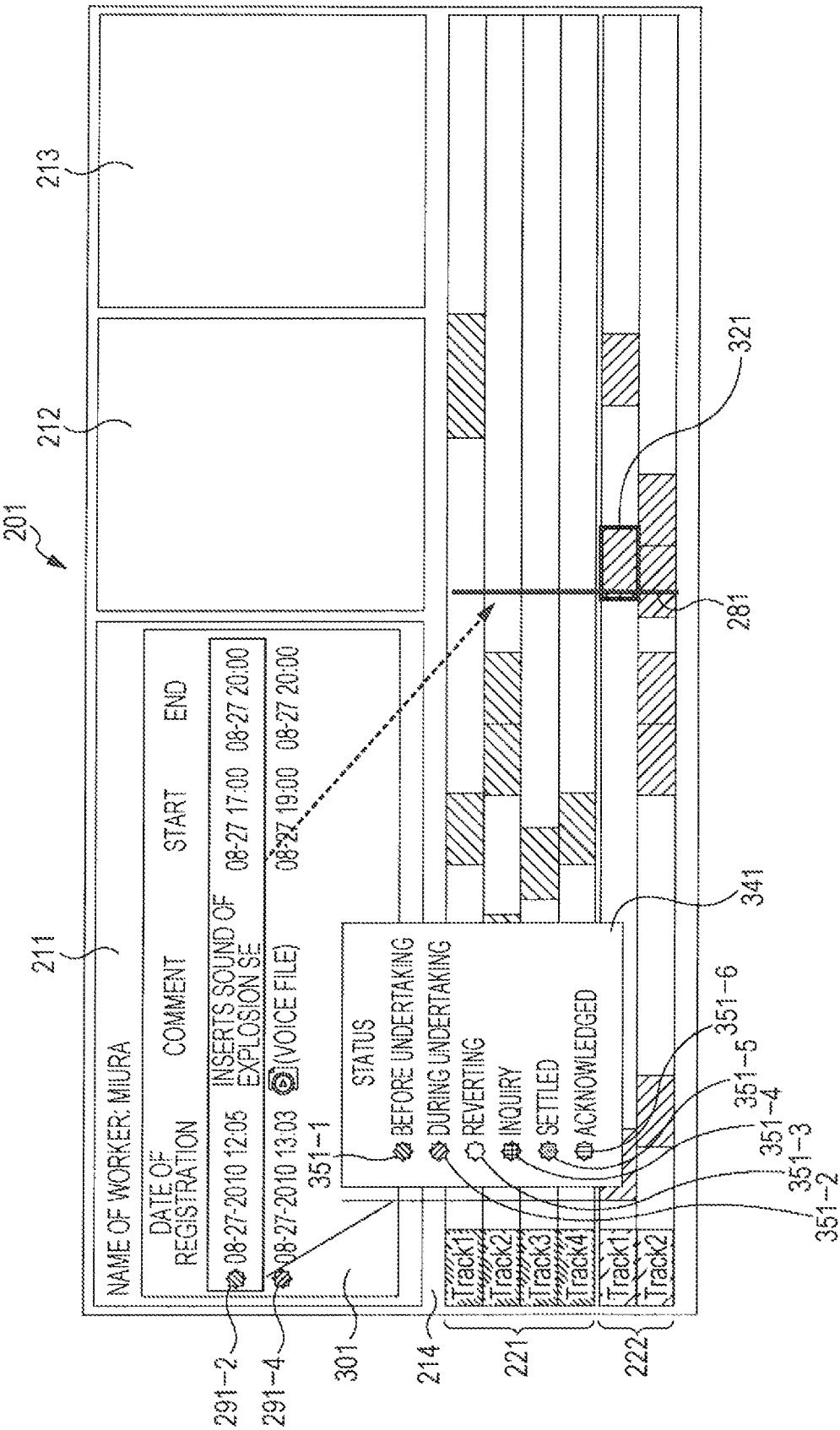
FIG. 10 is a diagram which shows an example of an editing screen which is displayed in a simultaneous and parallel editing client for a worker, when the work instruction is confirmed.

FIG. 10 is a diagram which shows an example of the editing screen 201 which is displayed in the simultaneous and parallel editing client for the worker 121-2, when the work instruction is confirmed.

When the name of the worker 21-1 who operates the simultaneous and parallel editing client for the worker 121-2 is "Miura", as shown in FIG. 10, an instruction content for confirming 301 is displayed in the managing area 211 of the editing screen 201. In the instruction content for confirming 301, only the instruction content of "the person in charge is Miura", that is, only the instruction content on the second row and fourth row is displayed, among the instruction contents which are shown in each row of the instruction content 261 in FIG. 9. In this manner, "Miura" who is the worker 21-1 operating the simultaneous and parallel editing client for the worker 121-2 is able to easily confirm the work instruction for himself, simply by viewing the instruction content for confirming 301.

When a predetermined instruction is selected among instructions which are displayed in the instruction content for confirming 301, the play line 281 moves to a predetermined location on the event of the timeline which corresponds to the predetermined instruction, and in which the worker is to perform the editing work. In addition, the event on the timeline as an editing target is displayed by being changed to a prominent display format so as to be displayed as the selected state.

Specifically, in the example in FIG. 10, an instruction is selected, which is displayed on the first row of the instruction content for confirming 301 (that is, the instruction displayed by the mark 291-2). Here, for example, the instruction is assumed to be "inserting the sound of explosion SE" with respect to the event 321 which is arranged in the timeline 222. In this case, the play line 281 moves to a predetermined position of the event 321 which is arranged on the track 1 of the timeline 222. Then, the event 321 is in a selected state, and is displayed by being changed to a prominent display format.

In this manner, the worker 21-1 is able to easily find a time location on the timeline 222 in which the editing work is to be performed.

In addition, a degree of progress of work corresponding to each instruction is displayed in the instruction content for confirming 301, using the mark 291. That is, the mark 291 changes in the display format (that is, the color and pattern) according to the progress of the worker, and the change of the display format is reflected in the instruction content for confirming 301. Accordingly, the worker 21-1 is able to easily confirm the degree of progress of work to be performed among the instructed works for himself, only by confirming the display format of the mark 291. In addition, even in the instruction content 261 (FIG. 9) on the editing screen 201 of the simultaneous and parallel editing client for the director 121-1 which is operated by the director 11, the display format of the mark 291 is similarly changed according to the degree of progress of the worker. Accordingly, the director 11 can understand the degree of progress of each worker simply by confirming the display format of the mark 291, as well.

For example, the worker 21-1 is able to easily confirm that the degree of progress of the work "inserting the sound of explosion SE" is "before undertaking" from the display format (color or pattern) of the mark 291-2 which is displayed on the first row of the instruction content for confirming 301. In this case, even the director 11 can easily confirm that the degree of progress of the work "inserting the sound of explosion SE" by the worker 21-1 is "before undertaking" from the display format of the mark 291-2 which is displayed on the second row of the instruction content 261 (FIG. 9).

In addition, the worker 21-1 is able to display a work progress list 341 by performing a predetermined operation with respect to the mark 291, when he forgets to make a pattern of the display format of the mark 291 correspond to the status of the work. The work progress list 341 is a list showing the corresponding relationship between the pattern of the display format of the mark 291 and the work status showing each degree of progress of the work. In the example in FIG. 10, it is understood that each of the patterns 351-1 to 351-6 of the display format of the mark 291 correspond to the work status which shows the degree of the progress such as "before undertaking", "during undertaking", "reverting", "inquiry", "settled", and "acknowledged".

In addition, the worker 21-1 is able to easily confirm that the degree of work progress with respect to the instruction on the audio file is "during undertaking" from the display format (color or pattern) of the mark 291-4 which is displayed on the second row of the instruction content for confirming 301. In this case, the director 11 also can easily confirm that the degree of progress of the work with respect to the instruction on the audio file by the worker 21-1 is "during undertaking" from the display format of the mark 291-4 which is displayed on the fourth row of the instruction content 261 (FIG. 9). That is, the mark 291-2 in FIG. 9 is changed from "before undertaking" to "during undertaking" when the worker 21-1 undertakes the work.

In addition, the worker 21-1 is able to inquire relating to the instruction which is displayed in the instruction content for confirming 301 to the director 11.

Inquiry Relating to Work Instruction

In step S43, when there is an inquiry relating to the work instruction by the operation of the worker 21-1, the simultaneous and parallel editing client for the worker 121-2 receives the inquiry, and transmits to the simultaneous and parallel editing client manager 111.

Figure 11:
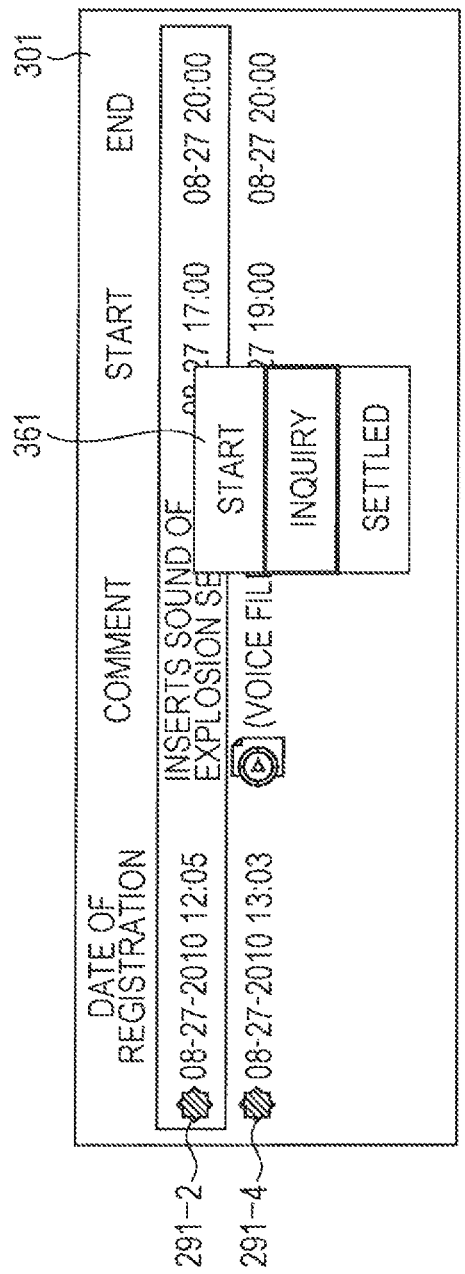
FIG. 11 is a diagram which shows an example of the confirmed instruction content which is displayed in the simultaneous and parallel editing client for the worker when an inquiry is made regarding the instruction.

FIG. 11 is a diagram which shows an example of the instruction content for confirming 301 which is displayed in the simultaneous and parallel editing client for the worker 121-2, when there is an inquiry relating to the instruction.

When a predetermined operation is performed in a state where a predetermined instruction is selected among the instructions displayed in the instruction content for confirming 301, an action list 361 is displayed. The action list 361 is a list of action types which are performed by the worker 21-1. In the example, each item of "start", "inquiry", and "settled" showing the type of action is displayed in the action list 361. The worker 21-1 is able to start the work corresponding to a predetermined instruction, by selecting the item of "start" in the action list 361. The worker 21-1 is able to make an inquiry to the director 11 relating to a predetermined instruction, by selecting the item of "inquiry" in the action list 361. The worker 21-1 is able to report the work result corresponding to a predetermined instruction to the director 11, by selecting the item of "settled" in the action list 361. In addition, the report of the work result will be described later in step S49.

Here, if the item of "inquiry" is selected in the action list 361 in a state where an instruction of an inquiry target is selected, then an entry field (not shown) is displayed. Accordingly, the worker 21-1 inputs the content of the inquiry in the entry field. In this manner, when the content of the inquiry is input in the entry field, and is settled, the content of the inquiry is transmitted to the simultaneous and parallel editing client manager 111:

Here, for example, when the worker 21-1 confirms the "comment" of the instruction (that is, the instruction in which the mark 291-2 is displayed) which is displayed on the first row of the instruction content for confirming 301, that is, the instruction of "inserting the sound of explosion SE", it is assumed that the worker 21-1 does not clearly know which sound of explosion SE it is. In this case, the worker 21-1 selects the instruction displayed on the first row of the instruction content for confirming 301, and selects the item of "inquiry in the action list 361. Here, the worker 21-1 inputs the inquiry of "not clear which sound of explosion SE it is" in the entry field which is not shown at 12:10. Then information on the inquiry "not clear which sound of explosion SE it is", and the time "12:10" when the inquiry was made is transmitted to the simultaneous and parallel editing client manager 111 from the simultaneous and parallel editing client for the worker 121-2, as the processing of step S43 in FIG. 5.

In step S23, the simultaneous and parallel editing client manager 111 receives the inquiry on the work instruction which has been transmitted from the simultaneous and parallel editing client for the director 121-1, and transmits the inquiry to the simultaneous and parallel editing client for the director 121-1.

In step S3, the simultaneous and parallel editing client for the director 121-1 receives the inquiry relating to the work instruction which is transmitted from the simultaneous and parallel editing client manager 111.

FIG. 12 is a diagram which shows the example of the instruction content 261 which is displayed in the simultaneous and parallel editing client for the director 121-1, when the inquiry relating to the work instruction is received.

When there is an inquiry from the worker 21-1, the time when the inquiry is made, and the content of the inquiry are displayed in the instruction content 261. Specifically, in the example, the inquiry of "not clear which sound of explosion SE it is" is made at "12:10" with respect to the instruction "inserting the sound of explosion SE" to the worker 21-1. In this case, a text including the time "12:10" to the worker 21-1 when the inquiry is made, and the content of the inquiry "not clear which sound of explosion SE it is" is displayed on the lower side of the instruction "inserting the sound of explosion SE", that is, the instruction on the second row of the instruction content 261. The director 11 is able to answer such an inquiry.

In step S4, the simultaneous and parallel editing client for the director 121-1 receives the answer for the inquiry due to the operation of the director 11, and transmits the answer to the simultaneous and parallel editing client manager 111.

In step S24, the simultaneous and parallel editing client manager 111 receives the answer for the inquiry which is transmitted from the simultaneous and parallel editing client for the director 121-1, and transmits the answer to the simultaneous and parallel editing client for the worker 121-2.

In step S44, the simultaneous and parallel editing client for the worker 121-2 receives the answer for the inquiry which is transmitted from the simultaneous and parallel editing client manager 111.

In this manner, the worker 21-1 is able to operate the simultaneous and parallel editing client for the worker 121-2, confirm the instruction of the director 11 as the processing of step S41 in FIG. 5, and further make an inquiry about the instruction of the director 11, as the processing of step S43 in FIG. 5, when it is necessary in a case where the instruction content is not clear even after the confirmation, or the like. The worker 21-1 is able to understand the instruction content clearly, by receiving the answer for the inquiry as the processing of step S44 in FIG. 5.

Since the instruction relating to the editing work to the worker 21-1 from the director is not one way, and the worker 21-1 is able to make an inquiry relating to the instruction, the worker 21-1 is able to appropriately perform the editing work after clearly understanding the instruction content.

In FIG. 5, only the processing of the simultaneous and parallel editing client for the worker 121-2 which is operated by the worker 21-1 is shown, however, in practice, there is a case where the processing of the simultaneous and parallel editing client for the worker 121-2 which is operated by the separate worker 21-2 is executed, as well.

Basically, even when the worker 21-1 performs his own editing work independently from the editing work of the separate worker 21-2, the conflict of the editing result is not created in the embodiment. However, the worker 21-1 is able to perform his own editing operation while confirming the work result of the separate worker 21-2, or after confirming the work result.

Confirming of Work Result

The worker 21-1 is able to operate the simultaneous and parallel editing client for the worker 121-2, and to ask the simultaneous and parallel editing client manager 111 to confirm the work result of the separate worker 21-2.

In this case, in step S45 in FIG. 5, the simultaneous and parallel editing client for the worker 121-2 receives the request for confirming the work result due to the operation of the worker 21-1, and transmits the request to the simultaneous and parallel editing client manager 111.

Here, the request timing for confirming the work result includes two timings of the above described explicit timing, and implicit timing. It is possible for the simultaneous and parallel editing client manager 111, or the simultaneous and parallel editing client for the worker 121-2 (in addition, the simultaneous and parallel editing client for the worker 121-3) to be able to arbitrarily set any one of the timings, or both the timings. The explicit timing means, for example, a timing when an operation button, or key which instructs the request of confirming of the work result is operated. The implicit timing means, for example, a timing when the number of times of editing operations, or the number of operating times of the key exceed a predetermined times, or a timing at regular intervals which is preset. Accordingly, by setting the number of times of the operation of the editing and key to once, the editing work of another worker is sequentially reflected in the editing screen 201 of the worker who has requested the confirmation of the work result.

In the example, the request for confirming the work result is made at the timing in step S45, and is transmitted to the simultaneous and parallel editing client manager 111 from the simultaneous and parallel editing client for the worker 121-2.

Subsequently, in step S25, the simultaneous and the parallel editing client manager 111 receives the request for confirming the work result which is transmitted from the simultaneous and parallel editing client for the worker 121-2. Even though it is not shown in FIG. 5, the request for confirming is further transmitted from the parallel editing client manager 111 to the simultaneous and parallel editing client for the worker 121-3 which is operated by the separate worker 21-2. The simultaneous and parallel editing client for the worker 121-3 receives the request for confirming, and transmits the work result of the editing work by the separate worker 21-2 to the simultaneous and parallel editing client manager 111. When receiving the work result by the separate worker 21-2, the simultaneous and parallel editing client manager 111 transmits the result to the simultaneous and parallel editing client for the worker 121-2.

In this manner, the work result which is transmitted to the simultaneous and parallel editing client for the worker 121-2 is necessary to be the result in which the work result of the simultaneous and parallel editing work which is performed by a plurality of workers (workers 21-1 and 21-2 in the example) is sequentially reflected. That is, since it is necessary for the worker 21-1 to understand the change in time in the event due to the editing work of the separate worker 21-2, differently from the case of independently performing the editing work, it is necessary to transmit such an understandable work result to the simultaneous and parallel editing client for the worker 121-2.

Accordingly, in the embodiment, the work result of the separate worker 21-2 is transmitted from the simultaneous and parallel editing client for the worker 121-3 such that it is possible to display a portion which has not changed after the previous confirmation on the timeline area 214, or a display is available in which the difference from the work result of the separate worker 21-2 can be easily compared, in the editing screen 201 of the simultaneous and parallel editing client for the worker 121-2 which is operated by the worker 21-1.

Subsequently, in step S46 in FIG. 5, the simultaneous and parallel editing client for the worker 121-2 receives the work result of the separate worker 21-2, and appropriately performs the display shown in FIGS. 13 to 15. The worker 21-1 is able to progress his own editing work while confirming the work result of the separate worker 21-2.

Figure 13:
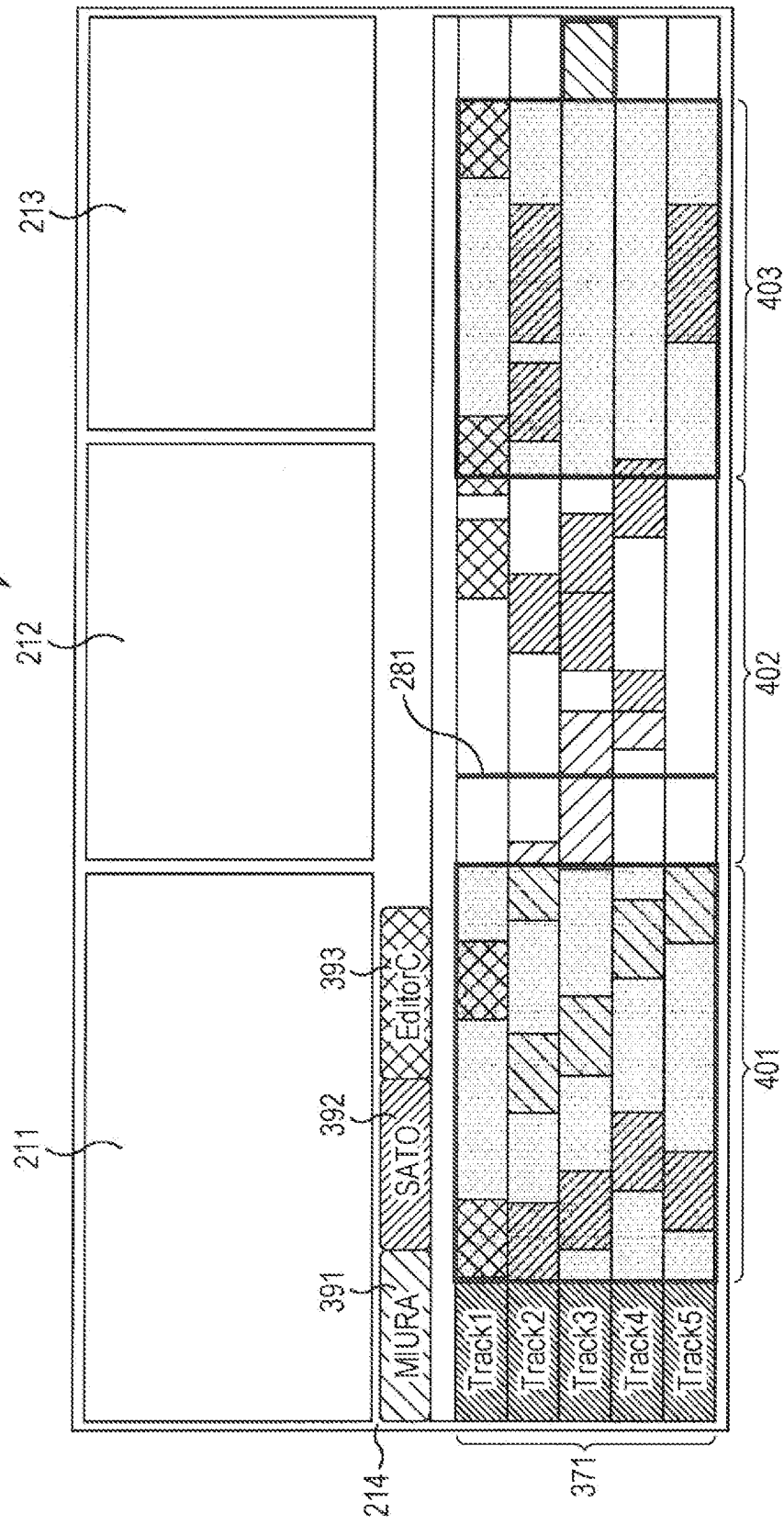
FIG. 13 is a diagram which shows an example of a portion which is not changed after the previous confirmation.

FIG. 13 is a diagram which shows an example of a display which is based on such a work result of the separate worker 21-2, and is a display of the portion which has not changed after the previous confirmation on the timeline area 214.

As shown in FIG. 13, respective timelines of a plurality of workers (that is, the workers 21-1 and 21-2 in the example) who perform the simultaneous and parallel editing work are displayed as a timeline 371 by being overlapped, in the simultaneous and parallel editing client for the worker 121-2 who has requested confirming of the work result.

In the timeline 371 in the example in FIG. 13, the events of which editing work is allotted to each of the plurality of workers are denoted by different patters respectively, so as to be distinguished from another worker. Each pattern which is assigned to each worker corresponds to each color or each pattern of tabs 391 to 393 in which the name of each worker is displayed. Specifically, in the example in FIG. 13, the event which is allotted to "Miura" who is the worker 21-1 is displayed by a pattern of the tab 391 in which "Miura" is displayed, that is, the right diagonal lines. Similarly, the event which is allotted to "Sato" who is the separate worker 21-2 is displayed by a pattern of the tab 392 in which "Sato" is displayed, that is, the left diagonal lines. In addition, even though the simultaneous and parallel editing client for the director 121, or the like is not shown, in a case where a separate worker with a name of "Editor C" further performs the simultaneous and parallel editing, the pattern of the tab 393 in which the "Editor C" is displayed, that is, the lattice pattern is displayed.

Here, a range on the timeline 371 where the worker 21-1 who has requested confirming of the work result is already confirmed, and is not changed after the previous confirmation (hereinafter, referred to as a confirmed range) is displayed by a different display format from a range to be confirmed by the worker 21-1 (hereinafter, referred to as a range to be confirmed). For example, in the example in FIG. 13, the confirmed ranges 401 and 403 are highlighted. In addition, in the drawing, for convenience, the highlight is displayed by a light shading pattern, and is displayed by a display format which is different from the range to be confirmed 402.

The worker 21-1 who has requested confirming of the work result is able to easily recognize that the region has been previously confirmed, and a region where there is no change in the work result due to the editing work of all other workers (that is, the worker 21-2 in the example) from the previous confirmation to the current confirmation, by viewing the highlighted state of the confirmed ranges 401 and 403.

In other words, even if it is a confirmed range in the past, for the range where there is a change in the work result due to the editing work by another worker from the previous confirmation to the current confirmation, the highlight is removed.

The worker 21-1 is able to easily find out the time change in the event due to the editing work of another worker without omission, only by viewing that the range on the timeline 371 which has not changed after the previous confirmation is displayed by a different display format from others.

In this manner, according to the embodiment, in the editing screen 201 of the simultaneous and parallel editing client for the worker 121-2 which is operated by the worker 21-1, the work result of the separate worker 21-2 is transmitted from the simultaneous and parallel editing client for the worker 121-3, such that it is possible to display a portion which has not changed after the previous confirmation on the timeline area 214, or a display is available in which the difference from the work result of the separate worker 21-2 can be easily compared, in the editing screen 201 of the simultaneous and parallel editing client for the worker 121-2 which is operated by the worker 21-1.

In this case, the example of displaying based on such a work result of the separate worker 21-2, and the example of displaying a portion which has not changed after the previous confirmation on the timeline area 214 are the above described example shown in FIG. 13. On the other hand, the separate example of a display based on such a work result of the separate worker 21-2, as the example of a display of which difference in the work result from another worker in the timeline area 214 can be easily compared are the example shown in FIG. 14 or FIG. 15.

Figure 14:
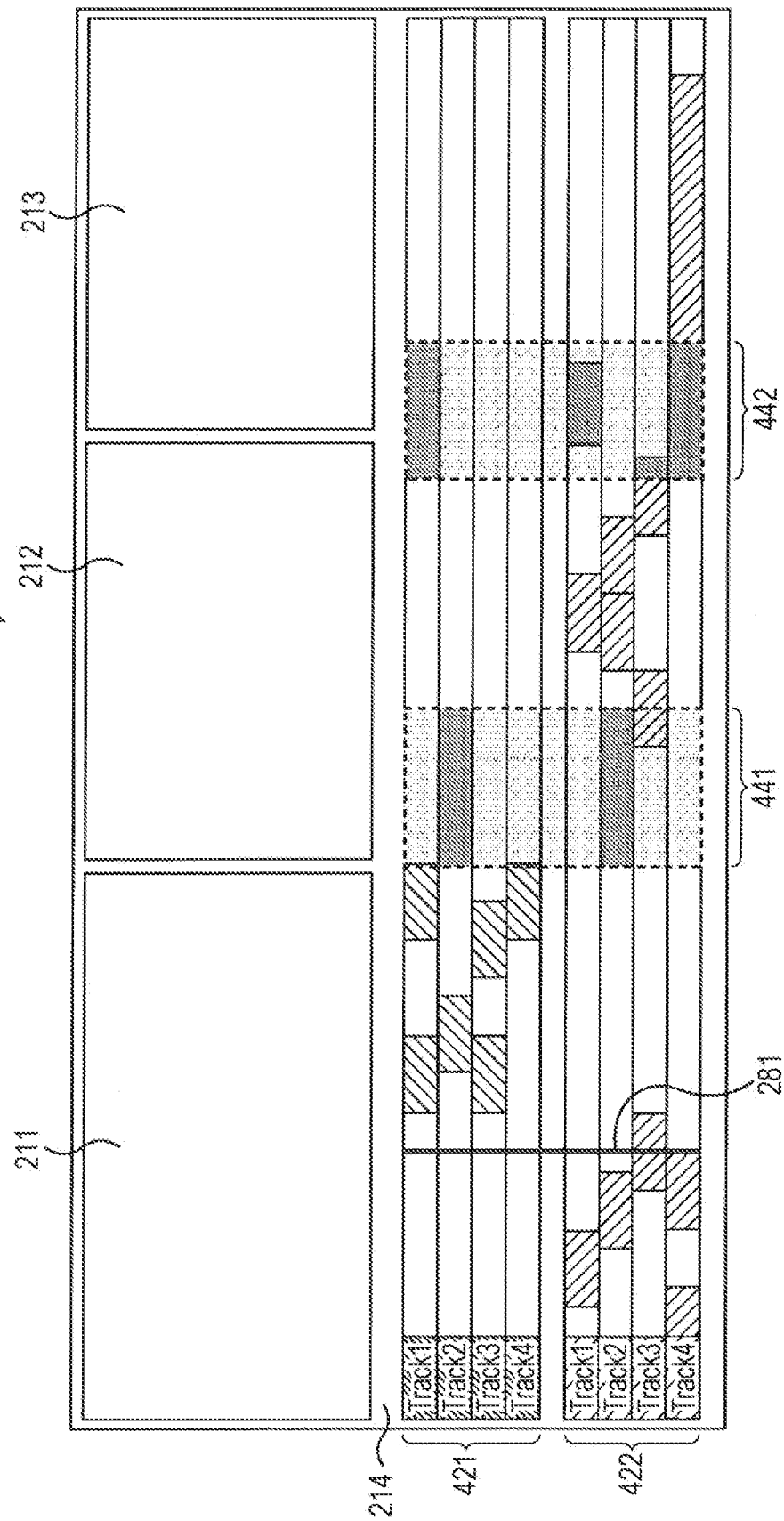
FIG. 14 is a diagram which shows an example of a display in which a difference of a work result from that of another worker can be easily compared.

That is, FIG. 14 is a diagram which shows an example of a display in which the difference from the work result of another worker on the timeline area 214 can be easily compared.

It is necessary to confirm the different portion while comparing the plurality of editing results, in order for the plurality of workers to perform the simultaneous and parallel editing work cooperatively. Accordingly, the respective timelines of the plurality of workers who are performing the simultaneous and parallel editing work (that is, the workers 21-1 and 21-2 in the example) are displayed to be aligned vertically. Specifically, in the example in FIG. 14, respective timelines 421 and 422 are displayed to be aligned vertically, in the simultaneous and parallel editing client for the worker 121-2 who has requested confirming of the work result. At this time, the timelines 421 and 422 are displayed in a synchronized state automatically.

In addition, when there is a range in which the timelines 421 and 422 are compared to each other, and are conflicting, the region is displayed in a different display format from another range where there is no conflict, as a conflicting region. For example, in the example in FIG. 14, the conflicting regions 441 and 442 are highlighted. Further, in the drawing, for convenience, the display of highlight is expressed by a light shading pattern, and is displayed by a different display format from another range where there is no conflict.

In addition, the events included in the conflicting ranges 441 and 442 are displayed by a different display format from other events. For example, in the example in FIG. 14, the events are displayed in eye-catching color. Further, in the example in FIG. 14, the events included in the conflicting ranges 441 and 442 are displayed in light gray, and are displayed in a different format from other events which are included in the range where there is no conflict.

The worker 21-1 who has requested confirming of the work result is able to easily recognize that the range is a range where there is a conflict of the work result with another worker, by viewing the state where the conflicting ranges 441 and 442 are highlighted.

When there are conflicting ranges 441 and 442, it may be a state where it is difficult to determine which editing result is output in preference to another. For example, the conflict of a timeline is created when there is not the order of priority in the editing work between workers. Accordingly, when the conflicting ranges 441 and 442 are positively present, the director 11 is able to avoid the conflict, for example, by setting the order of priority of the editing work of one worker high.

In FIG. 14, the respective timelines of the plurality of workers are displayed vertically so that it is possible to easily compare the difference in the work result from another worker on the timeline area 214. However, the display in which it is possible to easily compare the difference in the work result from another worker on the timeline area 214 is not limited to this.

Figure 15:
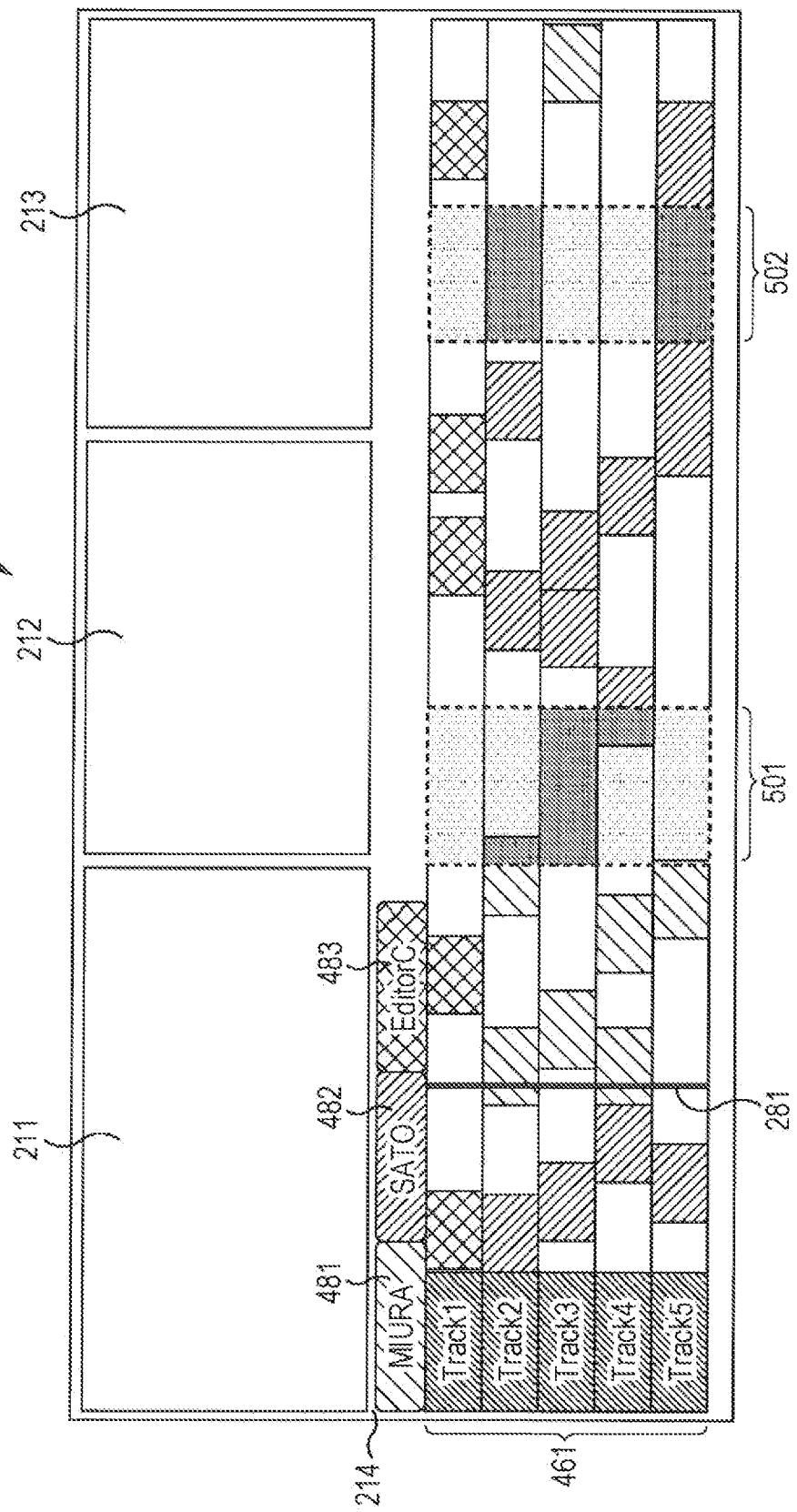
FIG. 15 is another example of a display in which a difference of a work result from that of another worker can be easily compared.

FIG. 15 is a diagram which shows an example of a display in which it is possible to easily compare the difference in the work result from another worker on the timeline area 214, and shows a different example from the example in FIG. 14.

In the example in FIG. 15, respective timelines of a plurality of workers (that is, the workers 21-1 and 21-2 in the example) who perform the simultaneous and parallel editing work are displayed as a timeline 461 by being overlapped, in the simultaneous and parallel editing client for the worker 121-2 who has requested confirming of the work result, in order to easily compare the plurality of work results.

In the timeline 461 of the example in FIG. 15, similarly to the example in FIG. 13, the events of which the editing work is allotted to each of the plurality of workers are respectively displayed in a different color or pattern so as to be distinguished from another worker. In the example in FIG. 15, similarly to the example in FIG. 13, each pattern which is assigned to each worker "Miura", "Sato", and "Editor C" corresponds to each pattern of the tabs 481 to 483 in which the name of each worker is displayed.

Here, similarly to FIG. 14, the conflicting ranges 501 and 502 are displayed by different display formats from other ranges where there is no conflict. In addition, the events included in the conflicting ranges 501 and 502 are displayed by a different display format from other events.

The worker 21-1 who has requested confirming of the work result is able to easily recognize that the range is a range where there is a conflict of the work result with another worker, by viewing the state where the conflicting ranges 501 and 502 are highlighted.

In addition, in order to find out the conflict of the work result, for example, a conflicting portion on the timeline may be displayed using the play line 281. In that case, the director 11 and each worker are able to find out the conflict in the work result quickly and effectively, by adding functions, for example, such as "moving the play line to the subsequent conflicting portion", "moving the play line to the previous conflicting portion", or the like.

Editing Work

In this manner, in step S46 in FIG. 5, the simultaneous and parallel editing client for the worker 121-2 receives the work result of the separate worker 21-2, and appropriately performs the above described display as shown in FIGS. 13 to 15. The worker 21-1 is able to perform his own editing work while referring to, using, or confirming the work result of the separate worker 21-2, by viewing such a display.

In this case, in step S47, the simultaneous and parallel editing client for the worker 121-2 executes processing corresponding to the editing work due to the operation of the worker 21-1.

Here, as a method of the editing work due to the operation of the worker 21-1, there are three methods as follows. A first method is a method where the editing work is performed while referring to the work result of another worker. A second method is a method where the editing work is performed by using the work result of another worker as a material. A third method is a method where the editing work is performed while confirming the change in the work result of another worker.

First, the first method will be described using FIGS. 16 to 18.

Figure 16:
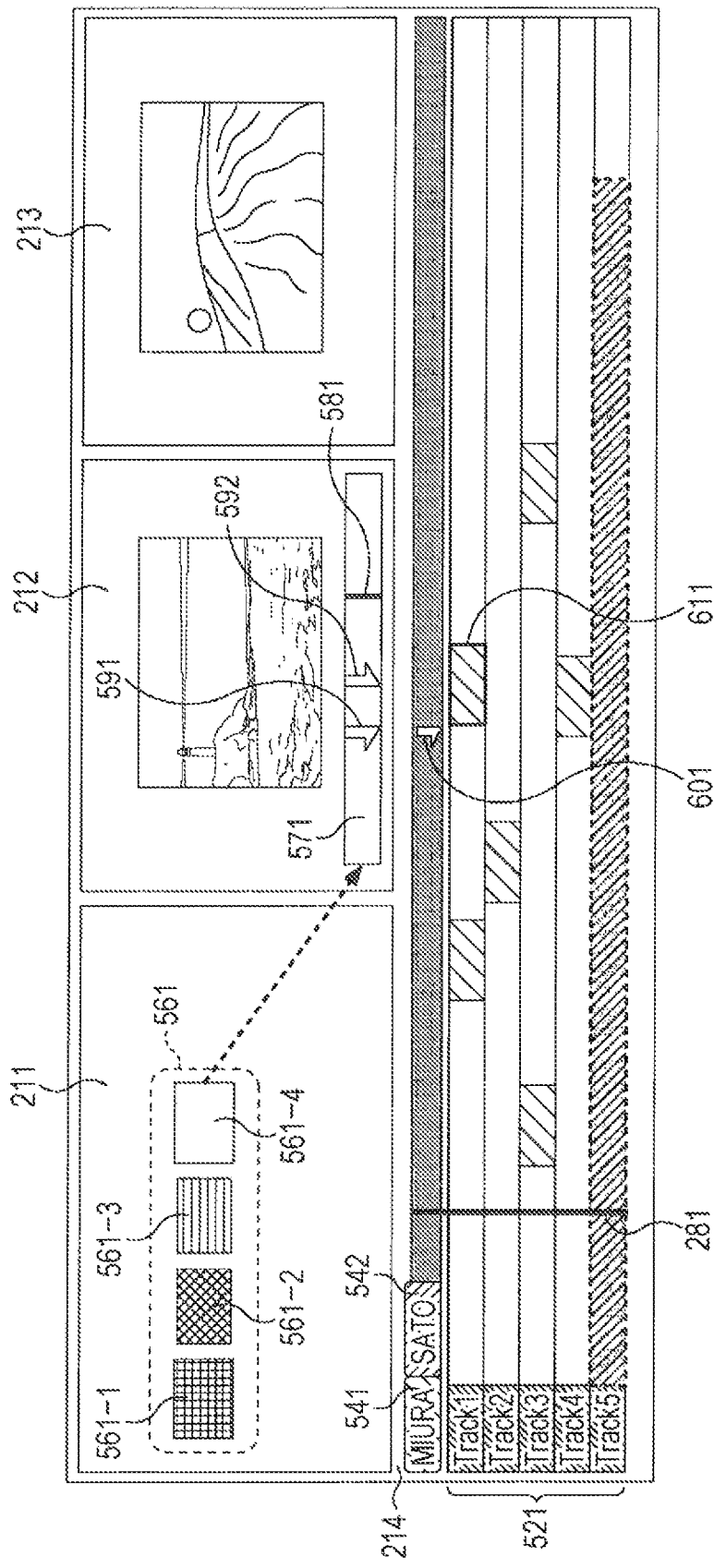
FIG. 16 is a diagram which shows an example of a display of an editing screen when an editing work is performed while referring to a work result of another worker.

FIG. 16 is a diagram which shows an example of a display of an editing screen when the editing work is performed while referring to the work result of another worker.

In the managing area 211, the material which is used in the editing work by the worker 21-1 is displayed, for example, using a tree structure, like the display using Explorer (a trade mark) which is made by Microsoft so that the storage location of the material in the simultaneous and parallel editing client manager 111 is to be recognized. In the example shown in FIG. 16, a plurality of materials 561-1 to 561-4 used in the editing work of the worker 21-1 is displayed managing area 211.

At least a part of the material 561-4 which is selected in the material group 561 is arranged as the clip 571, and is previewed, in the material preview area 212. The worker 21-1 is able to determine a portion which is used in the editing work in the clip 571, by referring to the display line 581 which shows the preview reproduction position of the clip 571. The worker 21-1 sets the in point 591 and out point 592 with respect to the clip 571, and cuts out an image therebetween. In addition, the worker 21-1 sets the in point 601 on the timeline 521, and arranges the image which is cut out from the clip 571 on the track 1 of the timeline 521 of the timeline area 214 as the event 611.

As shown in FIG. 16, in timeline area 214, a timeline of another worker (that is, the worker 21-2 in the example) is arranged in one track which is included in the timeline 521 of the worker 21-1. That is, the track 5 in which the tracks 1 to 4 of the worker 21-1, and the timeline of the separate worker 21-2 are arranged is included in the timeline 521. At this time, the timeline of the separate worker 21-2 is a timeline in which all of the plurality of tracks included in the timeline are composed and displayed.

For example, the editing work such as telop input editing, MA editing, or the like is performed with respect to a material to which the cut editing is performed. Accordingly, for example, when the telop input editing is assigned to the worker 21-1, and the cut editing is assigned to the separate worker 21-2, the worker 21-1 can perform the telop input editing while referring to the timeline of the separate worker 21-2.

Specifically, in the example in FIG. 16, the worker 21-1 is able to determine a location of the telop to be input on the timeline while referring to the image of the work result of the separate worker 21-2, by displaying the timeline of the separate worker 21-2 to be previewed in the timeline preview area 213.

At this time, the timeline of the separate worker 21-2 is set to be write-inhibited, accordingly, it is possible to prevent the work result from being changed by the worker 21-1.

In FIG. 16, the timeline of the separate worker 21-2 is displayed by being included in the timeline of the worker 21-1 so that it is possible to perform the editing work while referring to the work result of the separate worker 21-2. However, the display for performing the editing work while referring to the work result of the separate worker 21-2 is not limited to this.

Figure 17:
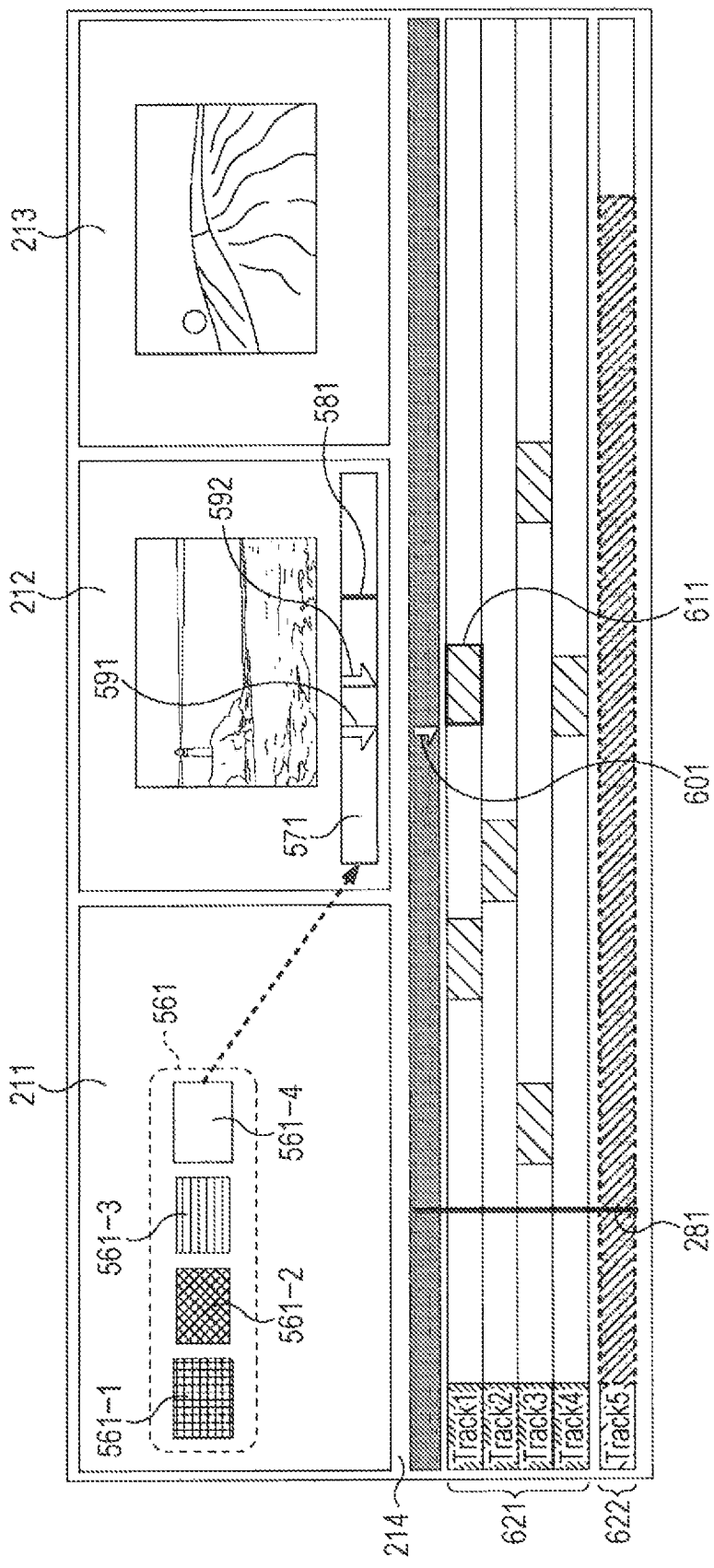
FIG. 17 is a diagram which shows another example of a display of an editing screen when the editing work is performed while referring to a work result of another worker.

FIG. 17 is an example of a display of an editing screen when the editing work is performed while referring to the work result of another worker, and is a different example from the example in FIG. 16.

In the example in FIG. 17, the timelines of the worker 21-1 and the separate worker 21-2 are displayed to be aligned vertically so that the editing work is performed while referring to the work result of another worker (that is, the worker 21-2 in the example). Specifically, in the example in FIG. 17, a timeline 621 of the worker 21-1 and a timeline 622 of the separate worker 21-2 are aligned to be displayed vertically. At this time, the timeline 622 of the separate worker 21-2 is a timeline in which all of the plurality of tracks included in the timeline 622 are composed and displayed.

In the example in FIG. 17, as well, the worker 21-1 is able to determine the location on the timeline to perform the editing work while referring to an image of the timeline 622 of the separate worker 21-2, by displaying the timeline 622 of the separate worker 21-2 to be previewed in the timeline preview area 213.

At this time, it is possible to prevent the work result from being changed due to the worker 21-1, by setting the timeline 622 of the separate worker 21-2 to be write-inhibited. In the example in FIG. 17, the timeline 622 of the separate worker 21-2 is displayed to be clearly separated from the timeline 621 of the worker 21-1. Accordingly, the worker 21-1 is able to intuitively understand that the timeline 622 of the separate worker 21-2 is write-inhibited, by comparing to the example in FIG. 16.

In the examples in FIGS. 16 and 17, the timeline of the separate worker 21-2 which is referred to by the worker 21-1 is a timeline in which all of the plurality of tracks included in the timeline are composed and displayed. However, the display for performing the editing work while referring to the work result of the separate worker 21-2 is not limited to this.

Figure 18:
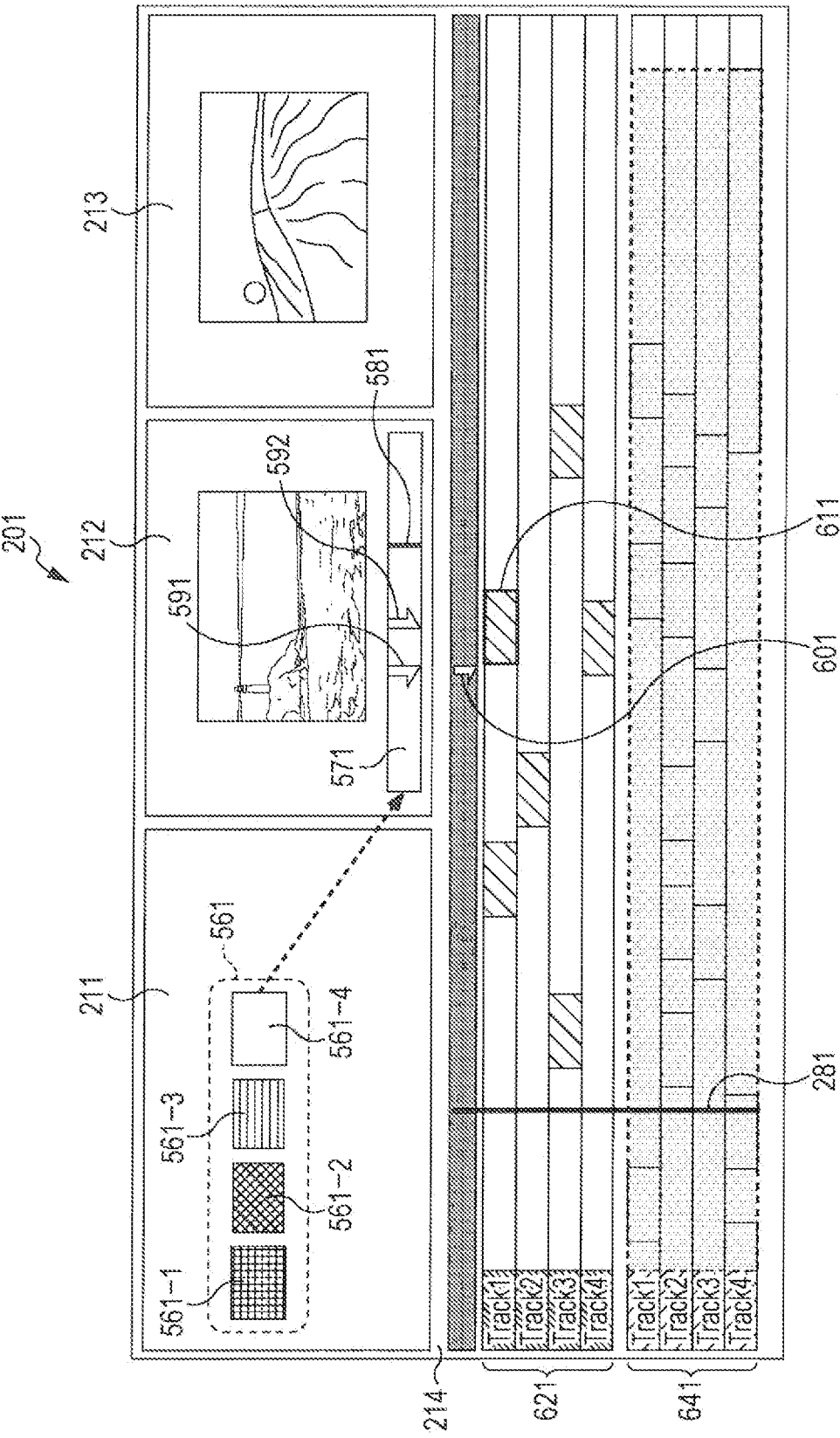
FIG. 18 is a diagram which shows another example of a display of an editing screen when the editing work is performed while referring to a work result of another worker.

FIG. 18 is a diagram of an example of a display of an editing screen when the editing work is performed while referring to the work result of another worker, which shows a different example from the examples in FIGS. 16 and 17.

In the example in FIG. 18, timelines including the timeline of the worker 21-1 and the timeline including a display of the track of the separate worker 21-2 are aligned to be displayed vertically so that the editing work is performed while referring to the work result of another worker (the worker 21-2 in the example). Specifically, in the example in FIG. 18, a timeline 621 of the worker 21-1 and a timeline 641 of the separate worker 21-2 are aligned to be displayed vertically. At this time, in the timeline 641 of the separate worker 21-2, all of the plurality of tracks 1 to 4 which are included in the timeline 641 are displayed.

In the example in FIG. 18, as well, the worker 21-1 is able to determine a location on the timeline to perform the editing work while referring to an image of the timeline 641 of the separate worker 21-2, by displaying the timeline 641 of the separate worker 21-2 to be previewed in the timeline preview area 213.

At this time, by setting the timeline 641 of the separate worker 21-2 to be write-inhibited, it is possible to prevent the work result from being changed by the worker 21-1. In the case of the example in FIG. 18, the tracks 1 to 4 are displayed in the timeline 641 of the separate worker 21-2. Accordingly, the worker 21-1 is able to perform his own editing work while understanding the detail of the editing work on the timeline 641 of the separate worker 21-2.

The first method in the editing work which was described using the FIGS. 16 to 18 is a method in which the editing work of the worker 21-1 is performed on the basis of the work result of another worker. Accordingly, the first method is suitable for editing work in which the editing work of another worker becomes the main one.

Subsequently, the second method will be described using FIGS. 19 and 20.

Figure 19:
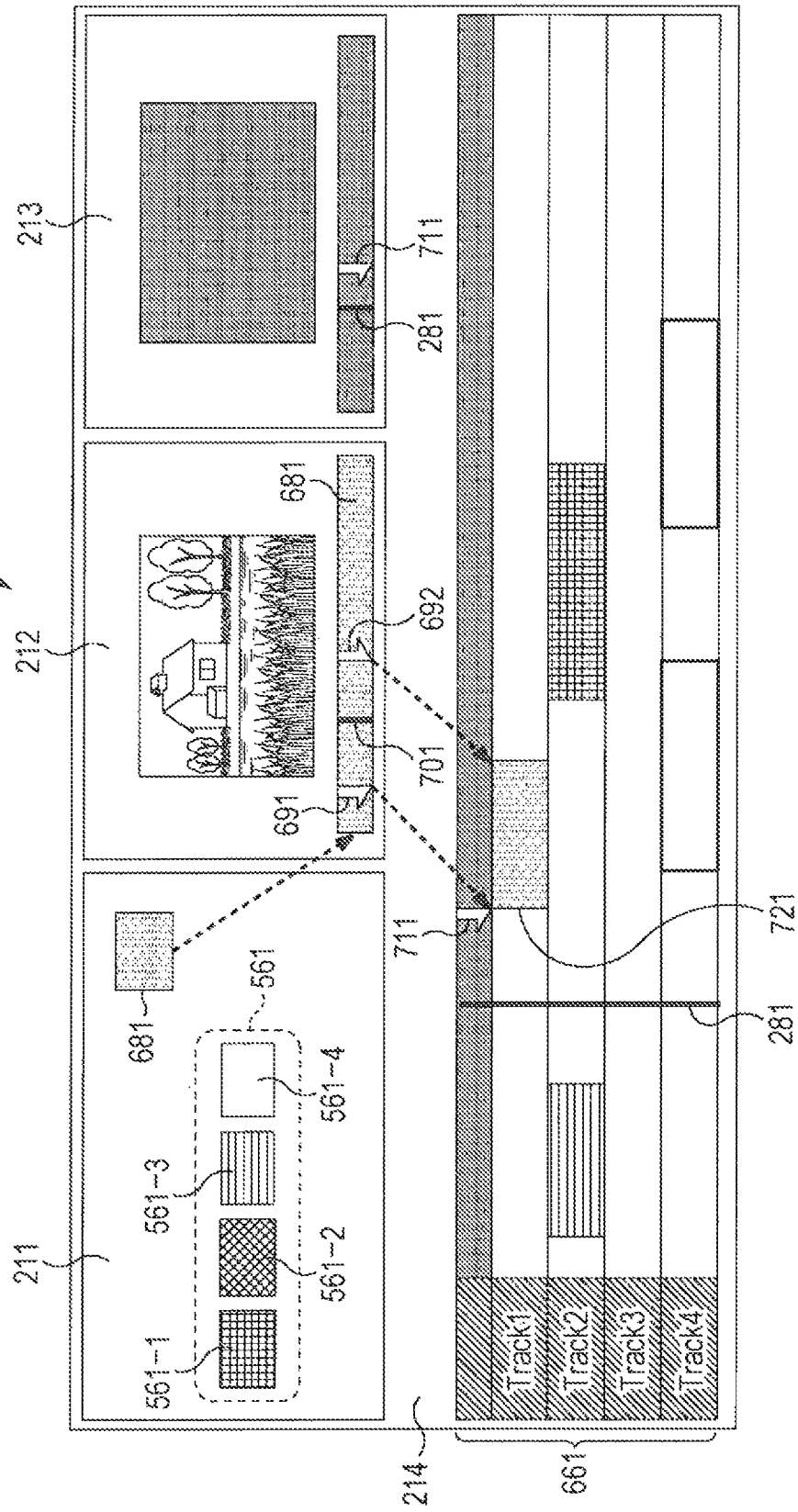
FIG. 19 is a diagram which shows an example of a display of an editing screen when the editing work is performed by using the work result of another worker as a material.

FIG. 19 is a diagram which shows an example of a display of an editing screen when the editing work is performed using the work result of another worker as a material.

In the managing area 211, a plurality of materials of 561-1 to 561-4 which is used in the editing work of the worker 21-1 is displayed as a material group 561. In addition, in the managing area 211, a timeline 681 of another worker (the worker 21-2 in the example) is displayed as a material which can be used by the worker 21-1. The timeline 681 of the separate worker 21-2 is a timeline in which all of the plurality of tracks which are included in the timeline are composed. The timeline 681 of the separate worker 21-2 is displayed when the simultaneous and parallel editing client for the worker 121-3 due to the operation of the worker 21-2 has informed the work result. In addition, for the notification of the work result, it will be described later in step S48.

A material which is selected in the timeline 681 of the material group 561 and the separate worker 21-2 is displayed to be previewed in the material preview area 212. Specifically, in the example in FIG. 19, the timeline 681 of the separate worker 21-2 is selected, and is displayed to be previewed in the material preview area 212. The worker 21-1 is able to determine a portion which is used in the editing work in the timeline 681, by referring to a display line 701 which shows a reproduction position of a display of a preview of the timeline 681. The worker 21-1 sets the in point 691 and the out point 692 with respect to the timeline 681, and cuts out an image therebetween. In addition, the in point 711 is set on the timeline 661, and the image which is cut out from the timeline 681 is arranged on the track 1 on the timeline 661 of the timeline area 214 as the event 721.

As shown in FIG. 19, the event 721 which is cut out from the timeline 681 of the separate worker 21-2 is arranged on the track 1 on the timeline 661, in the timeline area 214. The worker 21-1 is able to perform the editing work of the timeline 661 while displaying the preview of the timeline 661 including the event 721, in the timeline preview area 213.

The play line 281 which shows the reproduction position of the preview of timeline 661, and the in point 711 of the event 721 are displayed in the timeline preview area 213. Accordingly, the worker 21-1 is able to perform the editing work of the timeline 661, by referring to the reproduction position of the preview of the timeline 661, and the in point of the event 721. That is, the worker 21-1 is able to perform his own editing work using the editing result of the separate worker 21-2 as a material.

In the example in FIG. 19, as the timeline 681 of the separate worker 21-2, all of the plurality of tracks included in the timeline are composed and displayed so that it is possible to perform the editing work using the work result of another worker as a material. However, the display for performing the editing work using the work result of another worker as a material is not limited to this.

Figure 20:
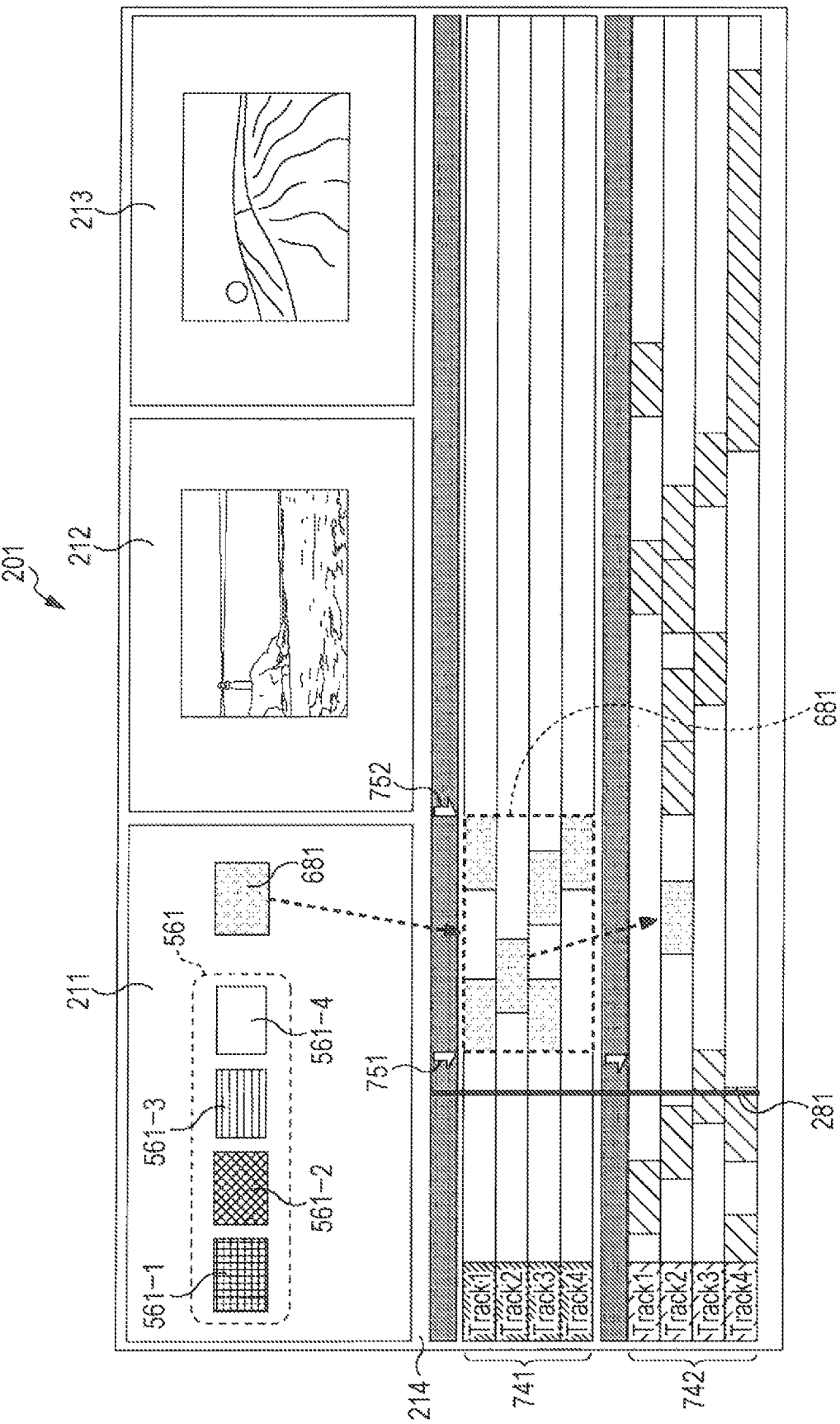
FIG. 20 is a diagram which shows another example of a display of the editing screen when the editing work is performed by using the work result of another worker as a material.

FIG. 20 is a diagram of an example of a display of an editing screen when the editing work is performed using the work result of another worker as a material, and which shows a different example from the example in FIG. 19.

In the example in FIG. 20, a timeline of the worker 21-1 and a timeline of the separate worker 21-2 are aligned to be displayed vertically so that the editing work is performed while referring to the work result of another worker (the worker 21-2 in the example). Specifically, in the example in FIG. 20, a timeline 741 for displaying the timeline 681 of the separate worker 21-2 is displayed to be aligned vertically on the timeline 742 of the worker 21-1.

The worker 21-1 sets the in point 751 and the out point 752 with respect to the timeline 741, and arranges the timeline 681 of the separate worker 21-2 on the timeline 741. In the example in FIG. 20, it is understood that the tracks 1 to 4 are included in the timeline 681 of the separate worker 21-2, from the display of the timeline 741. The event which is included in the timeline 681 of the separate worker 21-2 is arranged in the tracks 1 to 4 of the timeline 741.

The worker 21-1 selects an event which is used in the editing on the timeline 741. In addition, the worker 21-1 sets the in point and out point on the timeline 742 for his own editing work, or arranges the selected event by operating the track. That is, the worker 21-1 is able to perform his own editing work by using the editing result of the separate worker 21-2 as a material.

In the example in FIG. 20, the tracks 1 to 4, and the event which is arranged in the track are displayed in the timeline 741 for displaying the timeline of the separate worker 21-2. Accordingly, the worker 21-1 is able to use the editing result of the separate worker 21-2 while understanding the detail of the editing work of the timeline 681 of the separate worker 21-2.

In the second method of the editing work which is described using FIGS. 19 and 20, the work result of another worker is used in the editing work of the worker 21-1, on the basis of the work result of the worker 21-1. Accordingly, the second method is suitable for editing work in which the editing work of the worker 21-1 has priority.

When the worker 21-1 performs the editing work using the work result of another worker as a material, by using the second method, even when there is a change in the work result of another worker thereafter, it is not reflected in the work result of worker 21-1. Accordingly, when the worker 21-1 is to perform the editing work using the change as a material while reflecting the change in the work result of another worker, the third method in below is suitable.

The third method will be described using in FIG. 21.

Figure 21:
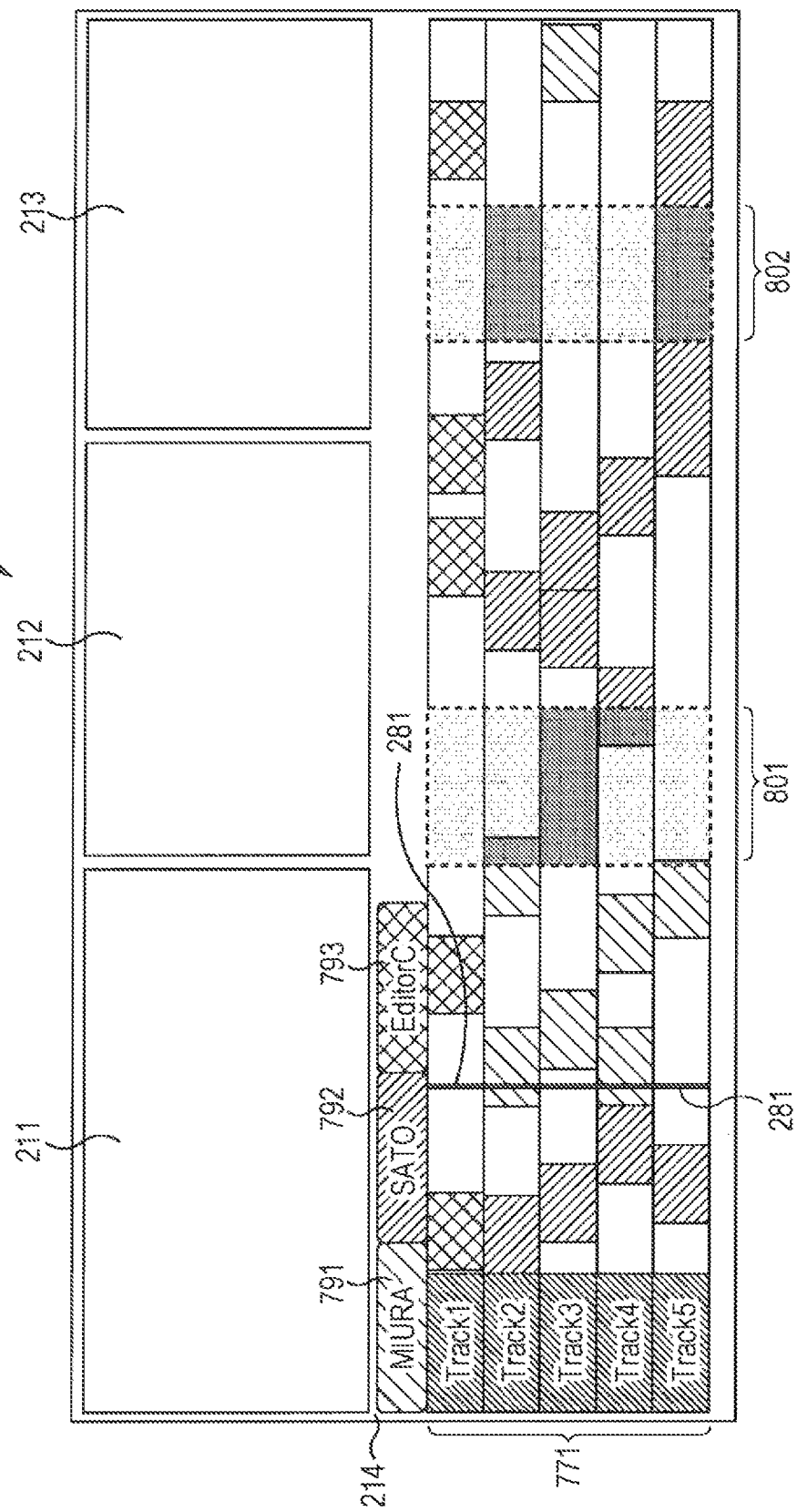
FIG. 21 is a diagram which shows an example of a display of the editing screen when the editing work is performed while confirming the change in the work result of another work.

FIG. 21 is a diagram which shows an example of a display of an editing screen in a case where the worker 21-1 performs the editing work while confirming the change in the work result of another worker.

In the example in FIG. 21, respective timelines of the plurality of workers who are performing the simultaneous and parallel editing (that is, the workers 21-1 and 21-2 in the example) are overlapped with each other, and are displayed as the timeline 771, in the simultaneous and parallel editing client for the worker 121-2 which is operated by the worker 21-1 so that the change in the editing result of another worker is to be confirmed.

Similarly to the example in FIG. 15, in the timeline 771 in FIG. 21, the event of which editing work is allotted to the plurality of workers, respectively, is displayed with different patterns respectively, so as to be distinguished from another worker. Each pattern which is assigned to each worker corresponds to each pattern of tabs 791 to 793 in which the name of each worker is displayed.

Figure 22:
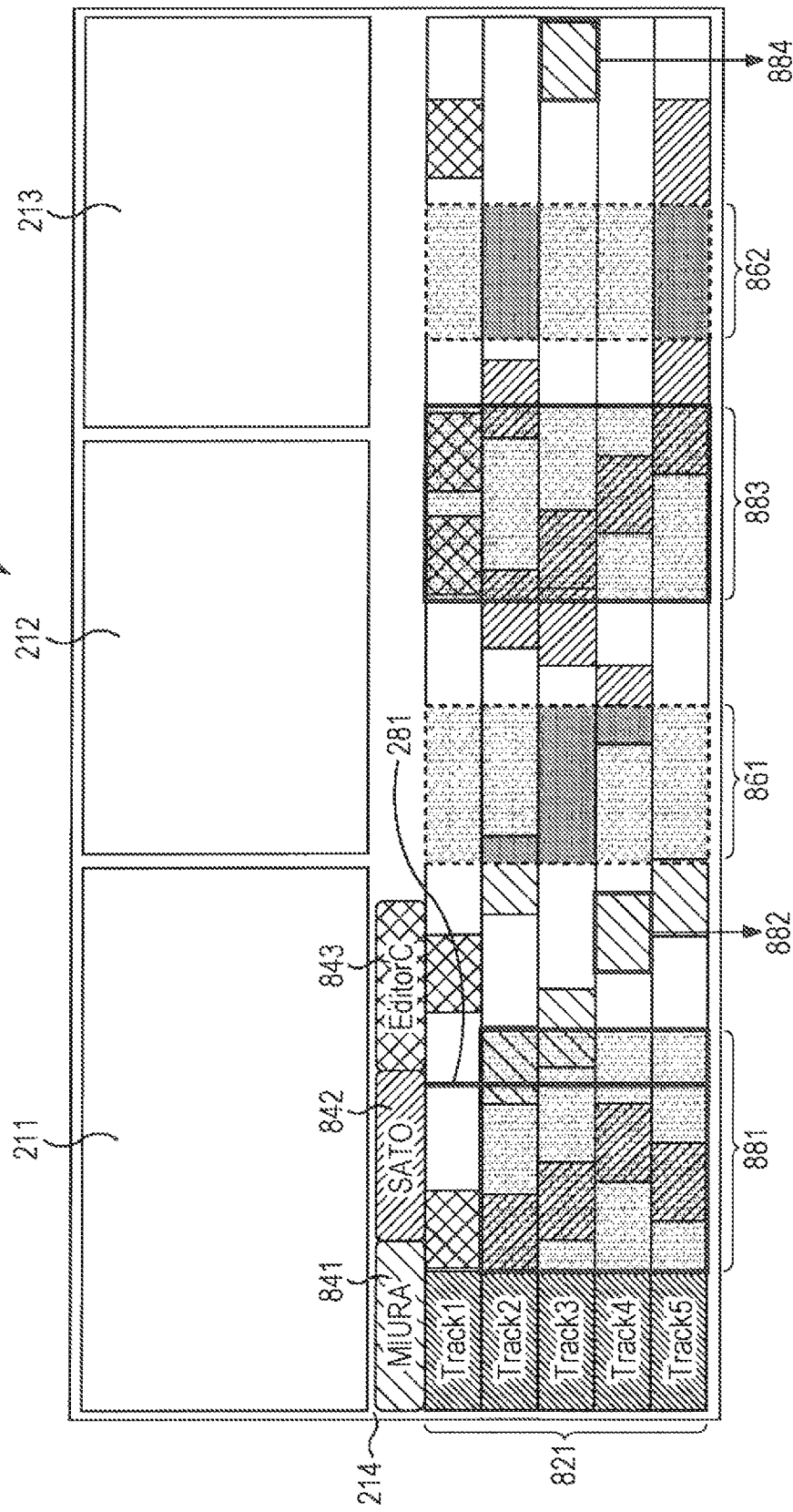
FIG. 22 is a diagram which shows an example of a display of a portion where the work is determined or not determined.

In the example in FIG. 21, the worker 21-1 is able to perform the editing work while confirming the change in the work result of another worker from the timeline 771. At this time, it is possible to perform a change in the work result of another worker to whom the notification of the settlement, to be described later using FIG. 22, is not performed. Similarly, for the work result to which the notification of the settlement is not performed among the work results of the worker 21-1, it is possible for another worker to make a change. Accordingly, the worker 21-1 is necessary to inform the settlement with respect to the work result of his own editing which is not desired to be changed by another worker.

At this time, similarly to FIG. 15, conflicting ranges 801 and 802 are displayed by a different display format from the range where there is not a conflict. In addition, the event which is included in the conflicting ranges 801 and 802 is displayed by a different format from another worker. The worker 21-1 is able to easily recognize that the ranges are ranges which conflict with the work result of another worker, by viewing a state where the conflicting ranges 801 and 802 are highlighted.

In the third method of the editing work which is described using FIG. 21, respective timelines of the plurality of workers who are performing the simultaneous and parallel editing work are overlapped with each other, it is possible to perform editing with respect to the unsettled editing result, even if it is not his own editing result. Accordingly, in the third method, editing work is suitable, in which it is difficult to determine which has priority in the editing results of the worker 21-1 and another worker.

Among the first to third methods described above, it is possible for an editor to select a method which is suitable for his own editing work. In addition, it is possible to avoid the conflict of the work among editors, by performing the editing work using these methods.

Notification Work Result

In this manner, when the worker 21-1 performs the editing work according to any one of the first to third methods, by operating the simultaneous and parallel editing client for the worker 121-2, as described above, in step S47 in FIG. 5, the simultaneous and parallel editing client for the worker 121-2 executes the processing corresponding to the editing work.

In step S48, the simultaneous and parallel editing client for the worker 121-2 receives the notification of the work result due to the operation of the worker 21-1, and transmits to the simultaneous and parallel editing client manager 111.

That is, the worker 21-1 is able to inform the work result to another worker, by operating the simultaneous and parallel editing client for the worker 121-2 during the editing work.

In other words, the processing of the simultaneous and parallel editing client 121-2 for the worker 21-1 is referred to for the simple description in here, however, the processing of the simultaneous and parallel editing client for the worker 121-3 which is operated by the separate worker 21-2 is also performed, since the simultaneous and parallel editing operation is performed in practice.

Accordingly, the separate worker 21-2 is also able to perform his own editing work while confirming the work result of the worker 21-1, similarly to the worker 21-1 who is able to perform his own editing work while confirming the work result of the worker 21-2. In this case, it is necessary for the simultaneous and parallel editing client for the worker 121-2 which is operated by the separate worker 21-2 to receive the work result of the worker 21-1, by executing the equivalent processing to the step S46 in FIG. 5 which is described above.

For this reason, the worker 21-1 operates the simultaneous and parallel editing client for the worker 121-2, and informs the separate worker 21-2 of the work result.

Here, there are two types of timing of the above described explicit timing and the implicit timing, as the timing for the notification of the work result. The description of these timings will be omitted, since they are similar to the timing of requesting the confirmation of the work result.

In the example, the notification of the work result is performed at the timing in step S48, and is transmitted to the simultaneous and parallel editing client manager 111 from the simultaneous and parallel editing client for the worker 121-2. When notifying the work result, it is also informed whether the editing work is "unsettled" or "settled". The worker 21-1 informs the work result by setting the range on the timeline where the editing work is not ended to "unsettled", and by setting the range on the timeline where the editing work is ended to "settled". When the notification of the work result is made, the range on the timeline of which state is "unsettled" can be changed by another worker. On the other hand, when the notification of the work result is made, the range on the timeline of which state is "settled" is unable to be changed by another worker. When the notification of the work result which is established is set to "unsettled", and the worker 21-1 operates a predetermined button or key by designating the range, the range on the timeline in which the editing work is ended is set to "settled". In addition, the setting of "unsettled" or "settled" can be changed only by the worker who has set the setting.

Subsequently, in step S26, the simultaneous and parallel editing client manager 111 receives the notification of the work result which is transmitted from the simultaneous and parallel editing client for the worker 121-2. Even though it is not shown in FIG. 5, the simultaneous and parallel editing client manager 111 transmits the work result of the worker 21-1 to the simultaneous and parallel editing client for the worker 121-3 which is operated by the separate worker 21-2, when receiving the notification.

FIG. 22 is a diagram of an editing screen which is displayed in the simultaneous and parallel editing client for the worker 121-2 which is operated by the separate worker 21-1, after transmitting the notification of such a work result of the worker 21-1, and of an example of a display of the unsettled and settled portions of the work.

As shown in FIG. 22, respective timelines of the plurality of workers (that is, the workers 21-1 and 21-2 in the example) who are performing the simultaneous and parallel editing work are overlapped with each other, and are displayed as a timeline 821, in the simultaneous and parallel editing client for the worker 121-2 after transmitting the notification of the work result.

Similarly to the example in FIG. 15, in the timeline 821 in the example in FIG. 22, the events of which editing work is allotted to the respective plurality of workers are respectively displayed by different patterns so as to be distinguished from another worker. Each pattern which is assigned to each worker corresponds to each pattern of the tabs 841 to 843 in which the name of each worker is displayed.

Here, the range on the timeline 821 which is set to "settled" by the worker 21-1 who has notified the work result (hereinafter, referred to as a settled range) is displayed by a different display format from the range of "unsettled" on the timeline 821 in which the worker 21-1 does not set the settlement. For example, in the example in FIG. 22, the settled ranges 881 to 884 are highlighted. In addition, in the drawing, the highlight is displayed by a light shading pattern for convenience, and is displayed by a display format different from other unsettled ranges.

The worker 21-1 who has notified the work result is able to easily recognize that the range is unable to be changed by another worker, by viewing the state where the settled ranges 881 to 884 are highlighted. In other words, the worker 21-1 is able to easily recognize that the unsettled ranges other than the settled ranges 881 to 884 can be changed by another worker.

In addition, similarly to the example in FIG. 15, the conflicting ranges 861 and 862 are differently displayed from other ranges where there is not a conflict. Further, the event included in the conflicting ranges 861 and 862 is displayed by a display format which is different from other events. The worker 21-1 who has notified the work result is able to easily recognize that the range is a range where there is a conflict with the work result of another workers, by viewing a state where the conflicting ranges 861 and 862 are highlighted.

As described above, the steps S48 and S46 are processing operations which form a pair, and when the processing of S48 is executed in a device where the work result is confirmed, between the worker 21-1 and the separate worker 21-2, the processing of S46 is executed in a device which confirms the work result. In this case, the screen in FIG. 22 is displayed in an output unit 162 of a device where the work is confirmed (that is, the side notifying the work result), and the screens in FIGS. 13 to 15 are displayed in the display unit of the device which confirms the work. In this manner, the processing in step S46 or step S48 is processing which is appropriately performed in each device operated by a plurality of editors who are performing the simultaneous and parallel editing during the editing work, and the plurality of editors who is performing the simultaneous and parallel editing are able to perform their own editing work while notifying or confirming the work result to each other.

In addition, in the example in FIG. 22, respective timelines of the plurality of workers are displayed in an overlapping manner as a display after notifying the work result by the worker 21-1. However, the display is not limited to this, and for example, similarly to the example in FIG. 14, the respective timelines of the plurality of workers may be aligned to be displayed vertically.

Reporting Work Result

It is necessary for the worker 21-1 to report the work result to the director 11 when the editing work based on the instruction from the director 11 is completed, that is, when all of the work results of the worker 21-1 are settled.

In step S49, the simultaneous and parallel editing client for the worker 121-2 receives the report of the work result due to the operation of the worker 21-1, and transmits to the simultaneous and parallel editing client manager 111.

When reporting the work result to the director 11, the worker 21-1 selects an instruction in which the editing work corresponding to the instruction is completed, among instructions from the director 11 which are displayed in the instruction content for confirming 301 shown in FIG. 10. In addition, a predetermined operation is performed in a state where the instruction in which the editing work corresponding to the instruction is completed is selected, and the action list 361 shown in FIG. 11 is displayed. The worker 21-1 is able to report the work result to the director 11, by selecting the item of "settled" in the action list 361. At this time, the worker 21-1 is able to add a comment on the work result to the director 11. In addition, the comment to be added may be an audio file. Subsequently, the work result, the report time of the work result, and the comment, as necessary, are transmitted to the simultaneous and parallel editing client manager 111 from the simultaneous and parallel editing client for the worker 121-2 as the processing of step S49.

In step S27, the simultaneous and parallel editing client manager 111 receives the report which is transmitted from the simultaneous and parallel editing client for the worker 121-2, and transmits to the simultaneous and parallel editing client for the director 121-1.

In step S5, the simultaneous and parallel editing client for the director 121-1 receives the report of the work result which is transmitted from the simultaneous and parallel editing client manager 111.

Acknowledgement of Work Result

Subsequently, the director 11 confirms the work result of the worker 21-1, and acknowledges the result. That is, the director 11 selects an instruction of which the work status is "settled" among instructions on each row which are displayed in the instruction content 261 shown in FIG. 9, that is, an instruction in which the display format of the mark 291 is the pattern 351-5, and confirms the work result corresponding to the instruction. In addition, if there is not a problem in the work result, the director acknowledges the result.

In step S6, the simultaneous and parallel editing client for the director 121-1 receives the acknowledgement of the work result due to the operation of the director 11, and transmits the acknowledgement to the simultaneous and parallel editing client manager 111.

The director 11 selects an instruction in which the work status is "settled", among instructions in each row which are displayed in the instruction content 261 shown in FIG. 9, when the work result of the worker 21-1 is acknowledged. In addition, the director acknowledges the work result, by performing a predetermined operation in a state where the instruction is selected. At this time, the director 11 is able to add a comment to the worker 21-1. In addition, the added comment may be an audio file.

Subsequently, as a process of step S6, the acknowledgement of the work result, the acknowledging time, and the comment, as necessary, are transmitted to the simultaneous and parallel editing client manager 111 from the simultaneous and parallel editing client for the director 121-1.

In step S28, the simultaneous and parallel editing client manager 111 receives the acknowledgement of the work result which is transmitted from the simultaneous and parallel editing client for the director 121-1, and transmits the acknowledgement to the simultaneous and parallel editing client for the worker 121-2.

In step S50, the simultaneous and parallel editing client for the worker 121-2 receives the acknowledgement of the work result which is transmitted from the simultaneous and parallel editing client manager 111. Subsequently, the work result which is acknowledged by the director 11 is unable to be changed by all of the workers including the worker 21-1.

In this manner, the simultaneous and parallel editing processing by the simultaneous and parallel editing system 101 is completed.

Reverting Work Result

On the other hand, in step S6, when the work result is reverted to the worker 21-1, without being acknowledged due to the operation of the director 11, it is possible to change the work result by the worker 21-1. That is, the processing is reverted to step S42, and the worker 21-1 performs the confirmation of the work instruction. In this case, the work status of an instruction corresponding to the work result which is reverted by the director 11, among the instructions which are displayed in the instruction content for confirming 301 shown in FIG. 10 becomes "reverting", that is, the display format of the mark 291 becomes the pattern 351-3. Accordingly, the worker 21-1 repeats the processing of steps S42 to S49 until receiving the acknowledgment of the work result by the director 11. The simultaneous and parallel editing processing is ended when the work result which is made by the worker 21-1 is acknowledged by the director 11, and the simultaneous and parallel editing client for the worker 121-2 receives the acknowledgment of the work result in step S50.

In this manner, according to the simultaneous and parallel editing system 101, it is possible for the plurality of editors to avoid the conflict, since respective roles are clearly divided, even when the plurality of editors perform the editing work with respect to the same material, particularly, to the same timeline.

In addition, in the simultaneous and parallel editing system 101, it is possible to communicate among editors through transceiving of video data, text data, or audio data, or through chatting using video, text, or voice. In this manner, it is further possible to progress the simultaneous and parallel editing work while avoiding the conflict of the editing result.

Example of Referring to Set Content of Roles of Each Editor From Result of Simultaneous and Parallel Editing Processing Subsequently, a method in which a set content of roles of each editor can be referred to from the result of the simultaneous and parallel editing processing will be described.

That is, in step S1 of the processing of the simultaneous and parallel editing processing system, an example of a case in which the first data and the second data is generated will be described using FIGS. 23 to 26. Here, the first data shows a result of the simultaneous and parallel editing processing during executing, or after the executing, which is executed according to the work content and allotment (that is, the work content and allotment to be controlled by the editing processing unit 141 of the simultaneous and parallel editing client manager 111) which are received by the simultaneous and parallel editing client for the director 121-1. The second data shows the role for each of one or more workers, which corresponds to a portion which shows the editing result during executing, or after executing, based on the work content which is assigned in the first data.

Specifically, the examples in FIGS. 23 to 26 describe a method in which the second data which shows the set content of the role for each editor can be referred to, from the first data which shows the result of the simultaneous and parallel editing processing during the processing, or after the processing (hereinafter, referred to as the result of the simultaneous and parallel editing processing). The method is applicable even in a case where the different editing work is performed by a plurality of workers simultaneously and in parallel, and even in a case where different editing work is performed by the plurality of workers simultaneously and in parallel.

Figure 23:
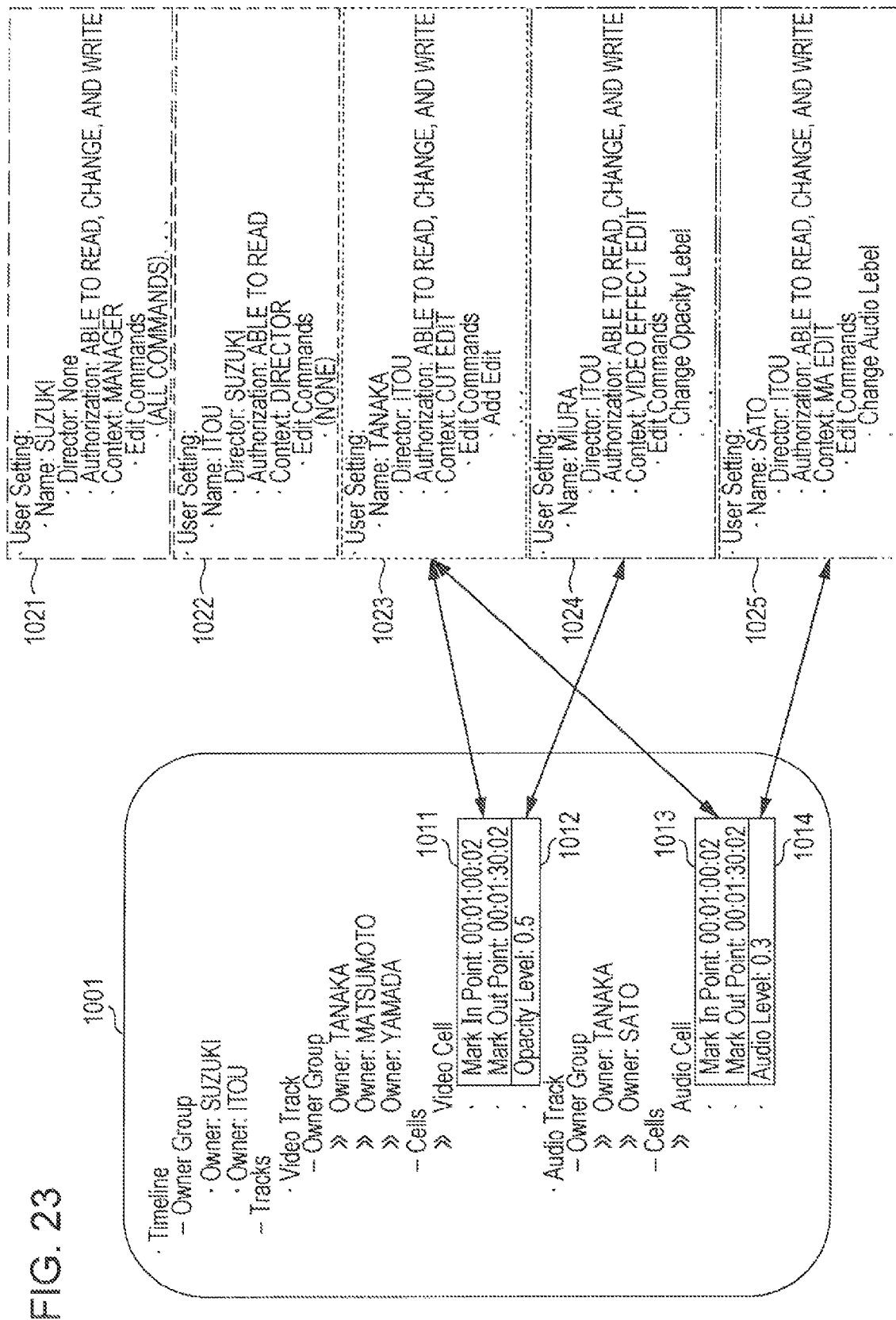
FIG. 23 is a diagram which shows an example of a method in which set contents of roles of each editor can be referred to, from a result of the simultaneous and parallel editing processing.

FIG. 23 is a diagram which shows an example of a method in which the set content of the role for each editor can be referred to, from a result of the simultaneous and parallel editing processing, when the different editing work is performed by a plurality of workers simultaneously and in parallel.

FIG. 23 shows a data structure 1001 as the first data which shows the result of the simultaneous and parallel editing processing of a predetermined timeline, and the set contents 1021 to 1025 as the second data which shows the role for each editor.

In the data structure 1001, a person who plays a role of the owner group of the entire timeline is shown on the second to fourth rows. Specifically, according to the descriptions on the third and fourth rows, "Suzuki" and "Itou" play the role of the owner group of the entire timeline. Here, the owner group of the entire timeline means a group of persons who supervise the timeline responsively.

In addition, the result of the simultaneous and parallel editing processing in the timeline is shown for each track after the 5th row. Specifically, in the example, the result is shown for each one video track and one audio track.

The result of the simultaneous and parallel editing processing for the video track is shown on the 6th to 14th rows.

In detail, the persons who play the role of the owner group of the video track are shown on the 7th to 10th rows. Specifically, according to the description on the 7th to 10th rows, "Tanaka", "Matsumoto", and "Yamada" play the role of the owner group of the video track. Here, the owner group of the video track means a group of persons who supervise and edit the video track responsively.

In addition, the editing result of the video track is shown on the eleventh to fifteenth rows. Specifically, the editing result of the video track is shown by the editing data 1011 on the 13th to 14th rows, and editing data 1012 on the 15th row. The editing data 1011 shows an editing result of cut editing in which a cell between "Mark In Point: 00:01:00:02" and "Mark Out Point: 00:01:30:02" is cut out, which is included in the video track (hereinafter, referred to as an event). In addition, each number denotes time, minute, second, and position by a frame, sequentially. The editing data 1012 shows an editing result of video effect editing in which "Opacity Level: 0.5", that is, the degree of transparency of the event included in the video track is set to 0.5.

The result of the simultaneous and parallel editing processing of the audio track is shown on the 16th to 24th rows.

In detail, the persons who play the role of the owner group of the audio track are shown on the 17th to 19th rows. Specifically, according to the description on the 17th to 19th rows, "Tanaka" and "Sato" played the role of the owner group of the audio track. Here, the owner group of the audio track means a group of persons who supervise and edit the audio track responsively.

In addition, the editing result of the audio track is shown on the 20th to 24th rows. Specifically, the editing result of the audio track is shown using the editing data 1013 on the 22nd and 23rd rows, and the editing data 1014 on the 24th row. In the editing data 1013, an editing result of cut editing is shown in which between "Mark In Point: 00:01:00:02" and "Mark Out Point: 00:01:30:02" of an event included in the audio track is cut out. The editing data 1014 shows an editing result of video effect editing in which the event included in the audio track has "Audio Level: 0.3", that is, the audio level is set to 0.3.

As shown in FIG. 23, a set content 1023 relating to the editor "Tanaka" who plays a role of cut editing corresponds to editing data 1011 which shows an editing result of cut editing of a video track. That is, it is configured such that the set content 1023 is referred to from the editing data 1011.

Similarly, a set content 1024 relating to the editor "Miura" who plays a role of video effect editing corresponds to editing data 1012 which shows an editing result of video effect editing of a video track. That is, it is configured such that the set content 1024 is referred to from the editing data 1012.

Similarly, a set content 1023 relating to the editor "Tanaka" who plays a role of cut editing corresponds to editing data 1013 which shows an editing result of cut editing of an audio track. That is, it is configured such that the set content 1023 is referred to from the editing data 1013.

Similarly, a set content 1025 relating to the editor "Sato" who plays a role of MA editing corresponds to editing data 1014 which shows an editing result of the MA editing of an audio track. That is, it is configured such that the set content 1025 is referred to from the editing data 1014.

In this manner, the data structure 1001 is configured such that among the set contents 1021 to 1025 with respect to the role for each editor, the corresponding set contents can be referred to, respectively, from the pieces of editing data 1011 to 1014. The set contents 1021 to 1025 are the same as the set contents 51, 61, 72, 71-1, and 71-2 which are shown in FIG. 2, respectively, description thereof will be omitted.

Accordingly, the workers can obtain further detailed information on the pieces of editing data 1011 to 1014, by being able to refer to the corresponding set contents, respectively, from the pieces of editing data 1011 to 1014. That is, the workers can obtain information on the name of the worker to whom the editing work of the pieces of editing data 1011 to 1014 is allotted, the name of the director who supervises the workers, authorities of the worker, and the command of the editing operation with which the worker can perform editing, since the set content can be referred to.

In addition, in the example in FIG. 23, the data structure 1001 is configured such that the corresponding set content among the set contents 1021 to 1025 can be referred to from the pieces of editing data 1011 to 1014 of the data structure 1001. However, in contrast to this, it is further possible to configure the set contents 1021 to 1025 such that among the pieces of editing data 1011 to 1014 of the data structure 1001, the corresponding set content can be referred to from the set contents 1021 to 1025. It is needless to say that the set content can be referred to from both. In this manner, the worker is able to easily confirm the result of the editing processing during executing, or after executing for himself.

Hitherto, the method was described referring to FIG. 23, in which the set content with respect to the role for each editor can be referred to from the result of the simultaneous and parallel editing processing, when different editing processes are performed simultaneously and in parallel by plural workers. Subsequently, the method in a case of performing the same editing work simultaneously and in parallel by plural workers will be described.

Figure 24:
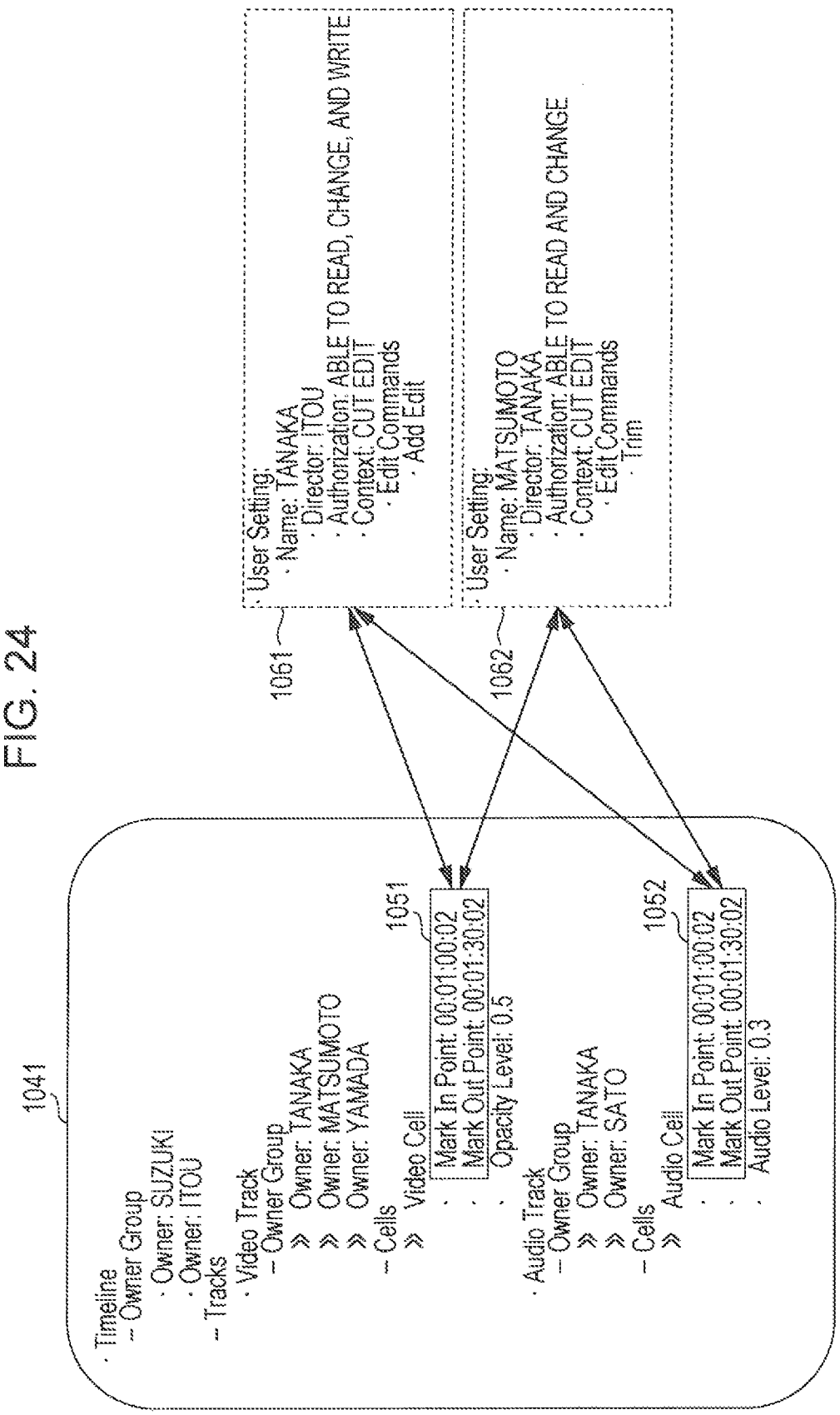
FIG. 24 is a diagram which shows an example when the same editing work is performed simultaneously and in parallel by a plurality of editors.

FIG. 24 is a diagram which shows an example of a method in which the set content with respect to the role for each editor can be referred to from the result of the simultaneous and parallel editing processing, when the same editing processes are performed simultaneously and in parallel by plural workers.

FIG. 24 shows data structure 1041 as the first data which shows a result of the simultaneous and parallel editing processing with respect to a predetermined timeline, and set contents 1061 and 1062 as the second data which shows the role for each editor.

In the data structure 1041, for the same configuration as that of the data structure 1001 in FIG. 23, the description thereof will be omitted. The pieces of editing data 1051 and 1052 in the data structure 1041 are respectively the same as the pieces of editing data 1011 and 1013 shown in FIG. 23, the description thereof will be omitted.

As shown in FIG. 24, a set content 1061 with respect to the editor "Tanaka" who plays a role of the cut editing, and a set content 1062 with respect to the editor "Matsumoto" correspond to the editing data 1051 which shows an editing result of the cut editing of the video track. That is, it is configured such that the set contents 1061 and 1062 are referred from the editing data 1051.

Similarly, a set content 1061 with respect to the editor "Tanaka" who plays the role of the cut editing, and the set content 1062 with respect to the editor "Matsumoto" correspond to the editing data 1052 which shows an editing result of the cut editing of the audio track. That is, it is configured such that the set contents 1061 and 1062 are referred from the editing data 1052.

In this manner, the data structure 1041 is configured such that the set contents 1061 and 1062 with respect to the role for each editor are referred from the pieces of editing data 1051 and 1052. Since the set contents 1061 and 1062 are the same as the set contents 72 and 81 which are shown in FIG. 2, respectively, the description thereof will be omitted.

As can be understood from the set contents 1061 and 1062, "Tanaka" and "Matsumoto" are allotted with the role of the cut editing which is the same cut editing work. Accordingly, when "Tanaka" and "Matsumoto" perform the editing work to the same material, there is a possibility of a conflict in the work results, accordingly it is necessary to avoid this. In this case, it is possible to avoid the conflict, by setting an authority which is given to the worker, and a command of the editing operation which enables the editing, among the roles of respective workers, to be different between the workers. In addition, editing work is referred to as an orthogonal work, in which the editing work influences the same material in this manner, and as a result, a conflict occurs in the work result. On the other hand, works other than the work are referred to as works which are not orthogonal.

In the example in FIG. 24, it is possible to avoid the conflict in the work result, by setting the authority which is shown after the "Authorization" on the 4th row, and is given to the set editor, and a command of an editing operation which enables the editing, and is shown after the "Edit commands" on the 6th row to be different for each worker, in the set content 1061 with respect to "Tanaka", and the set content 1062 with respect to "Matsumoto".

Specifically, in the set content 1061 regarding "Tanaka", it is understood that the authority which is given to "Tanaka" is "Read, change, and write" of a material from the description after the "Authorization" on the 4th row. In addition, it is understood that the command of the editing operation which enables "Tanaka" to perform editing is "Add edit", among the editing operations included in the "cut edit" which is set in "context" on the 5th row, from the description after "Edit commands" on the 6th row. In the "Add edit" which is the command of the editing operation enabling "Tanaka" to perform editing, a new event is further added to the current event after performing the editing. Accordingly, "Write" is included in addition to "Read and change" of a material as the authority which is given to "Tanaka".

On the contrary, in the set content 1062 regarding "Matsumoto", it is understood that the authority which is given to "Matsumoto" is "Read and change" of a material from the description after the "Authorization" on the 4th row. In addition, it is understood that the command of the editing operation which enables "Tanaka" to perform editing is "Trim", among the editing operations included in the "cut edit" which is set in the "context" on the 5th row, from the description after "Edit commands" on the 6th row. After executing the "Trim" which is the command of the editing operation enabling "Matsumoto" to perform editing, only a minor adjustment of the time code of "Mark In Point" and "Mark Out Point" is performed while maintaining the total number of events. That is, only the current event is subject to the minor adjustment, without adding a new event to the current event. Accordingly, only the "Read and change" of a material is included in the authority which is given to "Matsumoto", and "Write" is not included.

In this manner, "Tanaka" and "Matsumoto" are allotted with the role of cut editing together with respect to the same event. However, there is not a conflict in the editing result, since "Tanaka" is assigned with crude editing of the event, and "Matsumoto" is assigned with a minor adjustment thereof. That is, it is possible to avoid the conflict in the work result, by differentiating the authority given to respective workers, and the command of the editing operation which enables the editing, even when the same editing work is performed simultaneously and in parallel by a plurality of workers.

In addition, in the example in FIG. 24, as well, the worker or the like is able to obtain further detailed information of editing data, by referring to the respective corresponding set contents of the role for each editor from the editing data of the data structure 1041.

In addition, in the example in FIG. 24, the data structure 1041 is configured such that the corresponding respective set contents of the role for each editor can be referred to from the editing data of the data structure 1041. However, in contrast to this, it is further possible to configure the set contents of the role for each editor such that each corresponding editing data of the data structure 1041 can be referred to from the set contents of the role for each editor. It is needless to say that the set content can be referred to from both. In this manner, the worker himself is able to easily confirm the result of the editing processing during executing, or after executing.

In the example in FIG. 24, when a plurality of workers perform the same editing work simultaneously and in parallel, it is possible to avoid the conflict, by differentiating the authority given to the worker, even if it is orthogonal work, and the command of the editing operation which enables the editing. However, the example of avoiding the conflict is not limited to this, even if the work is orthogonal when the plurality of workers performs the same editing work simultaneously and in parallel.

Figure 25:
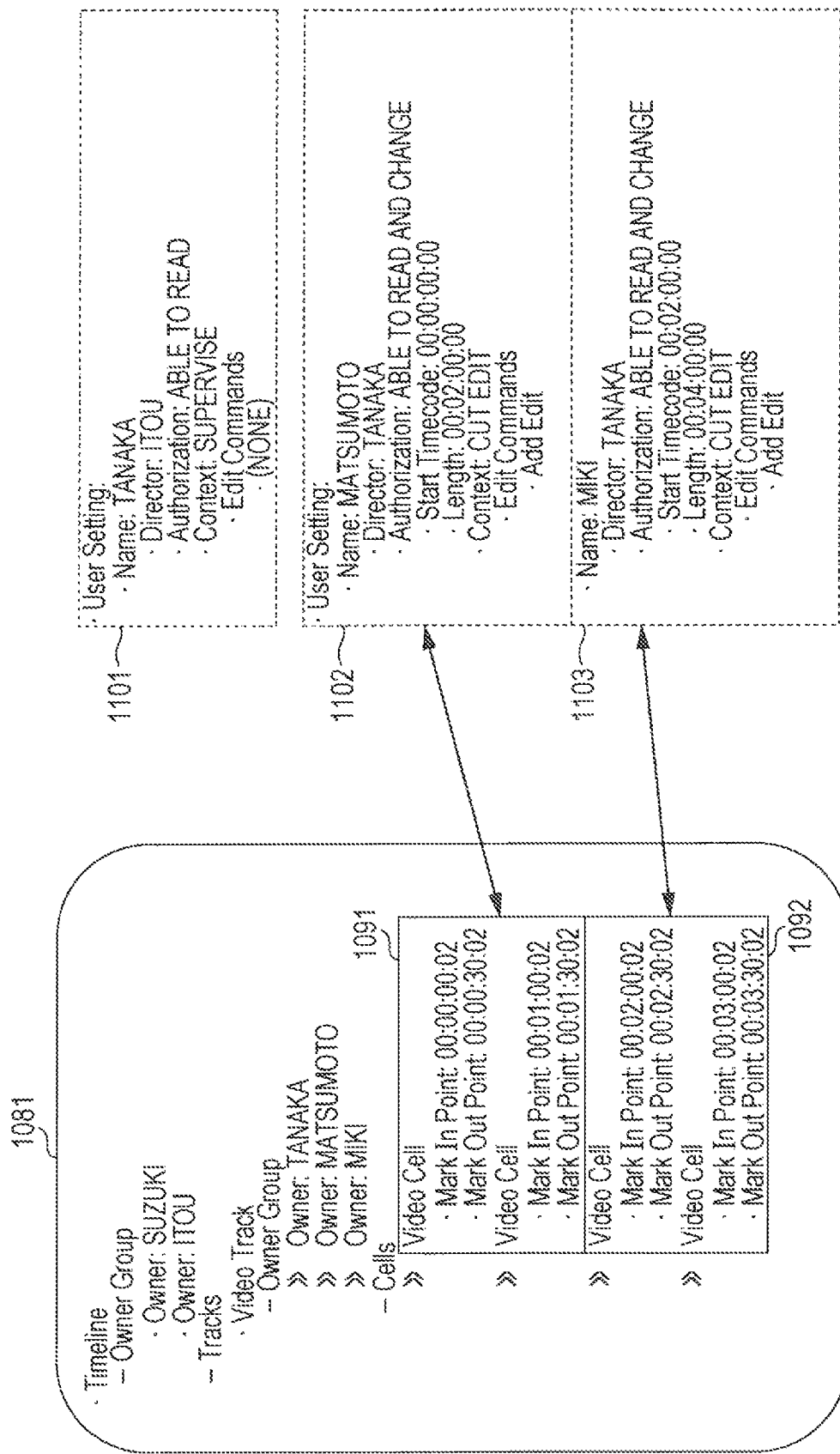
FIG. 25 is a diagram which shows another example when the same editing work is performed simultaneously and in parallel by the plurality of editors.

FIG. 25 is a diagram which shows another example of the method in which it is possible to refer to the set content of the role for each editor from the result of the simultaneous and parallel editing processing, when the plurality of workers performs the same editing work simultaneously and in parallel.

FIG. 25 shows a data structure 1081 as the first data which shows the result of the simultaneous and parallel editing processing with respect to a predetermined timeline, and set contents 1101 to 1103 as the second data which shows the role for each editor.

In the data structure 1081, the description of the same configuration as that of the data structure 1001 in FIG. 23 will be omitted.

In the example, the result of the simultaneous and parallel editing processing in the predetermined timeline is specifically shown in one video track after the 5th row.

Specifically, the persons who play the role of the owner group of the video track are shown on the 7th to 10th rows. In detail, according to the description on the 7th to 10th rows, "Tanaka", "Matsumoto", and "Miki" play the role of the owner group of the video track. Here, the owner group of the video track means a group of persons who has supervised and edited the video track responsibly.

In addition, the editing result of the video track is shown after the 11th row. Specifically, the editing result of the video track is shown by editing data 1091 on the 12th to 17th rows, and by editing data 1092 on the 18th to 22nd rows. The editing data 1091 shows an editing result of cut editing of an event which is included in the video track, and is cut out between "Mark In Point: 00:00:00:02" and "Mark Out Point: 00:00:30:02", and between "Mark In Point: 00:01:00:02" and "Mark Out Point: 00:01:30:02". The editing data 1092 shows an editing result of cut editing of an event which is included in the video track, and is cut out between "Mark In Point: 00:02:00:02" and "Mark Out Point: 00:02:30:02", and between "Mark In Point: 00:03:00:02" and "Mark Out Point: 00:03:30:02".

It is understood that a set content 1101 is a set content relating to "Tanaka" from the description after the "Name:" on the 2nd row. In addition, it is understood that the name of a director who supervises "Tanaka" is "Itou" from the description after the "Director" on the 3rd row. In addition, it is understood that the authority which is given to "Tanaka" is "Read" of a material from the description after the "Authorization" on the 4th row. It is understood that the "behavior to be expected from another editor" for "Tanaka" is the "Supervisor" from the description after the "Context" on the 5th row. In addition, here, the "Supervisor" is an editor who only supervises the work without giving instructions to the worker, differently from a director. The "behavior to be expected from another editor" for the supervisor is specially set as the "Supervisor", since of his own editing work is not performed, that is, a specified editing context is not assigned. For this reason, as shown in the description after the "Edit commands" on the 6th row, the command for "Tanaka" to perform editing is set to "None". In the example in FIG. 25, "Tanaka" supervises the works of "Matsumoto" and "Miki" to be described later.

Similarly, it is understood that the set content 1102 is a set content relating to "Matsumoto". In addition, it is understood that the name of director who supervises "Matsumoto" is "Tanaka". Further, the authority which is given to "Matsumoto" is "Read and change" of a material. In addition, it is understood that a possible range of the "Read and change" of a material is "Start Time code: 00:00:00:00" and "Length: 00:02:00:00". That is, the range on the timeline in which "Matsumoto" is able to "Read and change" the material of which time code corresponds to the timeline is between 00:00:00:00 and 00:02:00:00. In addition, it is understood that the "behavior which is expected from another editor" for "Matsumoto" is "Cut edit". For this reason, it is understood that the command of the editing operation enables "Matsumoto" to perform the cut editing is "Add edit" among the editing operations included in the "Cut edit".

Similarly, it is understood that the set content 1103 is a set content relating to "Miki". In addition, it is understood that the name of director who supervises "Miki" is "Tanaka". Further, the authority which is given to "Miki" is "Read and change" of a material. In addition, it is understood that a possible range of the "Read and change" of the material is "Start Timecode:00:02:00:00" and "Length:00:04:00:00". That is, the range on the timeline in which "Miki" is able to "Read and change" the material of which time code corresponds to the timeline is between 00:02:00:00 and 00:06:00:00. In addition, it is understood that the "behavior which is expected from another editor" for "Miki" is "Cut edit". For this reason, it is understood that the command of the editing operation enables "Miki" to perform the cut editing is "Add edit" among the editing operations included in the "Cut edit".

As shown in FIG. 25, the set content 1102 relating to "Matsumoto" who plays the role of cut editing of a time code in the range between 00:00:00:00 and 00:02:00:00 corresponds to the editing data 1091 which shows the editing result of the cut editing in which between "Mark In Point: 00:01:00:02" and "Mark Out Point: 00:01:30:02" of the video track is cut out. That is, it is configured such that the set content 1102 is referred from the editing data 1091.

Similarly, the set content 1103 relating to "Miki" who plays the role of cut editing of a time code in the range between 00:02:00:00 and 00:06:00:00 corresponds to the editing data 1092 which shows the editing result of the cut editing in which between "Mark In Point:00:03:00:02" and "Mark Out Point:00:03:30:02" of the video track is cut out. That is, it is configured such that the set content 1103 is referred from the editing data 1092.

In this manner, the data structure 1081 is configured such that it is possible to refer to the set contents 1102 and 1103 relating to the corresponding role for each editor, respectively, from the pieces of editing data 1091 and 1092.

In this manner, the same cut editing is allotted to "Matsumoto" and "Miki" with respect to the same event. However, the cut editing in the range of a time code between 00:00:00:00 and 00:02:00:00 is assigned to "Matsumoto", and on the other hand, the cut editing in the range of a time code between 00:02:00:00 and 00:06:00:00 is assigned to "Miki". That is, it is understood that in the editing work of a predetermined timeline in the example in FIG. 25, "Matsumoto" is assigned with the editing work in the first half of the timeline, and "Miki" is assigned with the editing work in the second half of the timeline. Accordingly, there is not a conflict in the editing results of "Matsumoto" and "Miki". That is, it is possible to avoid the conflict in the work result, by differentiating the range on the timeline in which the authority given to each worker is available, even in a case where the plurality of workers perform the same editing work simultaneously and in parallel.

In addition, in the example in FIG. 25, as well, the worker or the like is able to obtain further detailed information on the editing data, by referring to the corresponding respective set contents relating to the role for each editor from the editing data of the data structure 1081.

In addition, in the example in FIG. 25, the data structure 1081 is configured such that it is possible to refer to the corresponding respective set contents relating to the role for each editor from the editing data of the data structure 1081. However, in contrast to this, it is also possible to further configure the set contents relating to the roles for each editor such that each corresponding editing data item of the data structure 1081 can be referred to from the set contents relating to the role for each editor. It is needless to say that the set contents can be referred to from both. In this manner, the worker is able to easily confirm the result of his own editing processing during executing, or after the executing.

In the example in FIG. 25, it was possible to avoid the conflict even in the orthogonal works, by differentiating the ranges on the timeline in which the authority given to the worker is available when the same editing work is performed simultaneously and in parallel by the plurality of workers. However, the example is not limited to this, in which the conflict can be avoided even in the orthogonal works when the same editing work is performed simultaneously and in parallel by the plurality of workers.

Figure 26:
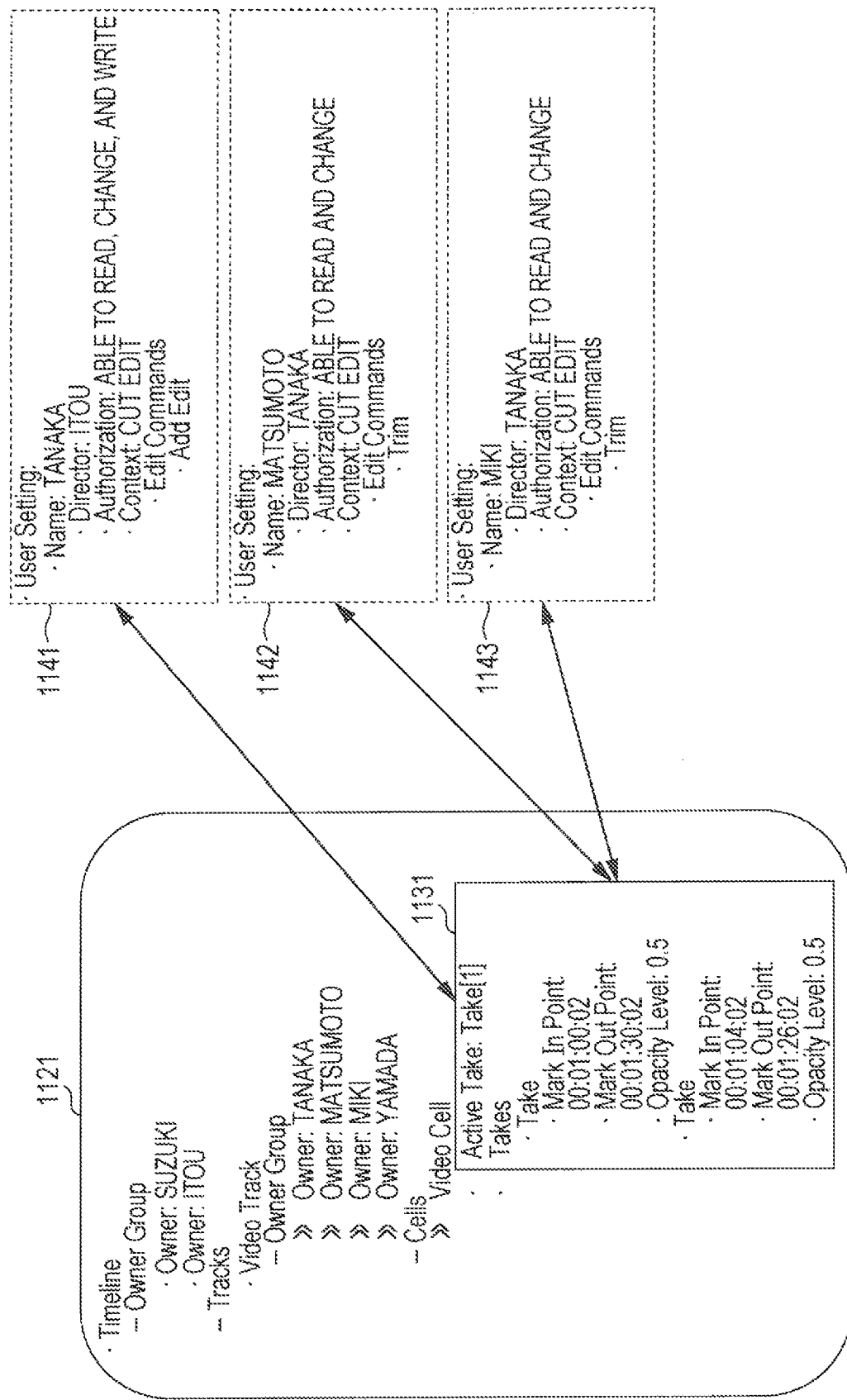
FIG. 26 is a diagram which shows another example when the same editing work is performed simultaneously and in parallel by the plurality of editors.

FIG. 26 is a diagram which shows another example of the method in which the set contents of the role for each editor can be referred to from the result of the simultaneous and parallel editing processing.

FIG. 26 shows a data structure 1121 as the first data which shows the result of the simultaneous and parallel editing processing with respect to a predetermined timeline, and set contents 1141 to 1143 as the second data which shows the role for each editor.

In the data structure 1121, the description of the same configuration as that of the data structure 1001 in FIG. 23 will be omitted.

Specifically, the result of the simultaneous and parallel editing processing in the predetermined timeline is shown in one video track after the 5th row, in the example.

In detail, the persons who play the role of the owner group of the video track are shown on the 7th to 11th rows. Specifically, according to the description on the 7th to 11th rows, "Tanaka", "Matsumoto", "Miki" and "Yamada" play the role of the owner group of the video track. Here, the owner group of the video track means a group of persons who supervised and edited the video track responsibly.

In addition, the editing result of the video track is shown after the 13th row. Specifically, the editing result of the video track is shown by editing data 1131 on the 14th to 27th rows. The editing data 1131 shows an editing content "Active Take: Take[1]", that is, in which one of temporary events included in the video track which is shown in the subsequent plurality of "Takes" is selected and becomes effective.

The temporary event shown in the first "Take" shows an editing result of cut editing in which between "Mark In Point 00:01:00:02" and "Mark Out Point 00:01:30:02" of the event included in the video track is cut out. In addition, the event shows an editing result of video effect editing of "Opacity Level:0.5", that is, the degree of transparency is set to 0.5.

The temporary event shown in the second "Take" shows an editing result of cut editing in which between "Mark In Point 00:01:04:02" and "Mark Out Point 00:01:26:02" of the event included in the video track is cut out. In addition, the event shows an editing result of video effect editing of "Opacity Level:0.5", that is, the degree of transparency is set to 0.5.

The description of a set content 1141 will be omitted, since it has the same set content as the set content 72 in FIG. 2.

It is understood that set contents 1142 and 1143 are the set contents relating to "Matsumoto" and "Miki", respectively, from the description after the "Name:" on the second row. In addition, it is understood that the name of director who supervises "Matsumoto" and "Miki" is "Tanaka" from the description after the "Director" on the third row. Further, the authority which is given to "Matsumoto" and "Miki" is "Read and change" of a material from the description after the "Authorization" on the 4th row. It is understood that the "behavior expected from another editor" of "Matsumoto" and "Miki" is "Cut edit" from the description after the "Context" on the 5th row. For this reason, it is understood that among the editing operations included in the "Cut edit", the command of the editing operation which enables the editing is "Trim", that is, "Matsumoto" and "Miki" are able to perform the editing of trimming, from the description after the "Edit commands" on the 6th row.

As shown in FIG. 26, the set contents 1141 to 1143 relating to "Tanaka", "Matsumoto" and "Miki" who play the role of the cut editing correspond to editing data 1131 which shows the cut editing of the video track. That is, it is configured such that the set contents 1141 to 1143 can be referred to from the editing data 1131.

In this manner, the data structure 1121 is configured such that the set contents 1141 to 1143 relating to the role for each corresponding editor can be referred to from the editing data 1131.

As can be understood from the set contents 1142 and 1143, the set contents relating to "Matsumoto" and "Miki" are the same. Accordingly, when "Matsumoto" and "Miki" perform the editing work in the same event, the editing work becomes orthogonal, and there is a possibility of the conflict in the work result. However, in the example in FIG. 26, the respective work results of editing performed by "Matsumoto" and "Miki" with respect to the same event are set to temporary events, respectively. In addition, one of the temporary events is selected by "Tanaka" who supervises "Matsumoto" and "Miki", and becomes effective. Accordingly, there is not a conflict even when the works of "Matsumoto" and "Miki" are orthogonal. That is, even when the same editing work is performed simultaneously and in parallel by a plurality of worker, it is possible to avoid the conflict in the work result, by adopting only one result from the work results of respective workers.

In addition, the editing result of the temporary event shown in the "Take" may be the event which is predetermined by the director 11, or may be the event in which a result of a work is reflected, in which the worker independently joins the editing work of the temporary event.

In addition, in the example in FIG. 26, as well, the worker or the like is able to obtain further detailed information on the editing data from the editing data of the data structure 1121, by referring to the set content relating to the role for each corresponding editor.

In addition, in the example in FIG. 26, the data structure 1121 is configured such that it is possible to refer to the set content relating to the role for each corresponding editor from the editing data of the data structure 1121. However, in contrast to this, it is also possible to further configure the set contents relating to the roles for each editor such that the editing data of the data structure 1121 can be referred to from the set contents relating to the role for each editor. It is needless to say that the set contents can be referred to from both. In this manner, the worker himself is able to easily confirm the result of editing processing during executing, or after the executing.

Hereinafter, the method was described, in which the set content of the role for each editor can be referred to from the result of the simultaneous and parallel editing processing, using FIGS. 23 to 26.

Example of Updating Role for Each Editor

Subsequently, a method of updating a set content relating to the role for each editor will be described.

That is, in step S1 of processing in the simultaneous and parallel editing system, an example of a case where the first data and the second data are changed will be described using FIGS. 27 to 29. In step S1, the first data shows a result of the simultaneous and parallel editing processing during the executing, or after the executing, in which the simultaneous and parallel editing processing is executed according to the work content and allotment which are received by the simultaneous and parallel editing client for the director 121-1, (that is, the work content and allotment which become the control target of the editing processing unit 141 of the simultaneous and parallel editing client manager 111), and the second data corresponds to a portion showing the editing result based on the assigned work content in the first data, and shows the role for each of one or more workers.

Figure 27:
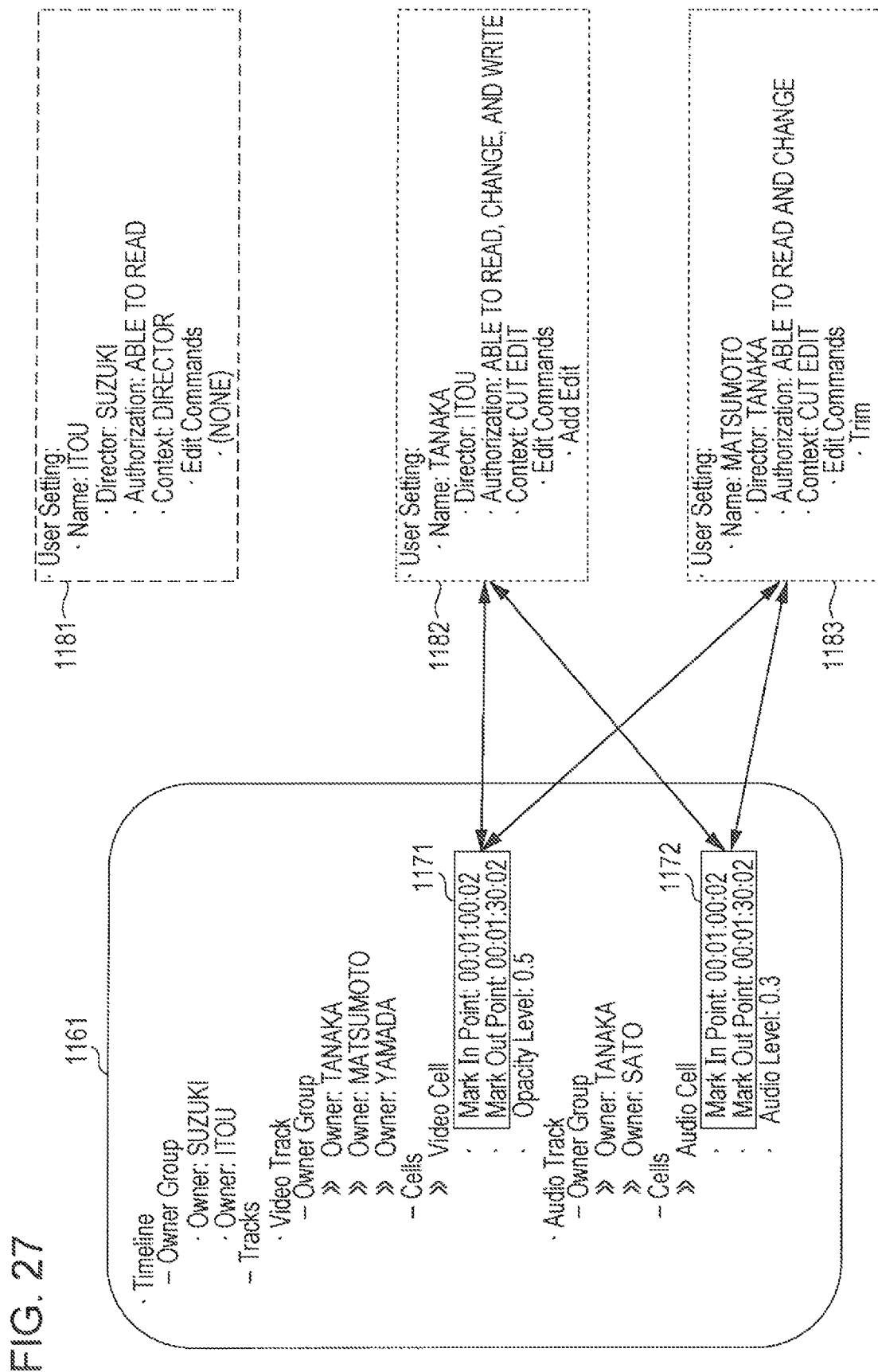
FIG. 27 is a diagram which shows an example where the set contents regarding the roles of each editor are updated.

FIG. 27 is a diagram which shows an example in which the set content relating to the role for each editor is updated.

In FIG. 27, a data structure 1161 as the first data which shows the result of the simultaneous and parallel editing processing during executing, or after the executing, with respect to a predetermined timeline, and set contents 1181 to 1183 as the second data which shows the role for each director are shown.

In the data structure 1161, the description of the same configuration as that of the data structure 1001 in FIG. 23 will be omitted. Pieces of editing data 1171 and 1172 of the data structure 1161 have the same configuration as those of editing data 1011 and 1013 shown in FIG. 23, respectively, the description thereof will be omitted.

As shown in FIG. 27, the set contents 1182 and 1183 relating to "Tanaka" and "Matsumoto" who play the role of the cut editing correspond to the editing data 1171 which shows the editing result of the cut editing of the video track. That is, it is configured such that the set contents 1182 and 1183 can be referred to from the editing data 1171.

Similarly, the set contents 1182 and 1183 relating to "Tanaka" and "Matsumoto" who play the role of the cut editing correspond to the editing data 1172 which show the editing result of the cut editing of the video track. That is, it is configured such that the set contents 1182 and 1183 can be referred to from the editing data 1172.

In this manner, the data structure 1161 is configured such that the set contents 1182 and 1183 relating to the role for each editor can be referred to from the pieces of editing data 1171 and 1172. Since the set contents 1182 and 1183 are the same as the set contents 72 and 81 shown in FIG. 2, the description thereof will be omitted.

In the example in FIG. 27, it is understood that "Itou" as a director supervises "Tanaka" who is a worker and director, from the set content 1181 relating to "Itou". In addition, it is understood that "Tanaka" as a worker and director supervises "Matsumoto" who is a worker, from the set content 1182 relating to "Tanaka". Further, since the set content 1181 has the same configuration as that of the set content 61 in FIG. 2, the description thereof will be omitted.

Here, it is assumed that an instruction was made from "Itou" as the director to "Tanaka" as the worker and director to acknowledge the work result of "Matsumoto". When "Tanaka" who received the instruction acknowledges the work result of "Matsumoto" whom he supervises, the set content 1183 relating to "Matsumoto" is changed as shown in subsequent FIG. 28.

Figure 28:
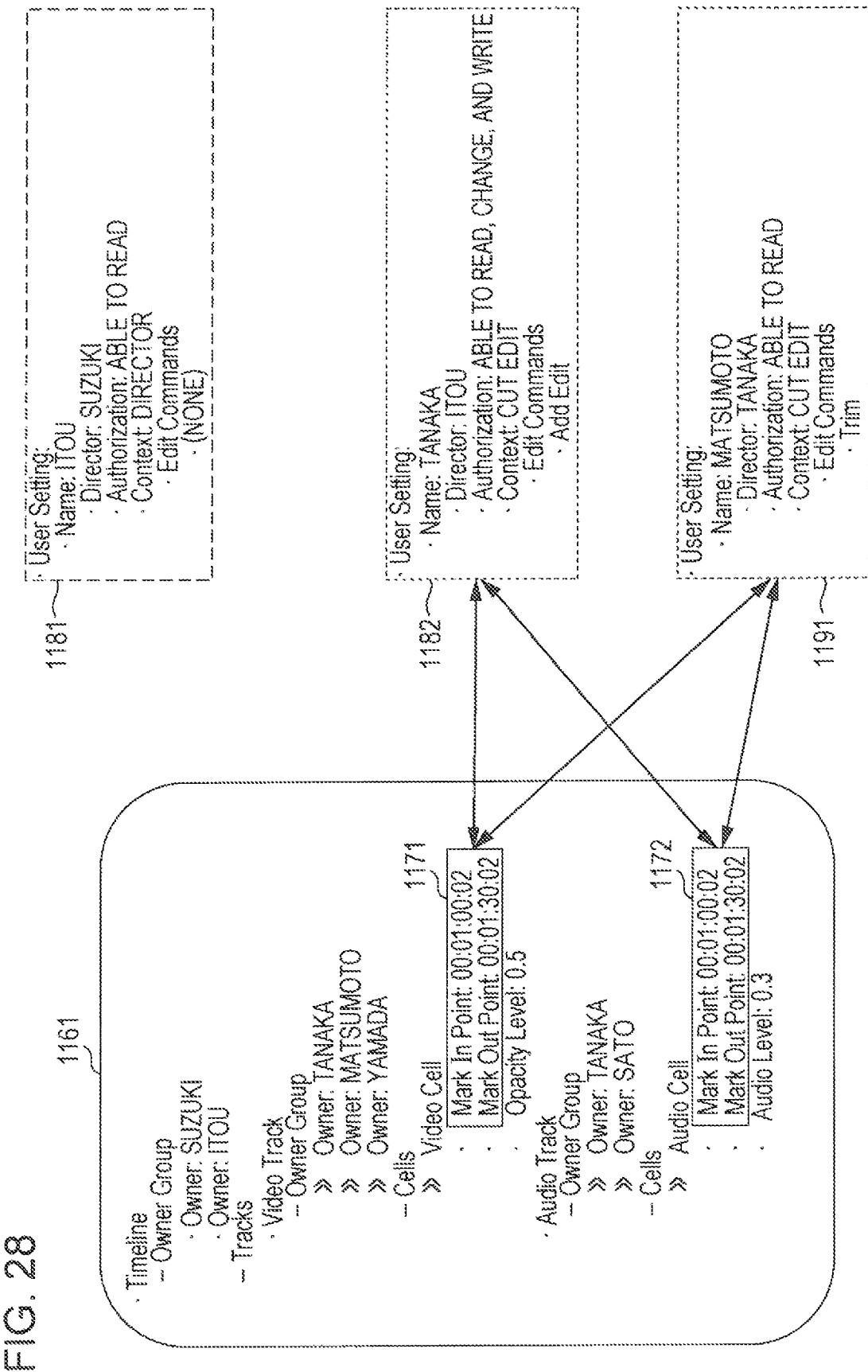
FIG. 28 is a diagram which shows an example where the set contents regarding the roles of each editor are changed.

FIG. 28 is a diagram which shows an example of which set content relating to the role for each editor is changed.

FIG. 28 shows a data structure 1161 as the first data which shows a result of the simultaneous and parallel editing processing during executing, or after the executing with respect to a predetermined timeline, and set contents, 1181, 1182, and 1191 as the second data which shows the role for each director.

Since the data structure 1161, and the set contents 1181 and 1182 relating to the role for each editor have the same configuration as that of FIG. 27, the description thereof will be omitted.

When receiving an instruction to acknowledge the work result of "Matsumoto" whom he supervises, "Tanaka" who is the worker and director changes the set content 1183 relating to "Matsumoto" shown in FIG. 27 to the set content 1191, for example, by operating the simultaneous and parallel editing client for the worker 121-2. That is, the description after the "Authorization" on 4th row in the set content 1183 shown in FIG. 27 is updated to "Read" from "Read and change" as shown in the set content 1191.

"Matsumoto" is unable to perform the editing work when the authority given to "Matsumoto" who is a worker is updated only to "Read" of a material. That is, "Matsumoto" is unable to use "Trim" as a command of the editing operation which enables the editing described after the "Edit commands" on the 6th row, and is unable to perform the editing of trimming. In this manner, when a work result of a worker is acknowledged, the set content is changed, and the work result is set to be unable to be changed by the worker. That is, as described above in step S50 in FIG. 5, the acknowledged work result is unable to be changed by the worker.

Subsequently, it is assumed that new work content is assigned to "Matsumoto" who is a worker from "Itou" as a director. Then, the set content relating to "Matsumoto" is changed as shown in the subsequent FIG. 29.

Figure 29:
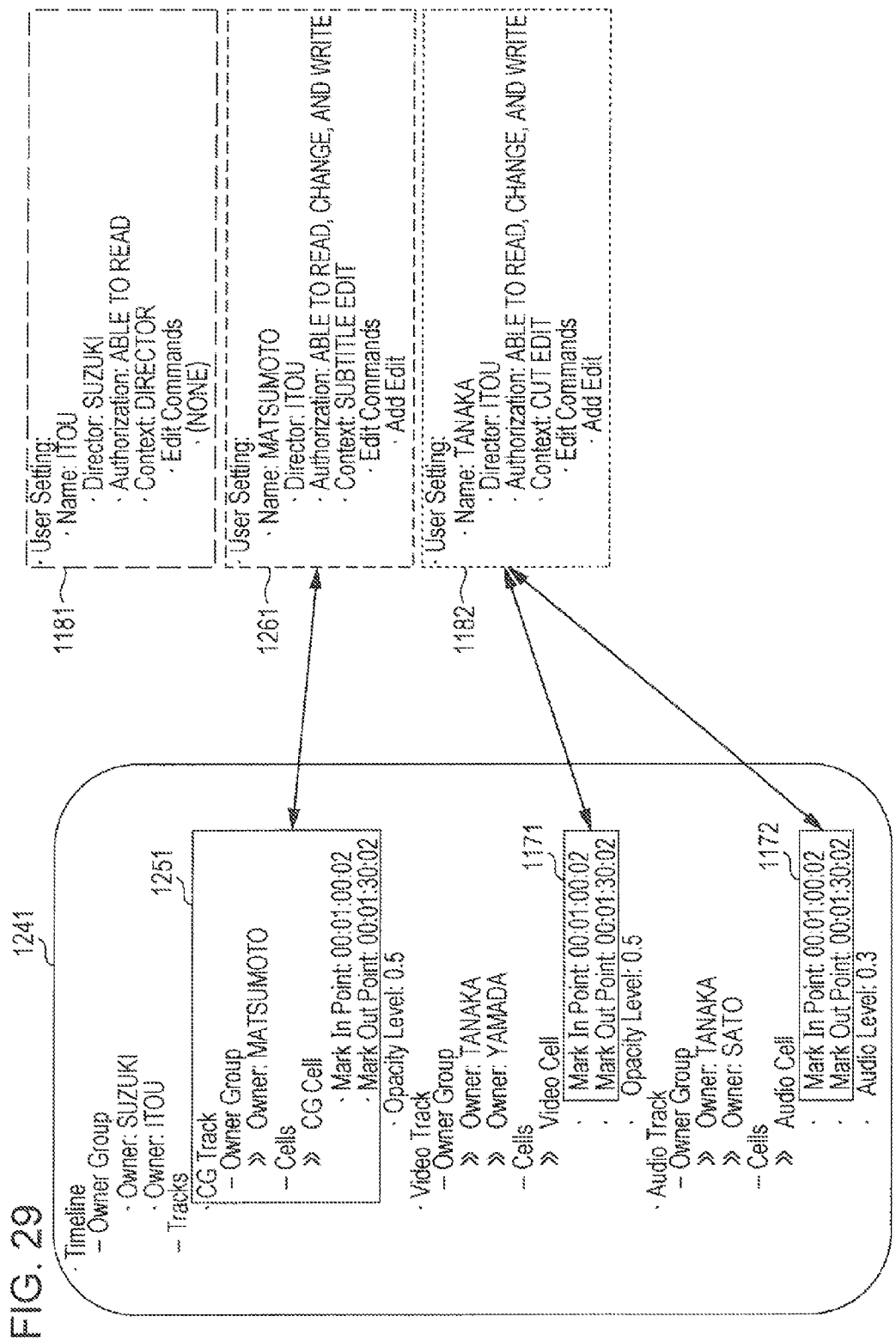
FIG. 29 is a diagram which shows an example where the set contents regarding the roles of each editor are updated.

FIG. 29 is a diagram which shows an example in which a set content relating to the role for each editor is updated.

FIG. 29 shows a data structure 1241 as the first data which shows the result of the simultaneous and parallel editing processing during executing, or after the executing with respect to a predetermined timeline, and set contents 1181, 1182, and 1261 as the second data which shows the role for each editor.

In the data structure 1241, the description of the same configuration as that of the data structure 1161 in FIG. 27 will be omitted. In addition, since the set contents 1181 and 1182 have the same configuration as that in FIG. 27, the description thereof will be omitted.

According to the work content and the allotment which are newly determined by the director "Itou", the simultaneous and parallel editing processing is executed. In this manner, a new editing data 1251 is added to the data structure 1241 which shows the result of the simultaneous and parallel editing processing.

Specifically, an editing result of CG track is added to the 6th to 13th rows. In detail, "Matsumoto" is shown as a person who plays the role of the owner group of the CG track. That is, it means that "Matsumoto" has supervised and edited the CG track responsibly.

In addition, the editing result of the CG track is shown on the 9th to 12th rows. Specifically, the editing data 1251 shows a content of subtitles editing where the subtitle between "Mark In Point 00:01:00:02" and "Mark Out Point 00:01:30:02" of an event included in the video track is cut out.

As shown in FIG. 29, the set content 1261 relating to the editor "Matsumoto" who plays the role of subtitles editing corresponds to the editing data 1251 which shows the editing result of the subtitles editing. That is, it is configured such that the set content 1261 can be referred to from the editing data 1251.

Specifically, it is understood that the name of the director who supervises "Matsumoto" is "Itou" from the description after the "Director" on the 3rd row, in the set content 1261 relating to "Matsumoto". In addition, it is understood that the authority given to "Matsumoto" is "Read, change, and write" of a material from the description after the "Authorization" on the 4th row. It is understood that the "behavior expected from another editor" for "Matsumoto" is "Subtitles edit" from the description after the "Context" on the 5th row. For this reason, it is understood that the command of the editing operation which enables the editing is "Add edit" among the editing operations included in the "Subtitles edit" from the description after the "Edit commands" on the 6th row.

When comparing the set content 1261 relating to "Matsumoto" to the set content 1191 shown in FIG. 28, it is possible to understand that the name of the director who supervises "Matsumoto" is changed from "Tanaka" to "Itou" from the description after the "Director" on the 3rd row. In addition, it is understood that the authority given to "Matsumoto" is changed to "Read, change, and write" from "Read" of a material from the description after the "Authorization" on the 4th row. In addition, it is understood that the "behavior expected from another editor" for "Matsumoto" is changed from "Cut edit" to "Subtitles edit" from the description after the "Context" on the 5th row. Further, it is understood that the command of the editing operation which enables the editing for "Matsumoto" is change from "Trim" to "Add edit" from the description after the "Edit commands" on the 6th row.

In addition, as shown in FIG. 29, the pieces of editing data 1171 and 1172 which show the cut editing of the video track and audio track are changed so that only the set content 1182 relating to the editor "Tanaka" who plays the role of cut editing is to correspond thereto. That is, it is configured such that only the set content 1182 can be referred to from the pieces of editing data 1171 and 1172.

In this manner, when the role for each editor is changed by the director, it is also reflected in the result of the simultaneous and parallel editing processing, and the content thereof is changed. Accordingly, it is possible to perform a flexible editing work, and make the efficiency of editing higher.

In addition, in the examples in FIGS. 27 to 29, as well, the worker or the like can obtain further detailed information of the work content, by referring to the set content about the respective corresponding roles for each editor from the editing data of the data structure.

In addition, in the examples in FIGS. 27 to 29, the data structure is configured such that it is possible to refer to the corresponding respective set contents about the role for each editor from the editing data of the data structure. However, in contrast to this, it is also possible to further configure the set contents relating to the roles for each editor such that the editing data to which each data structure corresponds can be referred to from the set contents relating to the role for each editor. It is needless to say that the set contents can be referred to from both. In this manner, the worker himself is able to easily confirm the result of editing processing during executing, or after the executing.

Further, since the set content of the role for each editor can be changed, for example, it is possible to apply the above fact to education of the editing work. For example, a person who is in a position of educating the editing work (hereinafter, referred to as a trainer) can change the number of commands and the types of commands of the editing operation which can be used by a person who is in a position of being educated (hereinafter, referred to as a trainee), according to the level of the trainee.

Specifically, the trainer sets the number of commands of the editing operation which can be used by the trainee to be smaller than the number which can be used by the trainer himself, first. In addition, the trainer can change the number of commands and the types of commands of the editing operation which can be used by the trainee according to the level of the editing technique of the trainee. That is, if the level of the editing technique of the trainee is high, the trainer is able to add the number of commands of the editing operation which can be used by the trainee, and further change to the command with high degree of difficulty to be used. On the other hand, when the level of the editing technique of the trainee is low, the trainer is able to reduce the command of the editing operation which can be used by the trainee, and to change only to the command with low degree of difficulty to be used. In this manner, the trainer is able to make the level of the editing technique of the trainee effective and high by changing the set content of the role of the trainee. As a result, it is possible to make the quality of the content as the editing result uniform.

In addition, for example, when the trainer and trainee use the same content as the editing target, it is possible to make the efficiency of the editing work high, when the trainer sequentially and appropriately changes the command of editing operation which can be used by the trainee.

The form of the simultaneous and parallel editing system described using FIGS. 1 to 29 is only an example, and is not limited to this. Accordingly, another example of the relationship between persons who are relating to the simultaneous and parallel editing work, the configuration example of the simultaneous and parallel editing system, the functional configuration example of the simultaneous and parallel editing system, the processing of the simultaneous and parallel editing system will be described.

Figure 30:
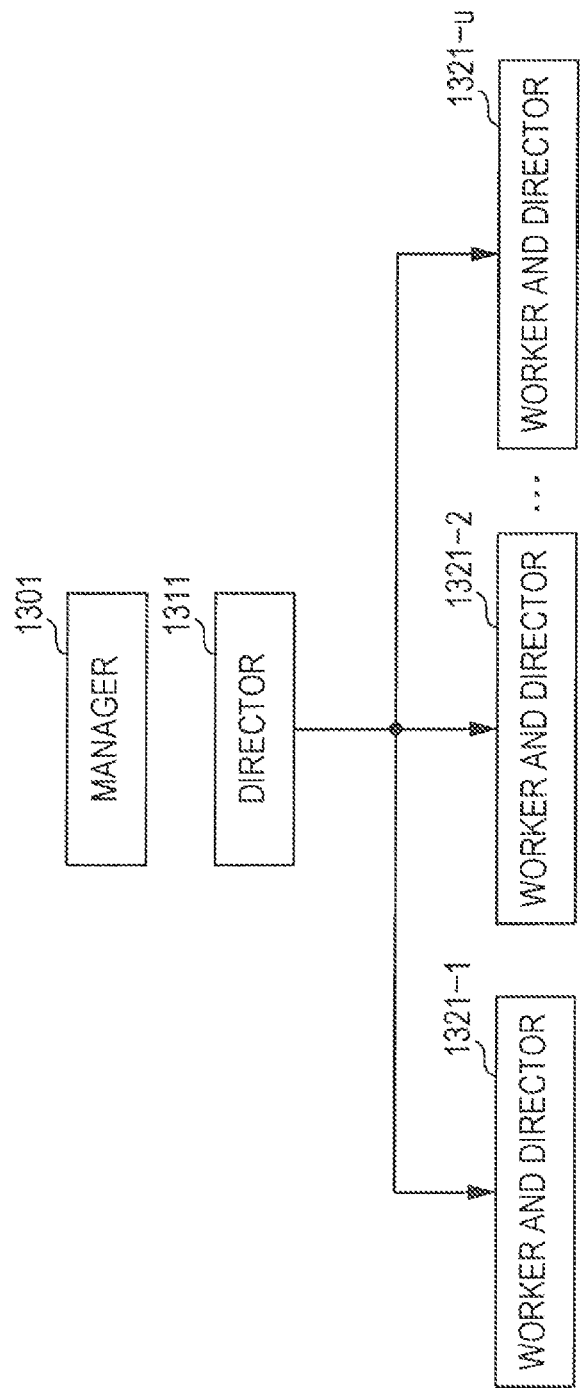
FIG. 30 is another diagram which shows the relationship of the characters relating to the simultaneous and parallel editing work.

Example of Relationship Between Persons Relating to Simultaneous and Parallel Editing Work FIG. 30 is a diagram which shows a relationship between persons relating to simultaneous and parallel editing work, and describes an example which is different from FIG. 1.

As shown in FIG. 30, a manager 1301 is present as a positioning independent from the editor, and manages the editing system in the embodiment.

On the other hand, the relationship of an editor as a director and worker is hierarchically structured.

In the example in FIG. 30, the director 1311 supervises the editing work of the workers and directors 1321-1 to 1321-*u* (u is a natural number of one or more).

The workers and directors 1321-1 to 1321-*u* are able to supervise one or more workers, or the workers and directors of the lower level under a supervision of the director 1311, and to perform the editing work simultaneously and in parallel, respectively.

The simultaneous and parallel editing work can be applied to the production of a plurality of contents, not only to the production of one content item. For example, it is possible to produce a predetermined content using the simultaneous and parallel editing work, and to produce a separate content using the produced predetermined content. Specifically, for example, it is possible to perform the editing work of the original version and the abridged version simultaneously and in parallel. In this case, in the related diagram shown in FIG. 30, the workers and directors 1321-1 to 1321-*u* are respectively in charge of the editing work of the original version, and the director 1311 is in charge of the editing work of the abridged version.

In this manner, it is possible to flexibly change the relationship of the editors who are hierarchically structured, according to the form of the content as the target of the simultaneous and parallel editing work. Configuration example of simultaneous and parallel editing system Subsequently, the configuration example of the simultaneous and parallel editing system, and as a different example from FIG. 3 will be described using FIGS. 31 to 34.

Figure 31:
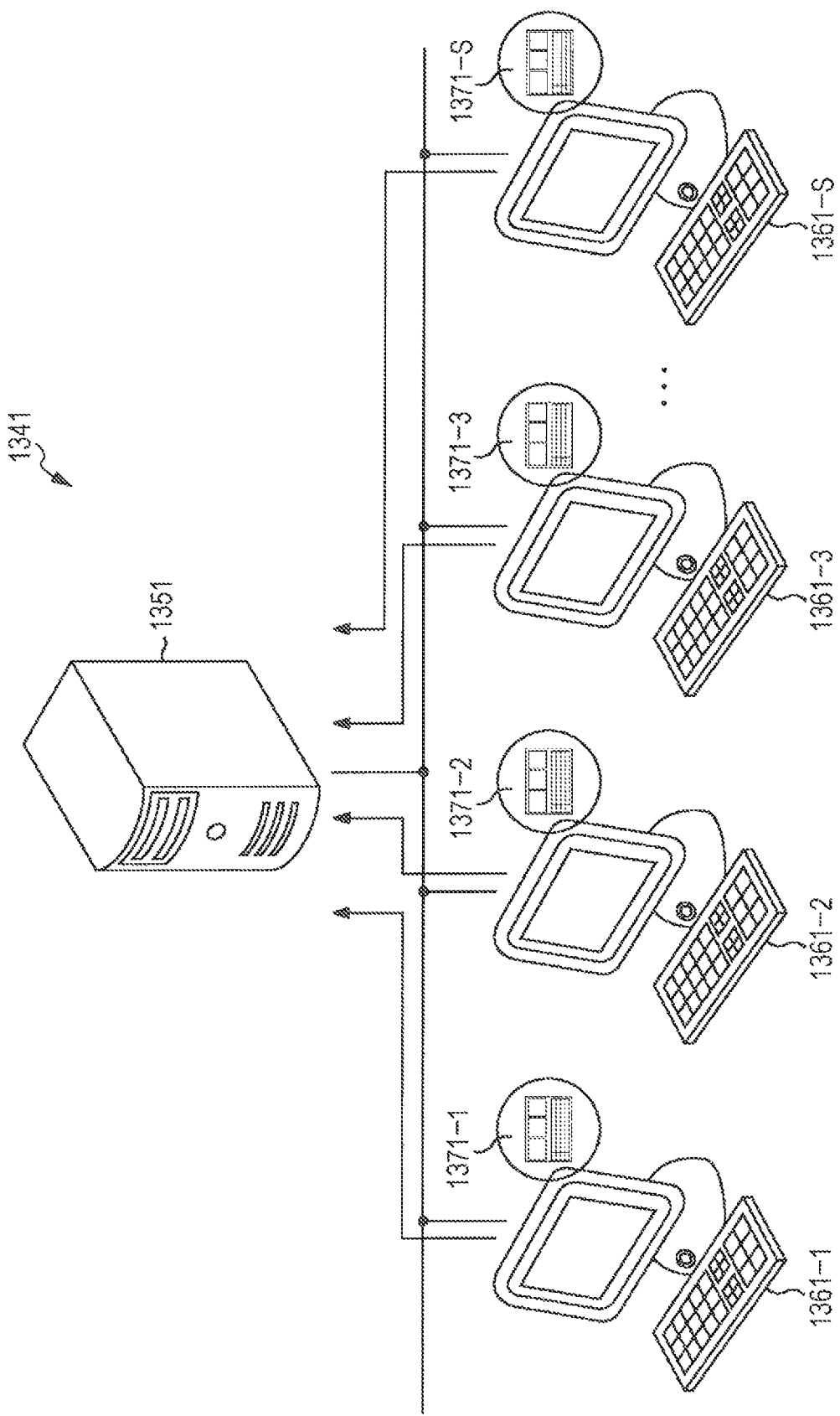
FIG. 31 is a block diagram which shows another configuration example of the simultaneous and parallel editing system.

FIG. 31 is a block diagram which shows another configuration example of the simultaneous and parallel editing system.

As shown in FIG. 31, the simultaneous and parallel editing system 1341 includes one server 1351, and S (S is a natural number of one or more) information processing terminals 1361-1 to 1361-S. Each of the server 1351 and information processing terminals 1361-1 to 1361-S is connected to each other through a cable, a LAN, or the like. In addition, when it is not necessary to separately distinguish the information processing terminals 1361-1 to 1361-S, these are collectively referred to as the information processing terminal 1361.

The basic function of the server 1351 in the simultaneous and parallel editing system 1341 in FIG. 31 is the same as that of the simultaneous and parallel editing client manager 111 in FIG. 3. That is, the function of the simultaneous and parallel editing client manager is mounted on the server 1351. On the other hand, the basic function of the information processing terminal 1361 in the simultaneous and parallel editing system 1341 is the same as that of the simultaneous and parallel editing client 121 in FIG. 3 other than the entire function of editing work, however, the mounting location may be the server 1351, without being limited to the information processing terminal 1361, particularly.

In addition, the entire function of editing work among functions of the simultaneous and parallel editing client 121 in FIG. 3 is exerted by respective editing applications 1371-1 to 1371-S. In the example in FIG. 31, the respective editing applications 1371-1 to 1371-S are mounted on the information processing terminals 1361-1 to 1361-S, respectively. In addition, hereinafter, when it is not necessary to separately classify the editing applications 1371-1 to 1371-S, these are collectively referred to as the editing application 1371. In this manner, it is possible to realize the same function as that of the simultaneous and parallel editing client 121 as the dedicated terminal by installing the editing application 1371 to a personal computer as a general-purpose terminal, or the like.

The information processing terminal 1361 executes the login and log out processing with respect to the server 1351. In addition, the information processing terminal 1361 performs transceiving of a variety of information such as editing information or the like to and from the server 1351. In addition, the information processing terminal 1361 performs session management with the editing application 1371.

The editing application 1371 has the entire function which is necessary for the editing work as described above. That is, the editing application 1371 has the entire function which is necessary for the editing work included in the simultaneous and parallel editing client 121 in FIG. 3, instead of the simultaneous and parallel editing client 121. In addition, the editing application 1371 transceives the editing information to and from the information processing terminal 1361.

In the example in FIG. 31, the information processing terminal 1361 functions as a proxy (relay) of the server 1351 and the editing application 1371. Accordingly, for example, even when a failure occurs in the editing application 1371, it is possible to avoid the influence on the entire simultaneous and parallel editing system 1341.

In addition, the simultaneous and parallel editing system 101 shown in FIG. 3 and the simultaneous and parallel editing system 1341 shown in FIG. 31 can be realized as a 2-tier client server system, or 3-tier client server system. For example, in FIG. 31, even if the editing application 1371 is a part of a Web application of the 3-tier client server system, it is possible to realize the simultaneous and parallel editing system 1341. In that case, the server 1351 and the information processing terminal 1361 are hosted by a server which is not shown.

Figure 32:
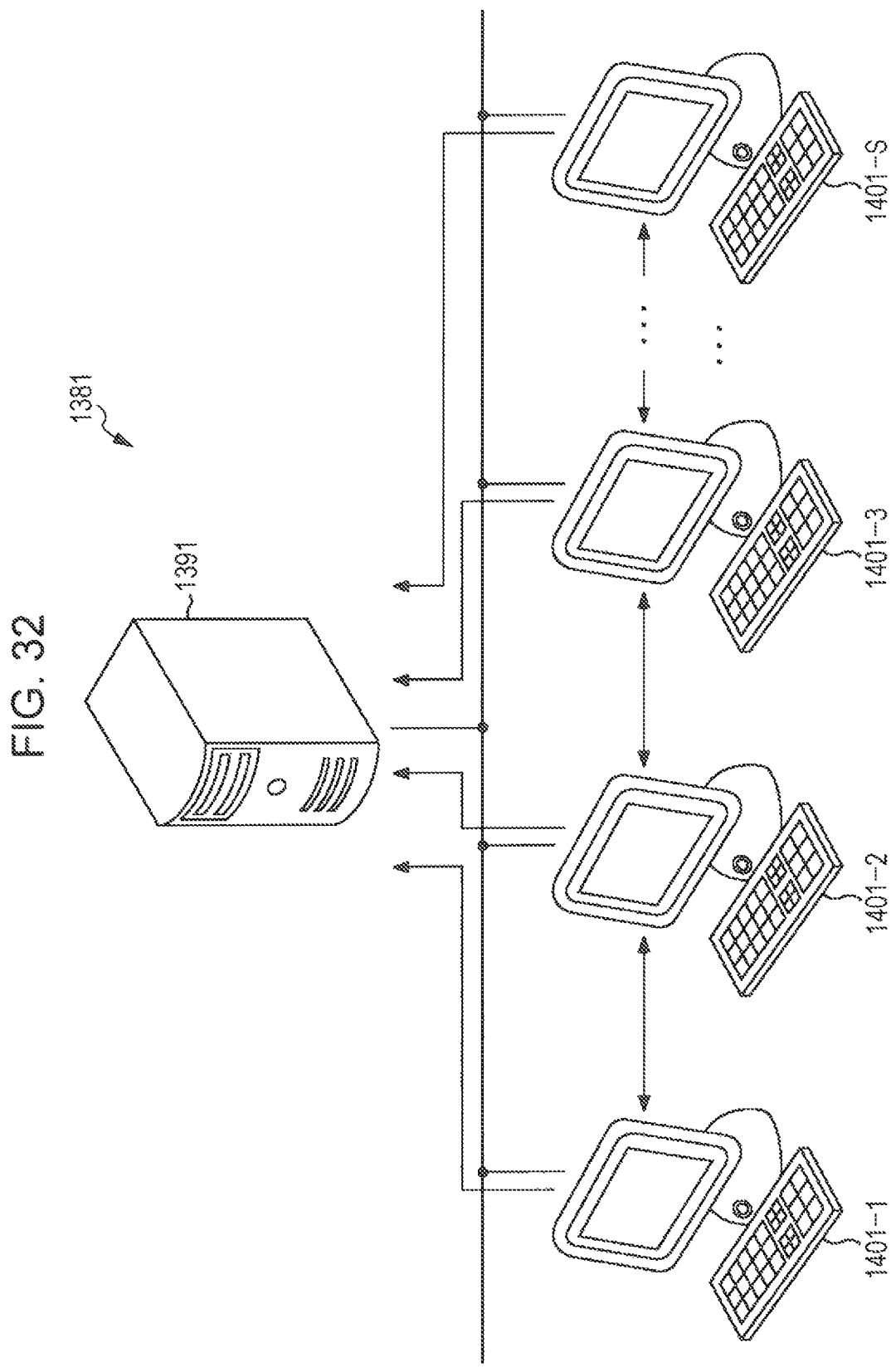
FIG. 32 is a block diagram which shows another configuration example of the simultaneous and parallel editing system.

FIG. 32 is a block diagram which shows another configuration example of the simultaneous and parallel editing system.

As shown in FIG. 32, the simultaneous and parallel editing system 1381 includes one sever 1391 and S (S is a natural number of one or more) information processing terminals 1401-1 to 1401-S. Each of the server 1391 and information processing terminals 1401-1 to 1401-S is connected to each other through a cable, a LAN, or the like. Further, each of the information processing terminals 1401-1 to 1401-S is connected to each other through a cable, a LAN, or the like. In addition, when it is not necessary to separately distinguish the information processing terminals 1401-1 to 1401-S, these are collectively referred to as information processing terminals 1401. The basic function of the server 1391 in the simultaneous and parallel editing system 1381 in FIG. 32 is the same as that of the simultaneous and parallel editing client manager 111 in FIG. 3. That is, the function of the simultaneous and parallel editing client manager is mounted on the server 1391. On the other hand, the basic function of the information processing terminal 1401 in the simultaneous and parallel editing system 1381 is the same as that of the simultaneous and parallel editing client 121 in FIG. 3. That is, the function of the simultaneous and parallel editing client is mounted on the information processing terminal 1401.

The server 1391 performs managing of login information of the information processing terminal 1401. The login information of the information processing terminal 1401 is information which shows the address or session state of the information processing terminal 1401.

The information processing terminal 1401 performs login and log out processing with respect to the server 1391. In addition, the information processing terminal 1401 performs the session state management with other information processing terminal 1401 than the own terminal. In addition, the information processing terminal 1401 performs transceiving of a variety of information such as editing information, or the like, to and from other information processing terminal 1401 than the own terminal. Further, the information processing terminal 1401 includes the entire necessary functions for the editing work.

The configuration of the simultaneous and parallel editing system 1381 shown in FIG. 32 is a "one-to-one" Peer-to-Peer-type, and the holding type of index information has a configuration of a "Hybrid P2P (Peer-to-Peer) type" which is referred to as a P2P-type. In addition, the peer is a communication terminal. The communication terminal means a personal computer, in general, and it means each device which configures the simultaneous and parallel editing system 1381 in here. In addition, the index information means information in which an IP address of a communication terminal having specified editing information and the editing information are combined.

When it is the "one-to-one" Peer-to-Peer-type, the exchange of one-to-one editing information is performed between the communication terminals. When a holding type of the index holding information is the "Hybrid P2P type", the index information is managed by the center index server. In the example in FIG. 32, the server 1391 corresponds to the index server. Accordingly, the server 1391 manages the index information.

In addition, in the example in FIG. 32, as well, similarly to the example shown in FIG. 31, respective information processing terminal 1401 may have the editing application 1371. In this case, the editing application 1371 has the entire function of the information processing terminal 1401 which is necessary for the editing work, instead of the information processing terminal 1401.

Figure 33:
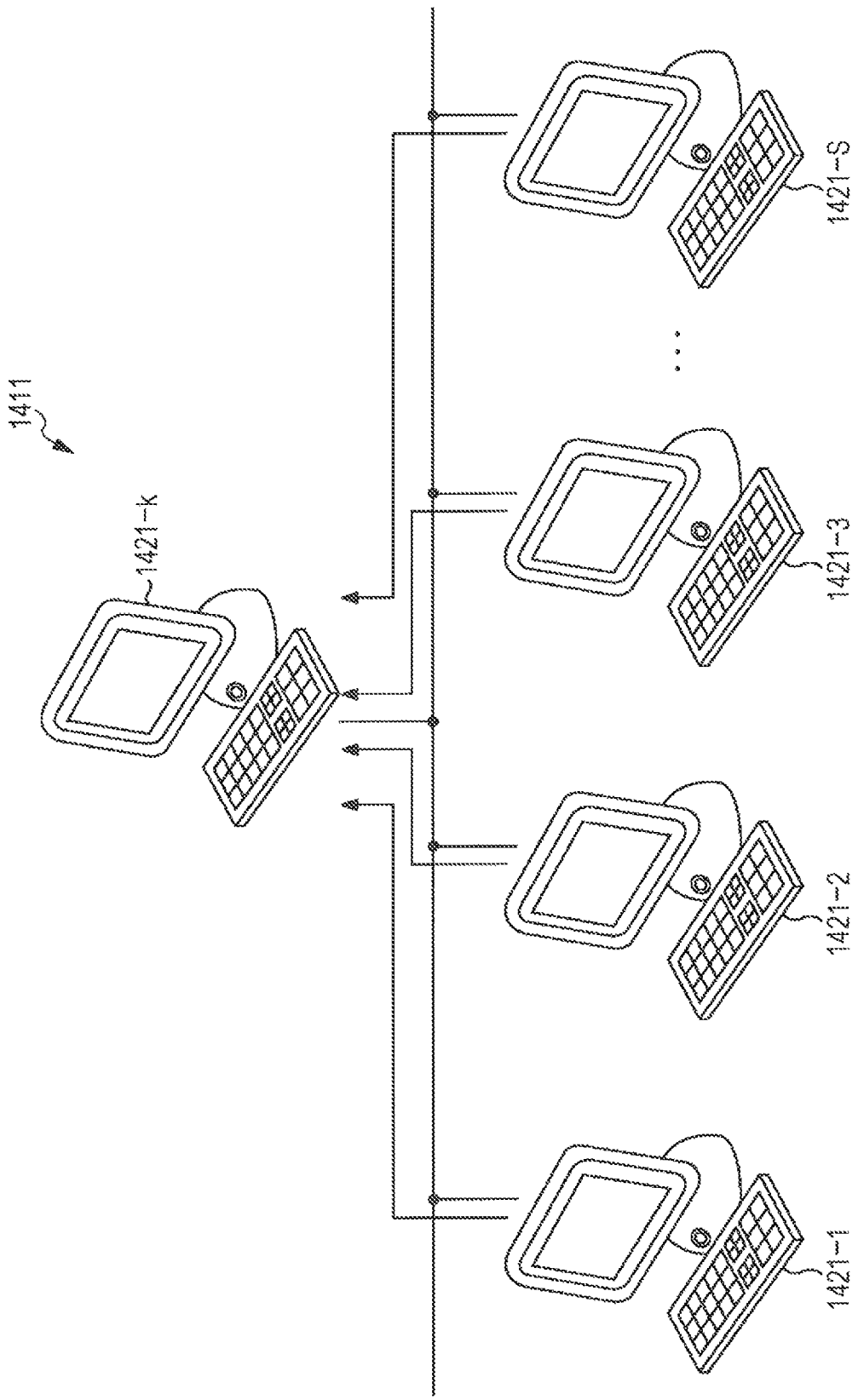
FIG. 33 is a block diagram which shows another configuration example of the simultaneous and parallel editing system.

FIG. 33 is a block diagram which shows another configuration example of the simultaneous and parallel editing system.

As shown in FIG. 33, a simultaneous and parallel editing system 1411 has S (S is a natural number of one or more) information processing terminals 1421-1 to 1421-S. The respective information processing terminals 1421-1 to 1421-S are connected to each other through a cable, a LAN, or the like. In addition, hereinafter, when it is not necessary to separately distinguish the information processing terminals 1421-1 to 1421-S, these are collectively referred to as the information processing terminal 1421.

In the example in FIG. 33, at least a part of the role of the simultaneous and parallel editing client manager 111 in FIG. 3 is delegated to an arbitrary information processing terminal 1421-$k$ ($k$ is an arbitrary natural number, and is equal to, or less than S). That is, functions of the information processing terminal 1421-$k$ are the same as those of the simultaneous and parallel editing client manager 111 in FIG. 3. That is, the function of the simultaneous and parallel editing client manager is mounted on the information processing terminal 1421-$k$. The function of the information processing terminal 1421 other than the information processing terminal 1421-$k$ is the same as that of the simultaneous and parallel editing client 121 in FIG. 3. The function of the information processing terminal 1421 is mounted on the information processing terminal 1421 other than the information processing terminal 1421-$k$.

Figure 34:
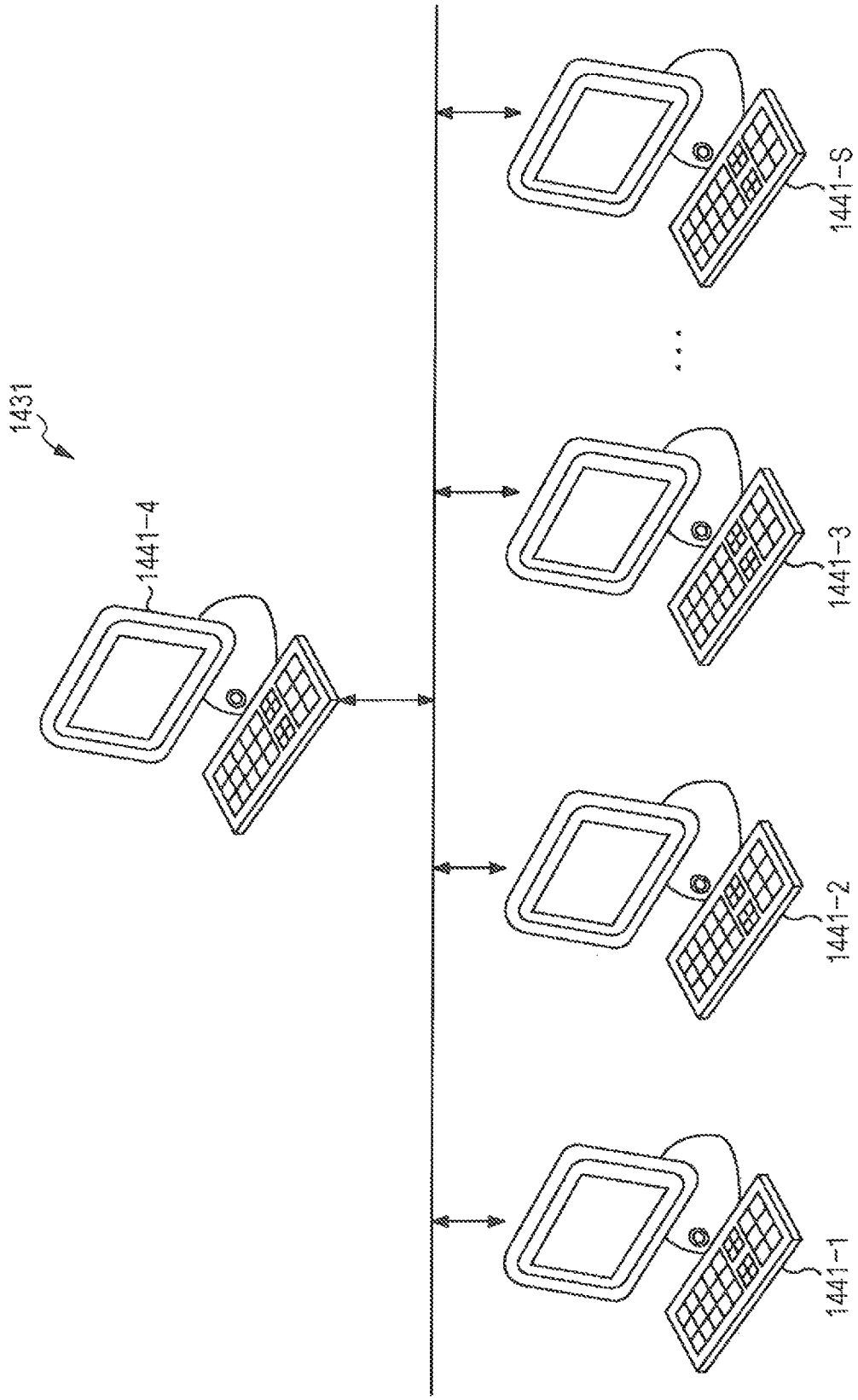
FIG. 34 is a block diagram which shows another configuration example of the simultaneous and parallel editing system.

FIG. 34 is a block diagram which shows another configuration example of the simultaneous and parallel editing system.

As shown in FIG. 34, a simultaneous and parallel editing system 1431 has S (S is a natural number of one or more) information processing terminals 1441-1 to 1441-S. The respective information processing terminals 1441-1 to 1441-S are connected to each other through a cable, a LAN, or the like. In addition, when it is not necessary to separately distinguish the information processing terminals 1441-1 to 1441-S, these are collectively referred to as the information processing terminal 1441. The basic function of the information processing terminal 1441 in the simultaneous and parallel editing system 1431 is the same as that of the simultaneous and parallel editing client 121 in FIG. 3. That is, the function of the simultaneous and parallel editing client 121 is mounted on the information processing terminal 1441.

In the example in FIG. 34, each information processing terminal 1441 performs registration with each other, and broadcasts a variety of information such as editing information, or the like. In addition, the information processing terminal 1441 includes the entire necessary function for the editing work.

In addition, in the examples in FIGS. 33 and 34, as well, similarly to the example in FIG. 31, the respective information processing terminals 1421 and 1441 may have the editing application 1371. In this case, the editing application 1371 has the entire necessary function for the editing work of the information processing terminals 1421 and 1441, instead of the information processing terminals 1421 and 1441.

In addition, in the above described simultaneous and parallel editing system, it is possible to perform the editing work not only between the different editing applications, but also between the same editing applications. That is, for example, it is also possible to perform the editing work simultaneously and in parallel between a non-linear video editing application which is used in video and audio editing, and a non-linear audio editing application which is used in audio editing. In such a case, a role for audio editing is set to an editor who operates the information processing terminal on which the non-linear audio editing application is mounted, and the work content relating to the audio editing work is allotted.

As described above using FIGS. 31 to 34, it is possible to flexibly configure the simultaneous and parallel editing system, according to the circumstances in which the simultaneous and parallel editing work is performed. Configuration example of another function of simultaneous and parallel editing system Subsequently, a functional configuration example of simultaneous and parallel editing system which is different from the example in FIG. 4 will be described using FIGS. 35 and 36.

Figure 35:
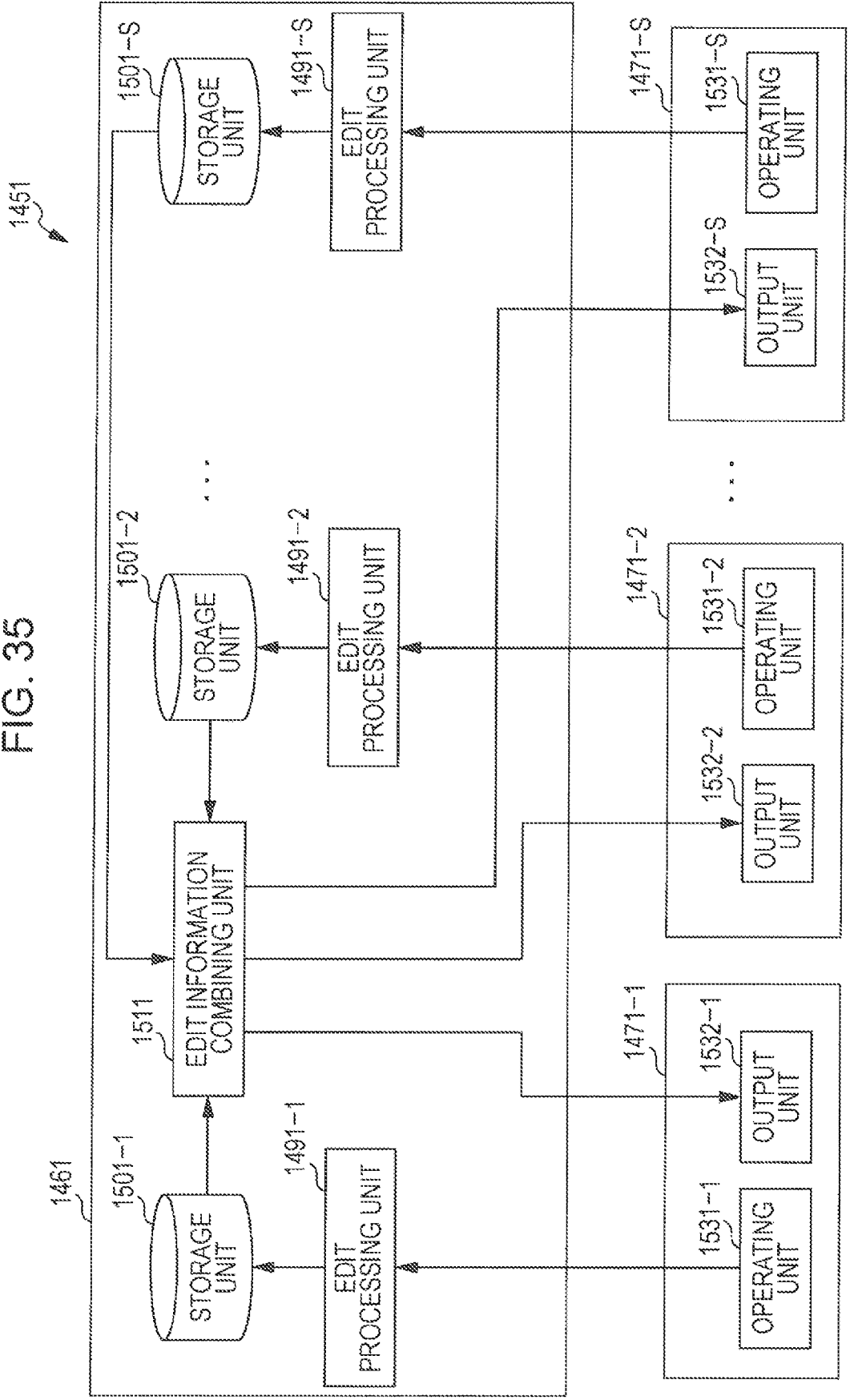
FIG. 35 is a block diagram which shows another functional configuration example of the simultaneous and parallel editing system.

FIG. 35 is a functional block diagram which describes another functional configuration example of the simultaneous and parallel editing system.

A simultaneous and parallel editing system 1451 includes the simultaneous and parallel editing client manager 1461, and the simultaneous and parallel editing clients 1471-1 to 1471-S (S is a natural number of one or more).

The simultaneous and parallel editing client manager 1461 includes the editing processing units 1491-1 to 1491-S, the storage units 1501-1 to 1501-S, and the editing information combining unit 1511. In addition, hereinafter, when it is not necessary to separately distinguish the editing processing units 1491-1 to 1491-S and the storage units 1501-1 to 1501-S, these are collectively referred to as the editing processing unit 1491 and the storage unit 1501.

When a control signal is transmitted from the operation units 1531-1 to 1531-S of the corresponding simultaneous and parallel editing clients 1471-1 to 1471-S to be described later, the editing processing units 1491-1 to 1491-S receives the control signal, and executes a control relating to a variety of editing processing with respect to a material, on the basis of the content thereof. In addition, as described in FIG. 4, in the control relating to the editing processing, the executing principal of the editing processing, and the number of the executing principals are not particularly limited. In addition, when a device other than the simultaneous and parallel editing client manager 1461 becomes the executing principal, processing of transmitting a variety of information accompanying the editing processing from one device to another device, processing of a variety of information, or processing of changing the information is also included in the control relating to the editing processing.

A storage unit 1501 respectively stores the material in which such editing processing is performed by the editing processing unit 1471 as the editing information. In addition, the storage unit 1501 stores the whole information regarding the other simultaneous and parallel editing work as the editing information. Further, the storage unit 1501 stores the login information.

The editing information combining unit 1511 combines the editing information stored in the storage units 1501-1 to 1501-S, and transmits the combined editing information to output units 1532-1 to 1532-S of the simultaneous and parallel editing clients 1471-1 to 1471-S.

A simultaneous and parallel editing client 1471-$k$ ($k$ is an integer value in any one of 1 to S) includes an operation unit 1531-$k$, and output unit 1532-$k$. Hereinafter, when it is not necessary to separately distinguish the operation units 1531-1 to 1531-S, they are collectively referred to as the operation unit 1531. In addition, when it is not necessary to separately distinguish the output units 1532-1 to 1532-S, they are collectively referred to as the output unit 1532.

The operation unit 1531 receives various operations accompanying the editing work performed by editors, and supplies a control signal corresponding to the operation to the corresponding editing processing unit 1491.

The output unit 1532 produces output data on the basis of the editing information which is combined in the editing information combining unit 1511. The output data which is produced by the output unit 1532 is supplied to a display, a speaker, or the like (not shown), and corresponding moving images, voice, or the like are output.

In the example in FIG. 35, since the editing information which is edited in respective editing processing units 1491-1 to 1491-S is usually stored in the corresponding storage units 1501-1 to 1501-S by being divided, even if a failure occurs at a part of the storage unit 1501, it is possible to avoid the influence in the entire simultaneous and parallel editing system 1451.

Figure 36:
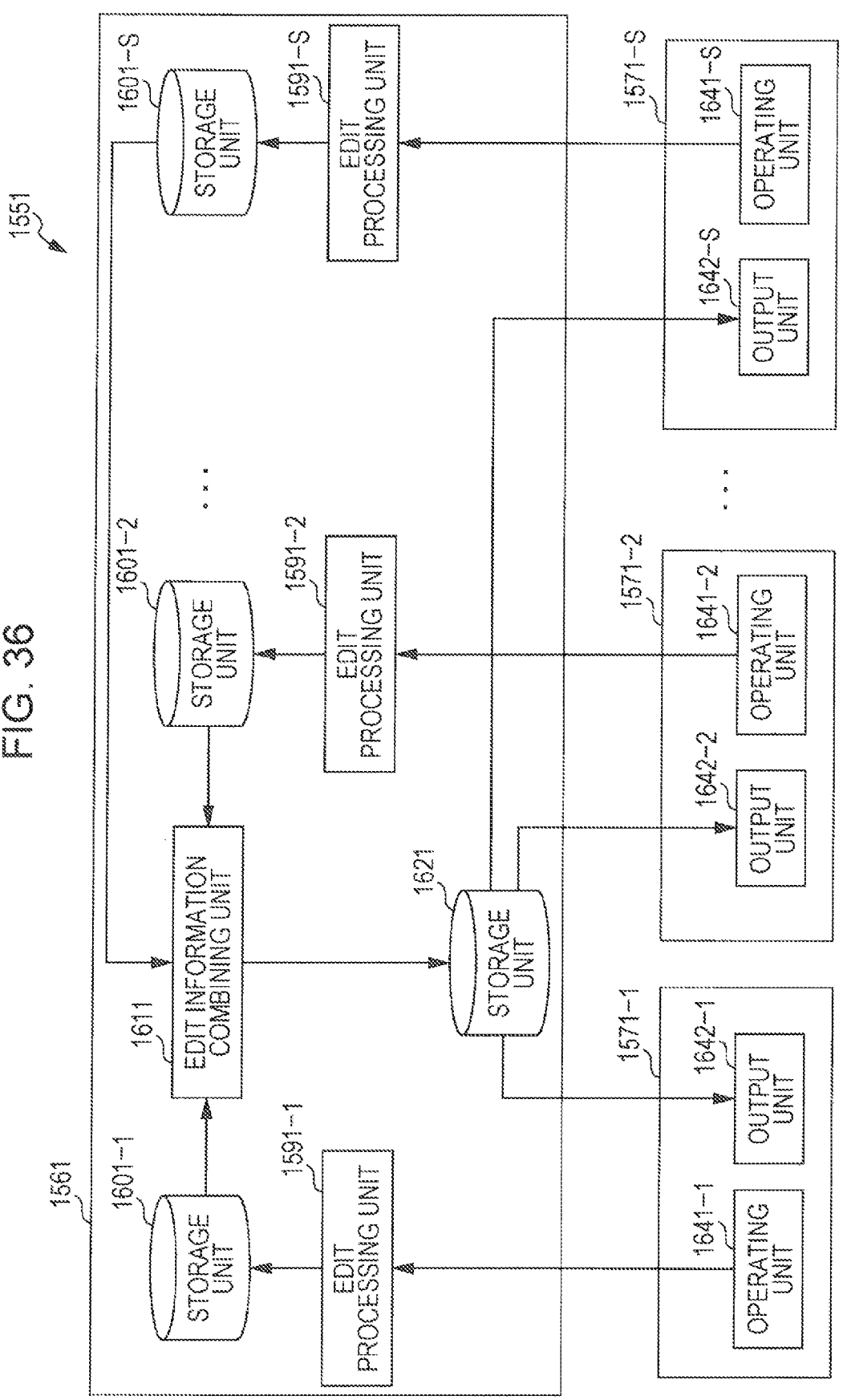
FIG. 36 is a block diagram which shows another functional configuration example of the simultaneous and parallel editing system.

FIG. 36 is a functional block diagram which describes another functional configuration example of the simultaneous and parallel editing system.

A simultaneous and parallel editing system 1551 includes a simultaneous and parallel editing client manager 1561, and simultaneous and parallel editing clients 1571-1 to 1571-S (S is a natural number of one or more).

The simultaneous and parallel editing client manager 1561 includes editing processing units 1591-1 to 1591-S, storage units 1601-1 to 1601-S, editing information combining unit 1611, and a storage unit 1621. In addition, hereinafter, when it is not necessary to separately distinguish the editing processing units 1591-1 to 1591-S, and the storage units 1601-1 to 1601-S, they are collectively referred to as the editing processing unit 1591 and the storage unit 1601.

When a control signal is transmitted from the corresponding simultaneous and parallel editing clients 1571-1 to 1571-S, the editing processing units 1591-1 to 1591-S receives the control signal, and executes the control relating to the variety of editing processing with respect to a material, on the basis of the content thereof. In addition, as described in FIG. 4, in the control relating to the editing processing in here, the executing principal of the editing processing, and the number of the executing principals are not particularly limited. In addition, when a device other than the simultaneous and parallel editing client manager 1561 becomes the executing principal, processing of transmitting a variety of information accompanying the editing processing from one device to another device, processing of a variety of information, or processing of changing the information is also included in the control relating to the editing processing.

The storage units 1601-1 to 1601-S respectively stores a material in which the editing processing is performed by such corresponding editing processing units 1591-1 to 1591-S as the editing information. In addition, the storage units 1601-1 to 1601-S store the whole information regarding the other simultaneous and parallel editing work as the editing information. Further, the storage units 1601-1 to 1601-S store the login information.

An editing information combining unit 1611 combines the editing information stored in the storage units 1601-1 to 1601-S, and supplies the combined editing information to a storage unit 1621.

The storage unit 1621 stores editing information which is combined by an editing information combining unit 1611. In addition, the storage unit 1621 transmits the stored editing information to the output units 1642-1 to 1642-S of the simultaneous and parallel editing clients 1571-1 to 1571-S.

A simultaneous and parallel editing client 1571-*k* (k is an integer value in any one of 1 to S) includes an operation unit 1641-*k*, and output unit 1642-*k*. Hereinafter, when it is not necessary to separately distinguish the operation units 1641-1 to 1641-S, they are collectively referred to as the operation unit 1641. In addition, when it is not necessary to separately distinguish the output units 1642-1 to 1642-S, they are collectively referred to as the output unit 1642.

The operation unit 1641 receives various operations accompanying the editing work performed by editors, and supplies a control signal corresponding to the operation to the corresponding editing processing unit 1591.

The output unit 1642 produces output data on the basis of the editing information which is stored in the storage unit 1621. The output data which is produced by the output unit 1642 is supplied to a display, a speaker, or the like (not shown), and corresponding moving images, voice, or the like are output.

In the example in FIG. 36, since the editing information which is edited in respective editing processing units 1591 is usually stored in the corresponding storage unit 1601 by being divided, even if a failure occurs at a part of the storage unit 1601, it is possible to avoid the influence in the entire simultaneous and parallel editing system 1551. In addition, the editing information which is combined in the editing information combining unit 1611 is temporarily stored in the storage unit 1621. Accordingly, even if a failure occurs at a part of the storage unit 1601, it is possible to restore the editing information which is stored in the part of the storage unit 1601 of which a part failed, from a difference of the editing information between the other storage unit 1601 and the storage unit 1621.

In addition, as described in FIG. 31, the simultaneous and parallel editing client managers 1461 and 1561 in FIGS. 35 and 36 are not hardware such as an information processing terminal, or a server, but they are functional blocks which exert a function of the simultaneous and parallel editing client manager. Similarly, the simultaneous and parallel editing clients 1471 and 1571 in FIGS. 35 and 36 are not the hardware such as the information processing terminal, or the server, but they are functional blocks which exert the function of the simultaneous and parallel editing client. Accordingly, hardware which is stored with these function blocks is not particularly limited, and there may be a case where a part of the function is divided, and is stored in separate hardware.

Figure 37:
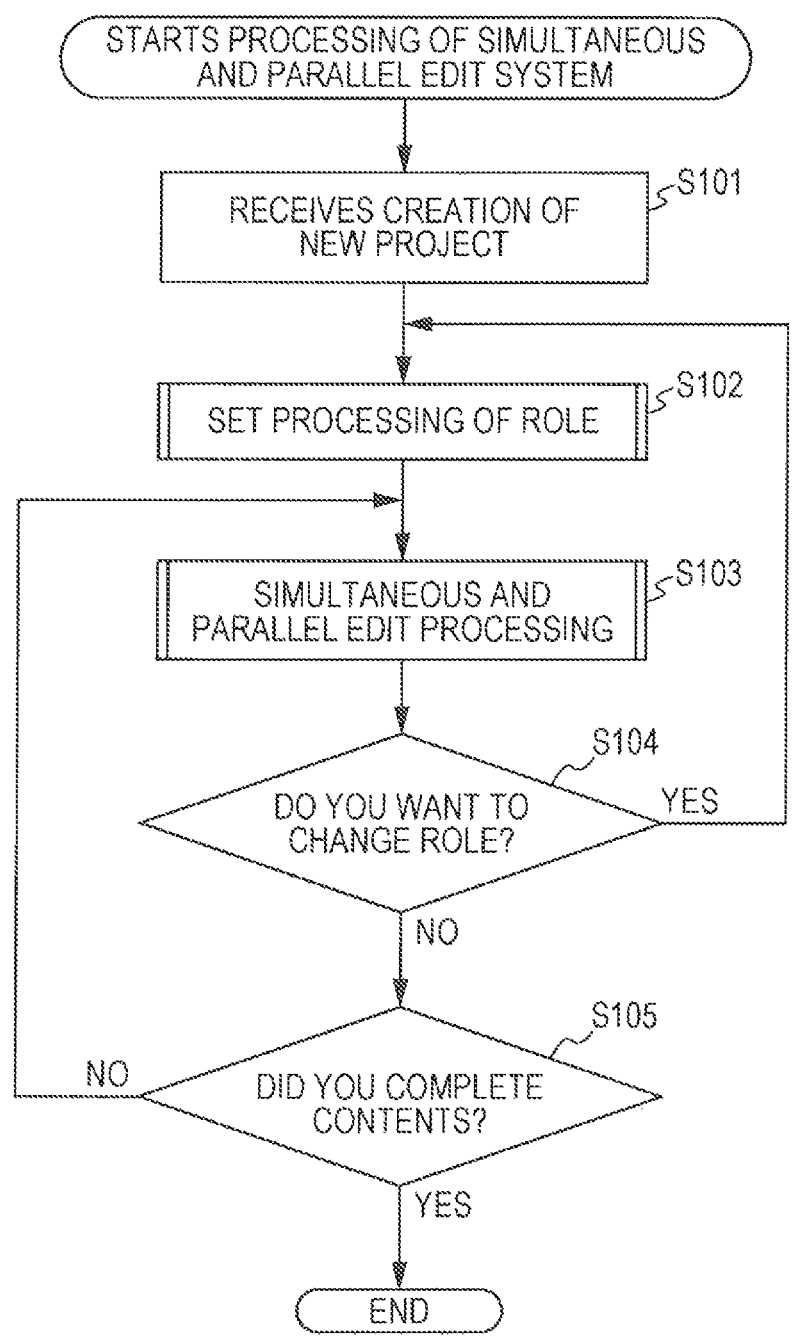
FIG. 37 is a flowchart which describes an example of processing of the simultaneous and parallel editing system.
Figure 38:
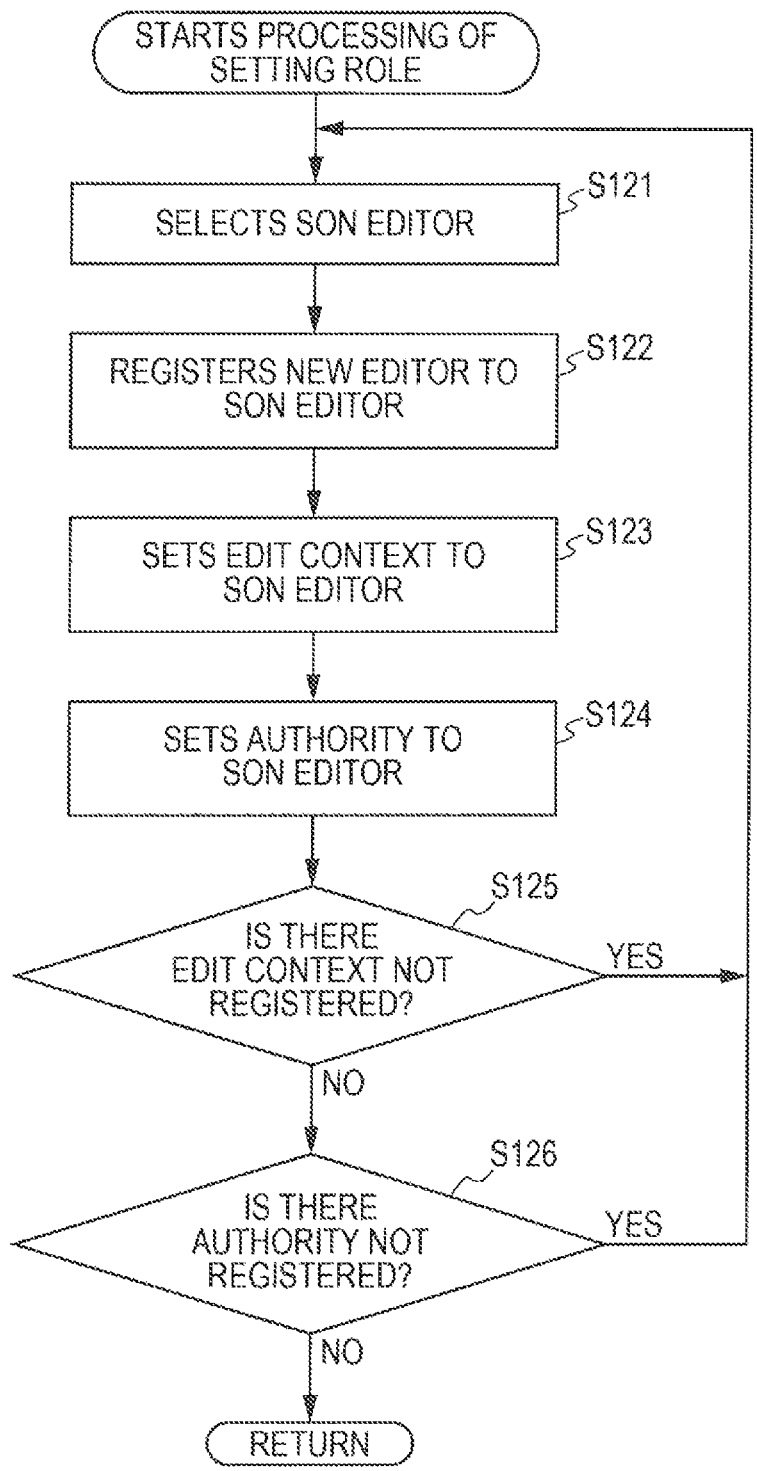
FIG. 38 is a flowchart which describes an example of the setting processing of the role.
Figure 39:
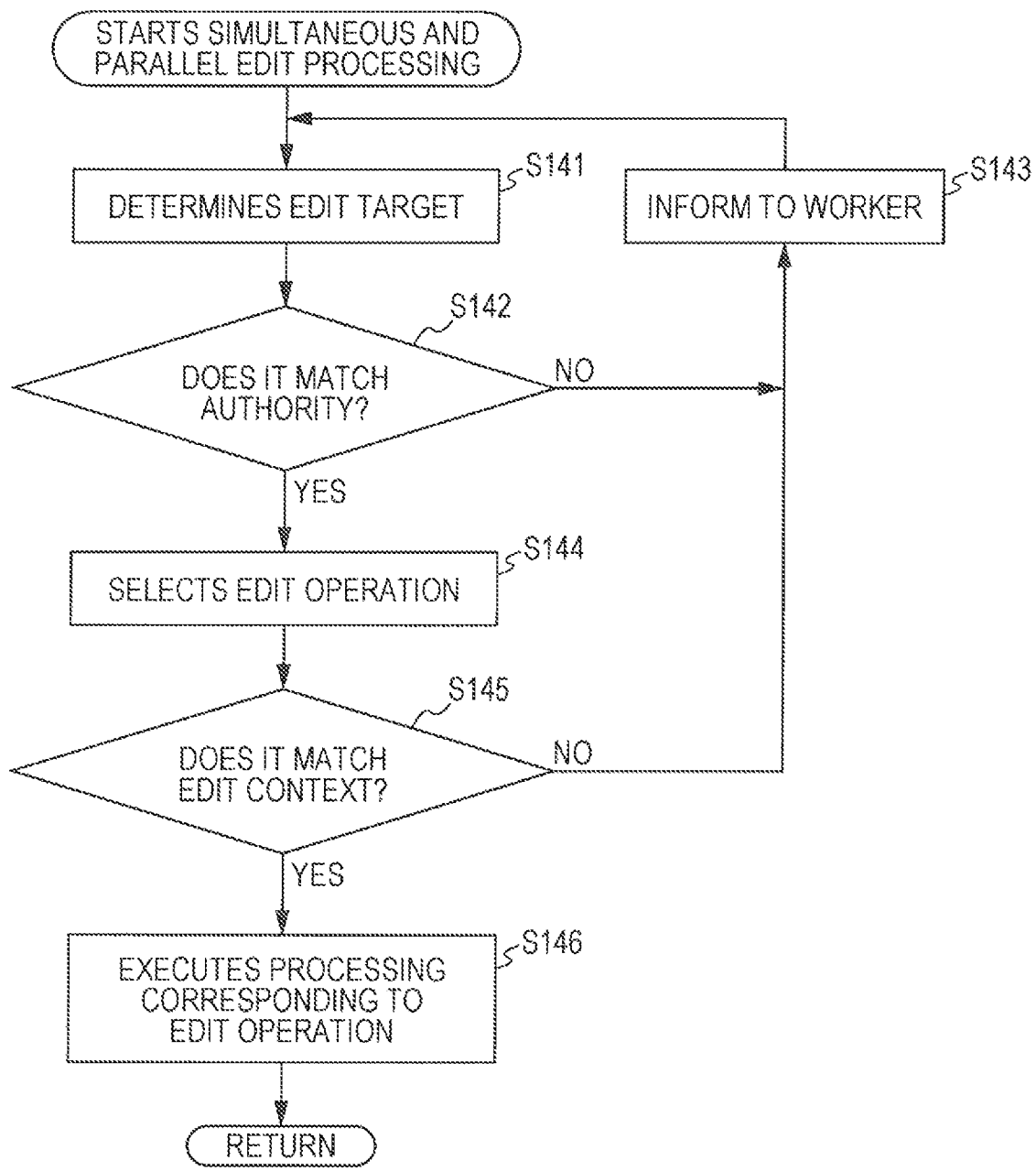
FIG. 39 is a flowchart which describes an example of the simultaneous and parallel editing system.

As described above, it is possible to obtain an effect in which a plurality of editors can perform the simultaneous and parallel editing work in a multi-user environment, according to the embodiments described using FIGS. 1 to 36. In other words, the configuration of the simultaneous and parallel editing system for obtaining the effect is not limited to the configuration of the above described embodiments. That is, it is enough for the information processing device which is operated by a plurality of workers, respectively, to have a configuration for transceiving information each other, and to be able to execute processing corresponding to FIGS. 37 to 39 in below. FIGS. 37 to 39 are flowcharts which show the processing of the simultaneous and parallel editing system which is able to obtain an effect in which a plurality of editors can perform the simultaneous and parallel editing work in a multi-user environment.

The simultaneous and parallel editing system includes a device which is operated by a director (hereinafter, referred to as a director device), and a device which is operated by a plurality of workers, respectively (hereinafter, referred to as a worker device). For example, in the example in FIG. 4, the simultaneous and parallel editing client 121-1 corresponds to the director device, and the simultaneous and parallel editing client 121-2 and simultaneous and parallel editing client 121-3 correspond to the worker device.

An Example of Processing of Simultaneous and Parallel Editing System

FIG. 37 is a flowchart which describes an example of processing of the simultaneous and parallel editing system.

In step S101, the director device receives creating of a new project due to an operation of a director. That is, the director determines content and allotment of the editing work of contents to be produced using the simultaneous and parallel editing system, creates as a new project, and inputs.

In step S102, the director device executes set processing of roles due to an operation of the director. Here, a detailed example of the set processing of the role will be described.

FIG. 38 is a flowchart which describes an example of role setting process due to the director device.

In step S121, the director device selects a son editor on the basis of the operation of the director. Here, the son editor is an editor who performs the editing work under the supervision of one director. Hereinafter, the detailed processing will be described using the example in FIG. 2. That is, the son editors "Miura", "Sato", "Tanaka", and "Matsumoto" are selected due to the operation of the director device by "Itou" who is a director, and each name is set after "Name:" on the 2nd row of set contents 71-1, 71-2, 72, and 81.

In step S122, the director device registers a new editor as the son editor, on the basis of the operation of the director. Here, the new editor is an editor who supervises the set son editors. That is, the name "Itou" as the new editor for "Miura", "Sato", and "Tanaka" is set after "Director" on the 3rd row of the set contents 71-1, 71-2, and 72, on the basis of the operation of the director device by "Itou" as the director. In addition, on the basis of the operation of the director device by "Itou" as the director, the name of "Tanaka" as a new editor for "Matsumoto" is set after the "Director" on the 3rd row of the set content 81.

In step S123, the director device sets an editing context to the son editors, on the basis of the operation of the director. That is, the editing context for each son editor is set after "Context" on the 5th row of the set contents 71-1, 71-2, 72, and 81, on the basis of the operation of the director device by "Itou" as the director.

In step S124, the director device sets an authority for the son editor, on the basis of the operation of the director. That is, the authority for each son editor is set after "Authorization" on the 4th row of the set contents 71-1, 71-2, 72, and 81, on the basis of the operation of the director device by "Itou" as a director 11.

In step S125, the director device determines whether or not there is an unregistered editing context.

When it is determined that there is an unregistered editing context, it is determined to YES in step S125, the processing returns to step S121, and the processing thereafter are repeated. That is, during when all of the editing contexts are registered, looping of steps S121 to S125 is repeated. Thereafter, when there is not an unregistered editing context, it is determined to NO in step S125, and the process proceeds to step S126.

In step S126, the director device determines whether or not there is unregistered authority.

When it is determined that there is unregistered authority, it is determined to YES in step S126, the process returns to step S121, and processes thereafter are repeated. That is, during when all of the authorities are registered, the looping of steps S121 to 126 is repeated. Thereafter, when there is not an unregistered authority, it is determined to NO in step S126, and the process of role setting is ended.

Returning to the description of the flowchart in FIG. 37, after the role setting process in step S102, the worker device executes the simultaneous and parallel editing processing by the operation of the worker, in step S103.

Here, a detailed example of the simultaneous and parallel editing processing will be described.

FIG. 39 is a flowchart which describes an example of the simultaneous and parallel editing processing using the worker device.

In step S141, the worker device determines an editing target. Here, the editing target means an event as the editing target.

In step S142, the worker device determines whether or not the authority matches. For example, in the example in FIG. 2, it is determined whether or not the authority given to the editor "Read, change, and write" of a material which is shown after the "Authorization" on the 4th row of the set content 71-1 matches the authority of the worker.

When it is determined that it does not match the authority, it is determined to NO in step S142, and the process proceeds to step S143. For example, when the authority given to "Miura" as a worker is set to only "Read" of which editing is not performed, it is determined that it does not match the authority.

In step S143, the worker device informs the worker. That is, the fact of not matching the authority is informed, for example, by an error display. When it the worker is informed, the process returns to step S141, and the processes thereafter are repeated. That is, until the authority matches, the looping of steps S141 to S143 is repeated. Thereafter, when the authority matches, it is determined to YES in step S142, and the process proceeds to S144.

In step S144, the worker device selects the editing operation. That is, "Change Opacity Level" which is shown after "Edit commands" on the 6th row of the set content 71-1, and is a command of the editing operation to be edited is selected.

In step S145, the worker device determines whether or not the selected editing operation matches the editing context. That is, it is determined whether or not the "Change Opacity Level" which is a command of the editing operation to be edited is the editing operation included in "Video effect editing" as a context of editing which is shown after the "Context" on the 5th row of the set content 71-1.

When it is determined that it does not match the editing context, it is determined to NO in step S145, and the process returns to step S143.

In step S143, the worker device informs the worker. That is, the fact of not matching the editing context is informed, for example, by an error display. When the worker informed, the process returns to the step S141, and the processes thereafter are repeated. That is, until it matches the editing context, the looping of steps S141 to S145 is repeated. Thereafter, when it matches the authority, it is determined to YES in step S145, and the process proceeds to step S146.

In step S146, the worker device executes processing corresponding to the editing operation. That is, the worker device executes editing work due to an editing operation which is selected in the process of step S144, with respect to the editing target which is determined in the process of step S141, by the operation of the worker. In addition, as described above, in the editing work due to these editing operations, a conflict with the work result of another worker occurs.

In this manner, the simultaneous and parallel editing processing is ended.

Returning to the description of the flowchart in FIG. 37, after the above described simultaneous and parallel editing processing in step S103, the director device determines whether or not to change the role by the operation of the director, in step S104. That is, as described using FIGS. 27 to 29, it is determined whether or not to change the role for each editor.

When it is determined to change the role, it is determined to YES in step S104, and the process returns to step S102, and the processes thereafter are repeated. That is, until the changing of role is not performed, the looping of steps S102 to S104 is repeated. Thereafter, when there is no changing of role, it is determined to NO in step S104, and the process proceeds to step S105.

In step S105, the director device determines whether or not the content is completed on the basis of the operation of the director. That is, all of the work results are acknowledged on the basis of the operation of the director, and it is determined whether or not the content is completed.

When it is determined that the content is not completed, it is determined to NO in step S105, the process returns to step S103, and the processes thereafter are repeated. That is, until the content is completed, the looping in steps S103 to S105 is repeated. Thereafter, when the content is completed, it is determined to YES in step S105, and the process of the simultaneous and parallel editing system is ended.

As described above, a plurality of editors can perform the simultaneous and parallel editing work in a multi-user environment, by performing the processing corresponding to FIGS. 37 to 39.

The embodiments of the present disclosure can be applied to an information processing device including a simultaneous and parallel editing system.

Application to Program of the Embodiments of the Present Disclosure

The above described a series of processes can be executed by hardware, or software.

In this case, for example, a personal computer shown in FIG. 40 can be adopted as at least a part of the above described information processing device.

In FIG. 40, a CPU (Central Processing Unit) 2001 executes a variety of processing according to a program which is recorded in a ROM (Read Only Memory) 2002. Alternatively, the CPU 2001 executes a variety of processing according to a program which is loaded to a RAM (Random Access Memory) 2003 from a storage unit 2008. In the RAM 2003, data or the like which is necessary for the CPU 2001 when executing a variety of processing is appropriately stored, as well.

The CPU 2001, ROM 2002, and RAM 2003 are connected to each other through a bus 2004. An input/output interface 2005 is also connected to the bus 2004.

An input unit 2006 which is formed of a keyboard, a mouse, or the like, and an output unit 2007 which is formed of a display or the like are connected to the input/output interface 2005. In addition, a storage unit 2008 which is formed of hard disk or the like, and a communication unit 2009 which is formed of a modem, a terminal adapter, or the like, is also connected to the input/output interface 2005. In the communication unit 2009, communication with another device (not shown) through a network including Internet is controlled.

A drive 2010 is also connected to the input/output interface 2005 as necessary, and a magnetic disk, an optical disc, a magneto-optical disk, or removable media 2011 which are formed of a semiconductor memory or the like are installed in the input/output interface 2005. In addition, a computer program read out from those is installed in the storage unit 2008 as necessary.

When a series of processing is executed by software, a program which constitutes the software is installed to a computer which is built into dedicated hardware, a general-purpose personal computer, for example, which can execute various functions by installing various programs, or the like, from network or a recording medium.

As shown in FIG. 40, a recording medium including such a program is not only configured by a magnetic disk (including a floppy disk) which is distributed to provide a program to users separately from the main body of the device, and is recorded with a program, an optical disc (including CD-ROM (Compact Disc-Read Only Memory) and DVD (Digital Versatile Disc)), a magneto-optical disk (including MD (Mini-Disk)), or removable media (package media) 2011 which is formed of a semiconductor memory or the like, but is configured by the ROM 2002 which is provided to users in a state of being built into the main body of the device in advance, and is recorded with a program, a hard disk included in the storage unit 2008, or the like.

In addition, in the application, the steps describing the program which is recorded in the recording medium includes processing which is executed in time series according to the order, to be sure, and processing which is executed in parallel or individually, even if it is not necessarily processed in time series.

In addition, in the application, the system represents the whole device which is configured by a plurality of devices, units, or the like.

The present disclosure contains subject matter related to that disclosed in Japanese Priority Patent Application JP 2011-025883 filed in the Japan Patent Office on Feb. 9, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An editing device comprising:

a setting unit which selectively sets a respective functional role for the editing device, including a director role for that editing device whereby the user of that editing device instructs one or more users of other editing devices to operate those other editing devices in a worker role to perform predetermined editing processing, for respective ones of said other editing devices, all of said editing devices operating in a hierarchy constituted by a director and one or more workers; and an executing unit included in the editing device to execute at least one editing processing of an overall editing operation, wherein the editing processing and overall editing operation are defined in advance on the basis of the role set by the setting unit for that editing device under the control of instructions from the director, wherein the director sends instructions to the setting unit of a respective editing device to operate in a worker role, the instructions defining the editing processing to be executed by said executing unit when the editing device that includes said executing unit is set by the director to function in a worker role, and wherein selected editing processings of predetermined editing devices that function in a worker role are inhibited by the director from conflicting with the editing processing of other editing devices in the overall editing operation.

2. The editing device according to claim 1, wherein the functional role of an editing device includes editing results which are expected from other editing devices, and an authority to perform editing processing to change editing information relating to a material as elements of contents, and
    wherein the executing unit controls the editing processing of the overall editing operation so as not to conflict with the editing processing of another editing device.

3. The editing device according to claim 2, further comprising a determining unit which determines assignment of work content and shows each content item of one or more editing processing of the material, wherein said determining unit determines one or more work contents assigned to each of the workers, according to an instruction from the editing device operating in the director role.

4. The editing device according to claim 3, wherein the setting unit sets the respective functional role in a range of the determined, assigned work content according to the instruction from the editing device operating in the director role.

5. The editing device according to claim 4, further comprising:
    a generation unit which generates:
        (a) first data representing a result, during execution or after execution, of the editing processing by the executing unit according to the work contents and the assignment; and
        (b) second data which respectively shows the roles of each of the plurality of editing devices that correspond to portions of an editing result in the first data based on the assigned work content.

6. The editing device according to claim 5, wherein when the functional role of an editing device that is set as a worker is changed during execution of the editing processing, changed content is reflected in the second data.

7. The editing device according to claim 6, wherein when the functional role of an editing device that is set as a worker is changed during execution of the editing processing, changed content is reflected in the first data.

8. An editing method comprising:
    selectively setting a respective functional role for respective ones of plural editing devices, including a director role for a given editing device, whereby user of that given editing device instructs one or more users of other editing devices to operate those other editing devices in a worker rote to perforin predetermined editing processing, said editing devices being operable in a hierarchy constituted by a director and one or more workers; and
    executing at least one editing processing of an overall editing operation, wherein the editing processing and overall editing operation are defined in advance on the basis of the role that has been set for that respective editing device under the control of instructions from the director, wherein the director sends instructions to that respective editing device to operate in a worker role, the instructions defining the editing processing to be executed by that editing device when the editing device is set by the director to function in a worker role, and wherein selected editing processings of predetermined editing devices that function in a worker role are inhibited by the director from conflicting with the editing processing of other editing devices in the overall editing operation.

9. A non-transitory computer-readable storage medium on which is stored a program that, when executed by a computer, performs an editing method comprising:
    selectively setting a respective functional role for respective ones of plural editing devices, including a director role for a given editing device, whereby the user of that given editing device instructs one or more users of other editing devices to operate those other editing devices in a worker rote to perform predetermined editing processing, said editing devices being operable in a hierarchy constituted by a director and one or more workers; and
    executing at least one editing processing of an overall editing operation, wherein the editing processing and overall editing operation are defined in advance on the basis of the role that has been set for that respective editing device under the control of instructions from the director, wherein the director sends instructions to that respective editing device to operate in a worker role, the instructions defining the editing processing to be executed by that editing device when the editing device is set by the director to function in a worker role, and wherein selected editing processings of predetermined editing devices that function in a worker role are inhibited by the director from conflicting with the editing processing of other editing devices in the overall editing operation.

* * * * *